United States Patent [19]
Andersen et al.

[11] Patent Number: 5,766,525
[45] Date of Patent: Jun. 16, 1998

[54] METHODS FOR MANUFACTURING ARTICLES FROM SHEETS OF UNHARDENED HYDRAULICALLY SETTABLE COMPOSITIONS

[75] Inventors: Per Just Andersen; Simon K. Hodson, both of Santa Barbara, Calif.

[73] Assignee: E. Khashoggi Industries. Santa Barbara, Calif.

[21] Appl. No.: 105,741

[22] Filed: Aug. 10, 1993

Related U.S. Application Data

[63] Continuation-in-part of Ser. No. 95,662, Jul. 21, 1993, Pat. No. 5,385,764, which is a continuation-in-part of Ser. No. 19,151, Feb. 17, 1993, Pat. No. 5,453,310, and Ser. No. 929,898, Aug. 11, 1992, abandoned.

[51] Int. Cl.$^6$ .............. B29C 65/00; B29C 59/00; B29C 67/20; C04B 41/00

[52] U.S. Cl. .............. 264/40.1; 264/42; 264/102; 264/129; 264/132; 264/138; 264/157; 264/175

[58] Field of Search .............. 264/101, 108, 264/129, 132, 133, 145, 146, 148, 153, 177.11, 211.11, 211.12, 333, 42, 82, 102, 294, 40.1, 138, 157, 175

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |
| 882,538 | 3/1908 | Sargent . |
| 1,223,834 | 4/1917 | Sanger . |
| 1,234,692 | 7/1917 | Poznanski . |
| 1,874,974 | 8/1932 | Hammenecker . |
| 1,932,150 | 10/1933 | Tada . |
| 1,954,117 | 4/1934 | Caldwell ............... 106/24 |
| 1,965,538 | 7/1934 | Stewart ............... 106/29 |

(List continued on next page.)

FOREIGN PATENT DOCUMENTS

| | | |
|---|---|---|
| 0263723 A2 | 4/1988 | European Pat. Off. . |
| 0290007 A1 | 11/1988 | European Pat. Off. . |
| 89107882 | 4/1989 | European Pat. Off. . |
| 0340707 A2 | 11/1989 | European Pat. Off. . |
| 0340765 A2 | 11/1989 | European Pat. Off. . |
| 0497151 A1 | 8/1992 | European Pat. Off. . |
| 2841172 | 9/1978 | Germany . |
| 3011330 | 3/1980 | Germany . |

(List continued on next page.)

OTHER PUBLICATIONS

S. P. Shah, *Recent Trends In the Science and Technology of Concrete,* NSF Center for Advanced Cement-Based Materials, Northwestern University, Evanston, Illinois, pp. 1–18.

Zukowski and Struble, *Rheology of Cementitious Systems,* MRS Bulletin, Mar. 1993.

Lewis and Kriven, *Microstructure–Property Relationships in Macro–Defect–Free Cement,* MRS Bulletin, Mar. 1993.

(List continued on next page.)

*Primary Examiner*—Christopher A. Fiorilla
*Attorney, Agent, or Firm*—Workman, Nydegger & Seeley

[57] ABSTRACT

Methods and systems for readily and economically manufacturing hydraulically settable articles, particularly containers, from microstructurally engineered hydraulically settable mixtures wherein the mixture is extruded into a sheet that is feed through a plurality of sets of rollers so as to form the sheet into the desired thickness. The sheet is then pressed between a male die of a desired shape and a female die having a substantially complimentary configuration of the male die shape to immediately fashion a portion of the sheet into a form stable shape for the desired article. To assist in imparting form stability, the dies can be heated or cooled. Once the article has obtained form stability, the article is removed from the dies and dried under heated air to gain strength. The article can then be cut from the sheet and receive printing or a coating, if desired, prior to packaging, shipping, and use.

185 Claims, 20 Drawing Sheets

U.S. PATENT DOCUMENTS

| Number | Date | Name | Ref |
|---|---|---|---|
| 2,045,099 | 6/1936 | Pond . | |
| 2,170,102 | 8/1939 | Thompson | 106/19 |
| 2,205,735 | 6/1940 | Scherer, Jr. | 106/18 |
| 2,307,629 | 1/1943 | MacIldowie | 117/123 |
| 2,432,971 | 12/1947 | Ruthman et al. | 106/86 |
| 2,496,895 | 2/1950 | Staley . | |
| 2,549,507 | 4/1951 | Morgan et al. | 166/22 |
| 2,629,667 | 2/1953 | Kaveler | 106/93 |
| 2,700,615 | 1/1955 | Heismer | 106/93 |
| 2,793,957 | 5/1957 | Mangold et al. | 106/86 |
| 2,820,713 | 1/1958 | Wagner | 106/93 |
| 2,837,435 | 6/1958 | Miller et al. | 106/93 |
| 2,917,778 | 12/1959 | Lyon, Jr. et al. | 18/47.5 |
| 2,959,489 | 11/1960 | Wagner | 106/93 |
| 3,006,615 | 10/1961 | Mason, Jr. . | |
| 3,027,266 | 3/1962 | Wikne . | |
| 3,030,258 | 4/1962 | Wagner | 156/71 |
| 3,042,578 | 7/1962 | Denning . | |
| 3,149,986 | 9/1964 | Zelmanoff | 106/119 |
| 3,169,877 | 2/1965 | Bartoli et al. | 106/93 |
| 3,215,549 | 11/1965 | Ericson | 106/90 |
| 3,305,613 | 2/1967 | Spence | 264/82 |
| 3,306,961 | 2/1967 | Spence | 264/82 |
| 3,356,779 | 12/1967 | Schulze | 264/82 |
| 3,393,261 | 7/1968 | Herzig et al. | 264/82 |
| 3,432,317 | 3/1969 | Kelly et al. | 106/92 |
| 3,468,993 | 9/1969 | Bierlich | 264/82 |
| 3,470,005 | 9/1969 | Flachsenberg et al. | 106/87 |
| 3,492,385 | 1/1970 | Simunic | 264/82 |
| 3,520,707 | 7/1970 | Steinberg et al. | 106/93 |
| 3,526,172 | 9/1970 | Stuart | 94/25 |
| 3,579,366 | 5/1971 | Rehmar | 106/314 |
| 3,683,760 | 8/1972 | Silva . | |
| 3,689,294 | 9/1972 | Bramnauer | 106/90 |
| 3,697,366 | 10/1972 | Harlock et al. . | |
| 3,745,891 | 7/1973 | Bodendoerfer | 93/36.1 |
| 3,753,749 | 8/1973 | Nutt . | |
| 3,754,954 | 8/1973 | Gabriel et al. | 106/97 |
| 3,759,729 | 9/1973 | Fahn . | |
| 3,770,859 | 11/1973 | Bevan . | |
| 3,806,571 | 4/1974 | Ronnmark et al. | 264/82 |
| 3,819,389 | 6/1974 | Uchikawa et al. | 106/100 |
| 3,824,107 | 7/1974 | Welant | 106/93 |
| 3,827,895 | 8/1974 | Copeland . | |
| 3,841,885 | 10/1974 | Jakel . | |
| 3,855,908 | 12/1974 | Schmidt et al. | 93/36.5 R |
| 3,857,715 | 12/1974 | Humphrey | 106/92 |
| 3,902,912 | 9/1975 | Wolf | 106/99 |
| 3,904,341 | 9/1975 | Putti | 425/382 |
| 3,908,523 | 9/1975 | Shikaya | 93/36.01 |
| 3,914,359 | 10/1975 | Bevan . | |
| 3,917,781 | 11/1975 | Gabriel et al. | 264/71 |
| 3,927,163 | 12/1975 | Gabriel et al. . | |
| 3,954,490 | 5/1976 | Cockram | 106/99 |
| 3,979,217 | 9/1976 | Sutton . | |
| 3,989,534 | 11/1976 | Plunguian | 106/86 |
| 3,998,651 | 12/1976 | Baudouin et al. . | |
| 4,002,482 | 1/1977 | Coenen | 106/40 V |
| 4,017,321 | 4/1977 | Reighter | 106/98 |
| 4,017,324 | 4/1977 | Eggers | 106/288 B |
| 4,028,454 | 6/1977 | Davidovits | 264/82 |
| 4,040,851 | 8/1977 | Ziegler | 106/93 |
| 4,046,584 | 9/1977 | Snyder et al. | 106/90 |
| 4,053,346 | 10/1977 | Amberg et al. | 156/446 |
| 4,070,199 | 1/1978 | Downing et al. | 106/93 |
| 4,070,953 | 1/1978 | Richards et al. | 93/39.1 R |
| 4,072,549 | 2/1978 | Amberg et al. | 156/86 |
| 4,073,658 | 2/1978 | Ohtani et al. | 106/92 |
| 4,077,809 | 3/1978 | Plunguian et al. | 106/88 |
| 4,084,980 | 4/1978 | Motoki | 106/75 |
| 4,085,001 | 4/1978 | Fukuwatari et al. . | |
| 4,093,690 | 6/1978 | Murray | 264/82 |
| 4,115,135 | 9/1978 | Goeman . | |
| 4,117,059 | 9/1978 | Murray | 264/82 |
| 4,117,060 | 9/1978 | Murray | 264/82 |
| 4,121,402 | 10/1978 | Cress et al. | 53/452 |
| 4,132,555 | 1/1979 | Barrable . | |
| 4,133,619 | 1/1979 | Wise | 425/64 |
| 4,135,940 | 1/1979 | Peltier | 106/88 |
| 4,157,998 | 6/1979 | Berntsson et al. | 260/42.13 |
| 4,158,989 | 6/1979 | Barr | 93/44 |
| 4,159,302 | 6/1979 | Greve et al. . | |
| 4,185,923 | 1/1980 | Bouette et al. | 366/10 |
| 4,187,768 | 2/1980 | Suzuki | 93/39.1 R |
| 4,188,231 | 2/1980 | Valore | 106/90 |
| 4,190,454 | 2/1980 | Yamagisi et al. | 106/90 |
| 4,196,161 | 4/1980 | Toffolom et al. . | |
| 4,202,857 | 5/1980 | Lowe | 264/333 |
| 4,209,336 | 6/1980 | Previte | 106/90 |
| 4,225,247 | 9/1980 | Hodson | 366/40 |
| 4,225,357 | 9/1980 | Hodson | 106/86 |
| 4,230,502 | 10/1980 | Lustig et al. | 106/314 |
| 4,233,080 | 11/1980 | Koeppel | 106/87 |
| 4,233,368 | 11/1980 | Baehr et al. | 428/538 |
| 4,234,344 | 11/1980 | Tinsley et al. . | |
| 4,239,716 | 12/1980 | Ishida et al. . | |
| 4,244,781 | 1/1981 | Heckman . | |
| 4,257,710 | 3/1981 | Delcoigne et al. | 366/8 |
| 4,257,814 | 3/1981 | Kellet et al. | 106/90 |
| 4,261,754 | 4/1981 | Krenchel et al. | 106/90 |
| 4,264,367 | 4/1981 | Schutz | 106/90 |
| 4,264,368 | 4/1981 | Schutz | 106/90 |
| 4,272,198 | 6/1981 | Velikov et al. | 366/65 |
| 4,279,695 | 7/1981 | Winterbottom . | |
| 4,287,247 | 9/1981 | Reil et al. | 428/129 |
| 4,299,790 | 11/1981 | Greenberg . | |
| 4,305,758 | 12/1981 | Powers et al. | 106/97 |
| 4,310,996 | 1/1982 | Mulvey et al. | 52/809 |
| 4,313,997 | 2/1982 | Ruff et al. . | |
| 4,326,891 | 4/1982 | Sadler | 106/99 |
| 4,353,748 | 10/1982 | Birchall et al. | 106/89 |
| 4,362,679 | 12/1982 | Malinowski | 264/82 |
| 4,370,166 | 1/1983 | Powers et al. | 106/97 |
| 4,373,957 | 2/1983 | Pedersen | 106/93 |
| 4,377,440 | 3/1983 | Gasland | 162/101 |
| 4,383,862 | 5/1983 | Dyson | 106/88 |
| 4,406,703 | 9/1983 | Guthrie et al. | 106/93 |
| 4,410,366 | 10/1983 | Birchall et al. . | |
| 4,415,366 | 11/1983 | Copening . | |
| 4,427,610 | 1/1984 | Murray | 264/82 |
| 4,428,741 | 1/1984 | Westphal | 493/103 |
| 4,428,775 | 1/1984 | Johnson et al. | 106/90 |
| 4,444,593 | 4/1984 | Schutz | 106/89 |
| 4,452,596 | 6/1984 | Clauss et al. | 493/107 |
| 4,460,348 | 7/1984 | Iioka et al. | 493/108 |
| 4,462,835 | 7/1984 | Car | 106/75 |
| 4,481,037 | 11/1984 | Beale et al. | 106/104 |
| 4,490,130 | 12/1984 | Konzal et al. | 493/106 |
| 4,497,662 | 2/1985 | Chisholm et al. | 106/92 |
| 4,504,315 | 3/1985 | Allemann et al. | 106/89 |
| 4,508,595 | 4/1985 | Gasland | 162/158 |
| 4,522,772 | 6/1985 | Bevan . | |
| 4,524,828 | 6/1985 | Sabins et al. | 166/293 |
| 4,529,663 | 7/1985 | Lancaster et al. . | |
| 4,533,393 | 8/1985 | Neuschaeffer et al. | 106/18.12 |
| 4,536,173 | 8/1985 | Puls | 493/149 |
| 4,552,463 | 11/1985 | Hodson | 366/295 |
| 4,562,218 | 12/1985 | Fornadel et al. . | |
| 4,571,233 | 2/1986 | Konzal | 493/109 |
| 4,581,003 | 4/1986 | Ito et al. | 493/153 |
| 4,585,486 | 4/1986 | Fujita et al. | 106/86 |
| 4,588,443 | 5/1986 | Bache . | |

| | | |
|---|---|---|
| 4,613,627 | 9/1986 | Sherman et al. |
| 4,619,636 | 10/1986 | Bogren .................... 493/109 |
| 4,621,763 | 11/1986 | Brauner .................... 229/5.5 |
| 4,622,026 | 11/1986 | Ito et al. .................... 493/104 |
| 4,623,150 | 11/1986 | Moehlman et al. |
| 4,636,345 | 1/1987 | Jensen et al. .................... 264/122 |
| 4,637,860 | 1/1987 | Harper et al. .................... 162/117 |
| 4,640,715 | 2/1987 | Heitzmann et al. .................... 106/85 |
| 4,642,137 | 2/1987 | Heitzman et al. .................... 106/85 |
| 4,650,523 | 3/1987 | Kikuchi et al. .................... 106/315 |
| 4,655,981 | 4/1987 | Nielsen .................... 264/162 |
| 4,680,023 | 7/1987 | Varano .................... 493/75 |
| 4,707,187 | 11/1987 | Tsuda et al. .................... 106/93 |
| 4,746,481 | 5/1988 | Schmidt .................... 264/82 |
| 4,754,589 | 7/1988 | Leth .................... 52/538 |
| 4,755,494 | 7/1988 | Ruben .................... 501/148 |
| 4,772,439 | 9/1988 | Trevino-Gonzalez .................... 264/40.6 |
| 4,784,693 | 11/1988 | Kirkland et al. .................... 106/93 |
| 4,786,670 | 11/1988 | Tracy et al. |
| 4,789,244 | 12/1988 | Dunton et al. .................... 366/12 |
| 4,797,161 | 1/1989 | Kirchmayr et al. |
| 4,799,961 | 1/1989 | Friberg .................... 106/93 |
| 4,836,940 | 6/1989 | Alexander . |
| 4,840,672 | 6/1989 | Baes et al. |
| 4,842,649 | 6/1989 | Heitzman et al. .................... 106/89 |
| 4,872,913 | 10/1989 | Dunton et al. .................... 106/88 |
| 4,888,059 | 12/1989 | Yamaguchi et al. .................... 106/314 |
| 4,889,428 | 12/1989 | Hodson .................... 366/1 |
| 4,892,589 | 1/1990 | Kirkland et al. .................... 106/197.1 |
| 4,895,598 | 1/1990 | Hedberg et al. .................... 106/86 |
| 4,912,069 | 3/1990 | Ruben .................... 501/148 |
| 4,923,665 | 5/1990 | Andersen et al. |
| 4,927,043 | 5/1990 | Vanderlaan .................... 220/67 |
| 4,927,573 | 5/1990 | Alpár et al. .................... 264/40.1 |
| 4,939,192 | 7/1990 | t'Sas .................... 524/44 |
| 4,944,595 | 7/1990 | Hodson .................... 366/65 |
| 4,948,429 | 8/1990 | Arfaei .................... 106/659 |
| 4,976,131 | 12/1990 | Grims et al. .................... 72/347 |
| 4,979,992 | 12/1990 | Bache .................... 106/644 |
| 4,985,119 | 1/1991 | Vinson et al. .................... 162/149 |
| 4,999,056 | 3/1991 | Rasmussen .................... 106/737 |
| 5,018,379 | 5/1991 | Shirai et al. .................... 72/354.6 |
| 5,021,093 | 6/1991 | Beshay .................... 106/731 |
| 5,030,282 | 7/1991 | Matsuhashi et al. .................... 106/692 |
| 5,039,003 | 8/1991 | Gordon et al. .................... 229/120.32 |
| 5,039,560 | 8/1991 | Durgin et al. .................... 427/240 |
| 5,047,086 | 9/1991 | Hayakawa et al. .................... 106/731 |
| 5,051,217 | 9/1991 | Alpár et al. .................... 264/40.1 |
| 5,076,986 | 12/1991 | Delvaux et al. |
| 5,085,366 | 2/1992 | Durgin et al. .................... 229/1.5 B |
| 5,102,596 | 4/1992 | Lempfer et al. .................... 264/115 |
| 5,106,423 | 4/1992 | Clarke .................... 106/789 |
| 5,106,880 | 4/1992 | Miller et al. |
| 5,108,677 | 4/1992 | Ayres .................... 264/112 |
| 5,108,679 | 4/1992 | Rirsch et al. .................... 264/118 |
| 5,154,771 | 10/1992 | Wada et al. .................... 106/730 |
| 5,167,894 | 12/1992 | Baumgarten .................... 264/175 |
| 5,184,995 | 2/1993 | Kuchenbecker .................... 493/79 |
| 5,232,496 | 8/1993 | Jennings et al. |
| 5,269,845 | 12/1993 | Grunau et al. .................... 106/692 |
| 5,290,355 | 3/1994 | Jakel . |
| 5,316,624 | 5/1994 | Racine . |
| 5,338,349 | 8/1994 | Farrar . |
| 5,366,549 | 11/1994 | Imaizumi et al. |

FOREIGN PATENT DOCUMENTS

| | | |
|---|---|---|
| 42-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 4/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 62-36055 | 8/1985 | Japan . |
| 62-36056 | 8/1985 | Japan . |
| 60-260484 | 12/1985 | Japan . |
| 60-264375 | 12/1985 | Japan . |
| 62-39204 | 2/1987 | Japan . |
| 62-46941 | 2/1987 | Japan . |
| 62-151304 | 7/1987 | Japan . |
| 62-253407 | 11/1987 | Japan . |
| 63-551 | 1/1988 | Japan . |
| 63-552 | 1/1988 | Japan . |
| 63-109961 | 5/1988 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-80141 | 4/1991 | Japan . |
| 3-153551 | 7/1991 | Japan . |
| 3-187962 | 8/1991 | Japan . |
| 3-202310 | 9/1991 | Japan . |
| 3-202313 | 9/1991 | Japan . |
| 3-208847 | 9/1991 | Japan . |
| 4-70304 | 3/1992 | Japan . |
| 453555 | 1/1936 | United Kingdom . |
| 490820 | 8/1938 | United Kingdom . |
| 2086748 | 5/1982 | United Kingdom . |
| 2192392 | 1/1988 | United Kingdom . |
| 2220934 | 1/1990 | United Kingdom . |
| WO 87/00828 | 2/1987 | WIPO . |
| WO 91/12186 | 8/1991 | WIPO . |
| WO 93/20990 | 10/1993 | WIPO . |

OTHER PUBLICATIONS

Young and Berg, *Introduction to MDF Cement Composites*, ACBM vol. 1, No. 2, Fall 1989.

*Zien In The Food Industry*, Freeman Industries, Inc., P.O. Box 415, Tuckahoe, NY 10707-0415 USA.

Davidson and Marshall Sittig, *Water–Soluble Resins*, New York: Reinhold Publishing Corp., Chapman & Hall, Ltd., London.

Balaguru and Kendzulak, *Flexural Behavior of Slurry Infiltrated Fiber Concrete (SIFCON) Made Using Condensed Silica Fume*.

Naaman and Homrich, *Tensile Stress–Strain Properties of SIFCON*, ACI Materials Journal, May–Jun. 1989.

Stix, *Concrete Solutions*, Scientific American, Apr. 1993.

Strabo, *Cementbuserede Hybridkomposites*, Byggeteknik Teknologisk Institut, 1987. English Translation—Strabo, Andersen, and Clauson-Kaas, *Cement–Based Hybrid Composites*, 1987.

Strabo et al, *Fiberbeton Teknology.*, Byggeteknik Teknologisk Institut, 1986. English Translation—Strabo, Cluason--Kaas, Chatterji, and Thaulow, *Fiber Concrete Technology TR–Project*, 1986.

*Nye Metoder I Beton Kan Betyde Teknisk Knock–Out for Plast*. English Translation—"*New Method for Concrete May Mean Technical Knock–Out for Plastic*," The Engineer, No. 14, 1986.

*Fiberbeton–nyt TyByageteknik* English Translation—"*Fiber Concrete News*," The Technological Institute of Denmark, Pamphlet No. 1, Oct. 1987.

Andersen, *Tailoring of Concrete Materials*, R&H Annual Review, 1988.

Andersen, et al., *Tailoring of Cement–Bound Materials By the Use of Packing and Rheological Models*, American Ceramic Society (1988).

Ashby, *Materials Selection in Engineering Design*, Indian Journal of Technology, vol. 28, Jun.–Aug. 1990.

Ashby, *Overview No. 80: On the Engineering Properties of Materials*, Acta Metall, vol. 3, No. 5 pp. 1273–1293, 1989.

Johansen, Vagn and Andersen, *Particle Packing and Concrete Properties*, Materials Science of Concrete II, pp. 111–147.

Maycock and Skalny, *Carbonation of Hydrated Calcium Silicates*, Cement and Concrete Research, vol. 4, pp. 69–76, 1974.

Suzuki, Nishikawa, and Ito, *Formation and Carbonation of C–S–H In Water*, Cement and Concrete Research, vol. 15, pp. 213–224, 1985.

Bukowski and Berger, *Reactivity and Strength Development of CO2 Activated Non–Hydraulic Calcium Silicates*, Cement and Concrete Research, vol. 9, pp. 57–68, 1979.

Berger, Young, and Leung, *Acceleration of Hydration of Calcium Silicates by Carbon Dioxide Treatment*, Nature Physical Science, vol. 240, Nov. 6, 1972.

Verbeck, *Carbonation of Hydrated Portland Cement*, Cement and Concrete Special Technical Publication No. 203, 1958.

*Plastic–Forming Processes*.

Strabo et al., *Nye Formgivningsmetoder Til Fiberbeton* English Translation—Strabo et al, "*New Design Methods for Fiber Concrete,*" Technological Institute of Denmark, Dept. of Building Technology, Apr. 1987.

Finn, Strabo et al., *Ekstrudering AF Fiberbeton*. English Translation—Strabo, et al, "*Extrusion of Fiber Concrete*," Danish Technological Institute, Dept. of Building Technology, Oct. 1987.

Knab, Clifton, and Ings, *Effects of Maximum Void Size and Aggregate Characteristics on the Strength of Mortar*, Cement and Concrete Research, vol. 13 pp. 383–390, 1983.

Unwalla and Green, editors, *Recycled Materials for Making Concrete*, The Indian Concrete Journal, vol. 53, No. 9, Sep. 1979.

Rosenberg and Gaidis, *A New Mineral Admixture for High–Strength Concrete–Proposed Mechanism for Strength Enhancement*, Second International Conference on the Use of Fly Ash, Silica Fume, Slag and Natural Pozzolans in Concrete, Apr. 21–25, 1986.

Brown, Ledbetter, and Jennings, *An Investigation of a High Speed Shear Mixer on Selected Pastes and Mortars*, Mat. Res. Soc. Symp. Proc vol. 137, 1989.

*The Colcrete Process*, Undated Publication.

*The Coating Process for Paper*, 1993.

Niel, *Supplementary Paper II–117. The Influence of Alkali––Carbonate on the Hydration of Cement*, 1968.

*Report of the Panel on Solids Processing*.

Lawrence, *The Properties of Cement Paste Compacted Under High Pressure: Research Report 19*, Cement and Concrete Association Research Report 19, Jun. 1969.

Jones and Berard, *Raw Materials Processing, Ceramics: Industrial Processing and Testing*, Iowa State University Press, 1972.

Hlavac, *The Technology of Ceramics, Glass Science and Technology, 4: The Technology of Glass and Ceramics*, Elsevier Publishing, 1983.

Skalny and Bajza, *Properties of Cement Pastes Prepared by High Pressure Compaction*, ACI Journal, Mar. 1970.

Bach, *Cement–Based Products Processed the Plastics Way*.

Lecznar and Barnoff, *Strength of Neat Cement Pastes Molded Under Pressure*, Journal of the American Concrete Institute Concrete Briefs, Feb. 1961.

Roy, Gouda, and Bobrowsky, *Very High Strength Cement Pastes Prepared by Hot Pressing and Other High Pressure Techniques*, Cement and Concrete Research, vol. 2, pp. 349–366, 1972.

B. W. Attwood, *Paperboard, The Wiley Encyclopedia of Packaging Technology* 500–506 (Marilyn Bakker ed., 1986).

G. A. Baum, et al., *Paper, Kirk–Othmer Concise Encyclopedia of Chemical Technology* 834–836 (Martin Grayson ed., 1985).

George S. Brady & Henry R. Clauser, *Materials Handbook* 588–594 (1991).

James E. Kline, *Paper and Paperboard Manufacturing and Converting Fundamentals* 19–28 (2d ed. 1982).

Richard J. Lewis, Sr., *Condensed Chemical Dictionary* 870 (12th ed. 1993).

Stearns T. Putnam, et al., *Papermaking Additives, Kirk–Othmer Concise Encyclopedia of Chemical Technology* 836–837 (Martin Grayson ed., 1985).

M. Sikora, *Paper, The Wiley Encyclopedia of Packaging Technology* 497–500 (Marilyn Bakker ed., 1986).

Vrana, *Khashoggi Kin Reported Planning Private Placement of Shares in New Container Firm*, 1993.

Roy, et al., *Processing of Optimized Cements and concretes via Particle Packing*, Mrs. Bulletin (Mar. 1993).

Samuel Ferretti, MRS *Distributed Reinforcement Concrete Pipes: An Innocative Product* 44–48 (May 1993).

Dow Plastics, *Thermoforming Process Guide*.

Skalny, Phillips, and Cahn, *Low Water to Cement Ratio Concretes*, Cement, and Concrete Research, vol. 3, pp. 29–40, 1973.

Yudenfreund, Skalny, Mikahil, and Brunauer, *Hardened Portland Cement Pastes of Low Porosity. II. Exploratory Studies, Dimensional Changes*, Cement and Concrete Research, vol. 2, pp. 331–348, 1972.

Bajza, *On The Factors Influencing the Strength of Cement Compacts*, Cement and Concrete Research, vol. 2, pp. 67–78, 1972.

Alexanderson, *Self–Smoothing Floors Based on Polymer Cement Concrete*, Concrete International (Jan. 1990).

Andersen, *Control and Monitoring of Concrete Production—A Study of Particle Packing and Rheology*, The Danish Academy of Technical Sciences (1990).

Andersen, *Effect of Organic Superplasticizing Admixtures and Their components on Zeta Potential and Related Properties of Cement Materials*, Pennsylvania State Univeristy (1987).

Andersen, *Effects of W/C–Ratio and Dispersion on the Pore Size Distribution of Cement Paste and Concrete*, Paper prepared for MRL by Per Just Anderson (Aug. 1988).

Andersen,*Rheology of Cement Paste, Mortar and Concrete*.

Bache, *Densified Cement/Ultra–Fine Particle–Based Materials*, Presented at the Second International Conference on Superplasticizers in Concrete, Ottawa, Canada (Jun. 10–12, 1981).

Benbow et al., *The Extrusion of Mechanics of Pastes—The Influence of Paste Formulation on Extrusion Parameters*, Chemical Engineering Science, vol. 42, No. 9, pp. 2151–2162 (1987).

Blaha, *Ideas in Concrete*, Concrete Products (Sep. 1992).

Clauson–Kaas et al., *Ekstrudering AF Fiberbeton–delrapport English Translation—Extrusion of Fiber Concrete–Interim Report*.

Clauson–Kaas, *Opsprojtet Glasfiberbeton i Byggeriet* (1987). (See Statement of Relevance as there is no English translation).

Collepardi et al., *Influence of Polymerization of Sulfonated Naphthalene Condensate and its Interaction with Cement*.

Eriksen and Andersen, *Foam Stability Experiments on Solutions Containing Superplasticizing and Air–entraining Agents for Concrete*. The Technological Institute, Department of Building Technology, Taastrup, Denmark.

Fordos, *Natural or Modified Cellulose Fibres as Reinforcement in Cement Composites*, Concrete Technology & Design vol. 5, Natural Fiber Reinforced Cement and Concrete (1988).

Greminger, Jr. and Krumel, *Alkyl and Hydroxyalkylalkylcellulose*, Dow Chemical U.S.A., Midland, Oregon.

Hewlett, *Physico–Chemical Mechanisms of Admixtures* Lecture, CGLI Advanced Concrete Technology Course, Cement and Concrete Association Training Center.

Litvan and Sereda, *Particulate Admixture for Enhanced Freeze–Thaw Resistance of Concrete*, Cement and Concrete Research, vol. 8, pp. 53–60, Pergamon Press, Inc.

Manson et al., *Use of Polymers in Highway Concrete*, National Cooperative Highway Research Program Report 190 (1978).

Maries, *The Activation of Portland Cement by Carbon Dioxide*.

Miyake et al., *Superplasticized Concrete Using Refined Lignosulfate and its Action Mechanism*, Cement and Concrete Research, vol. 15, pp. 295–302 (1985).

Purton, *The Effect of Sand Grading on the Calcium Silicate Brick Reaction*, Cement and Concrete Research vol. 4, pp. 13–29 (1974).

Robinson, *Extrusion Defects*.

Roy, *New Strong Cement Materials: Chemically Bonded Ceramics*, Science, vol. 235, 6 (Feb. 1987).

Soroushian et al., *Recycling of Wood and Paper in Cementitious Materials*, Mat. Res. Soc. Sypm. Proc., vol. 266 (1992).

Studt, *New Advances Revive Interest In Cement–Based Materials*, R&D Magazine (Nov. 1992).

Sun et al, *The Composition of Hydrated DSP Cement Pastes*.

Wagner, *Polymer Modification of Portland Cement Systems*, Chemtech, (Feb. 1973).

Weiss et al, *High Tensile Cement Pastes as a Low–Energy Substitute for Metals, Plastics, Ceramics, and Wood. Phase 1: Preliminary Technological Evaluation*, CTL Project CR7851–4330, Final Report, Prepared for U.S. Dept. of Energy, (Nov. 1984).

Westman and Hugill, *The Packing of Particles* (1930).

Young, *Macro–Defect–Free Cement: A Review*, Mat. Res. Soc. Symp. Proc., vol. 179 (1991).

*Cementing the Future: A New Extrusion Technology*, ACBM, vol. 6, No. 1, (Spring 1994).

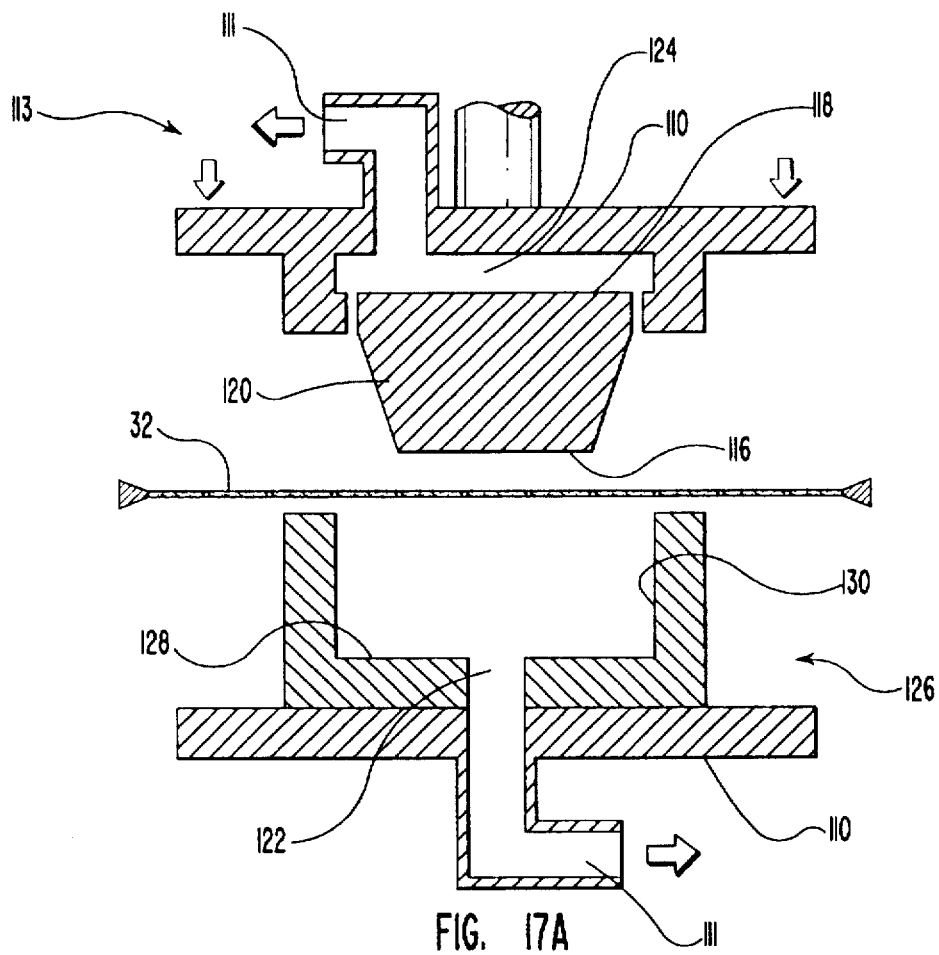
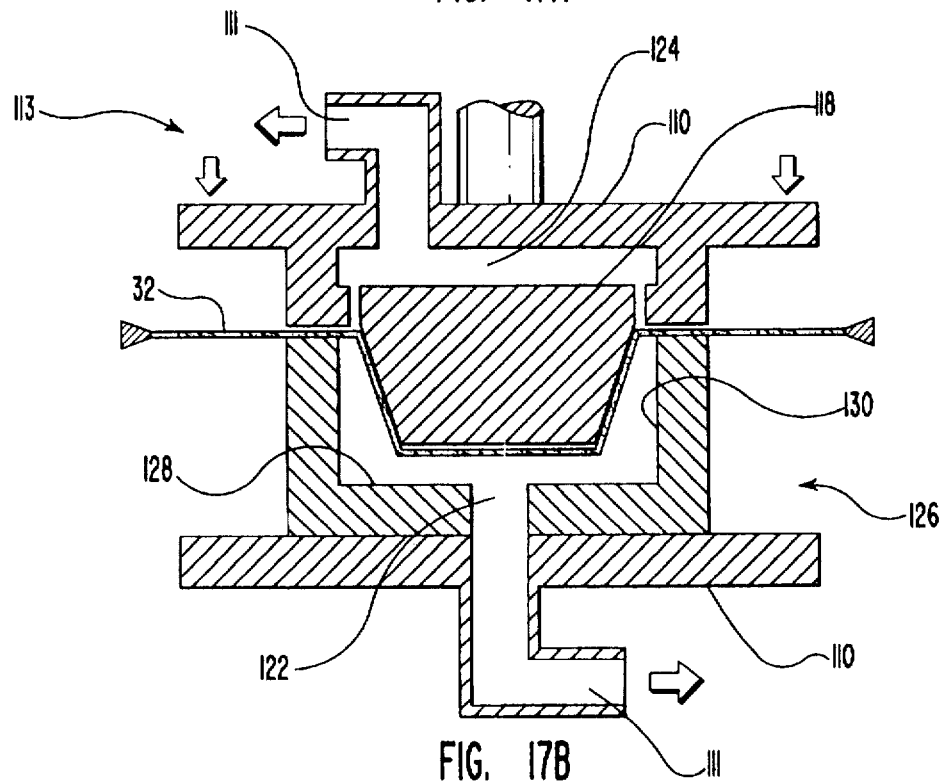
FIG. 17A
FIG. 17B

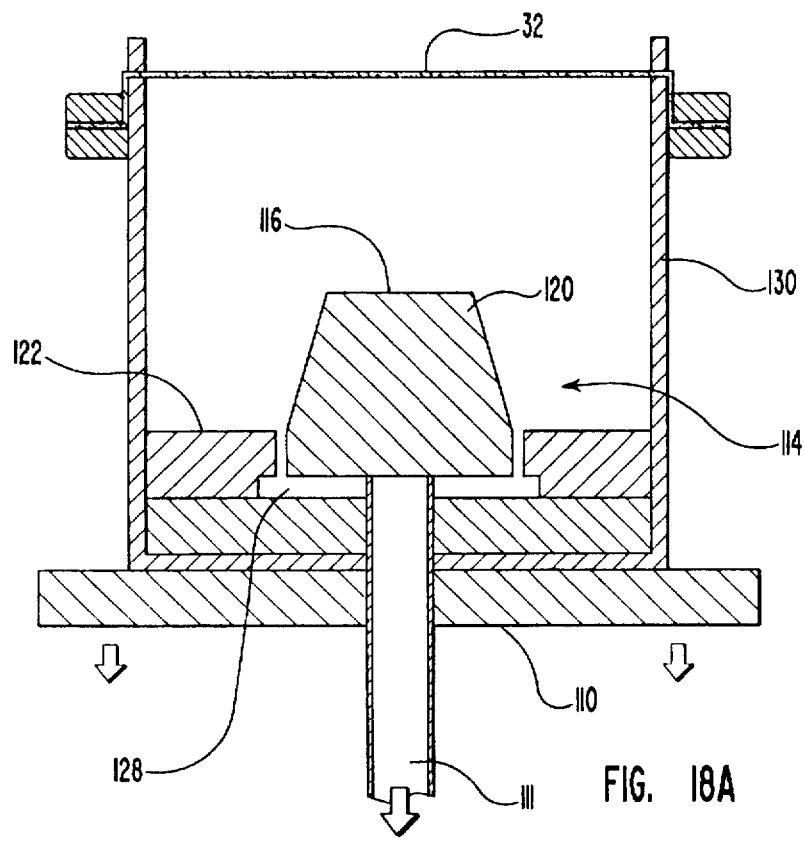
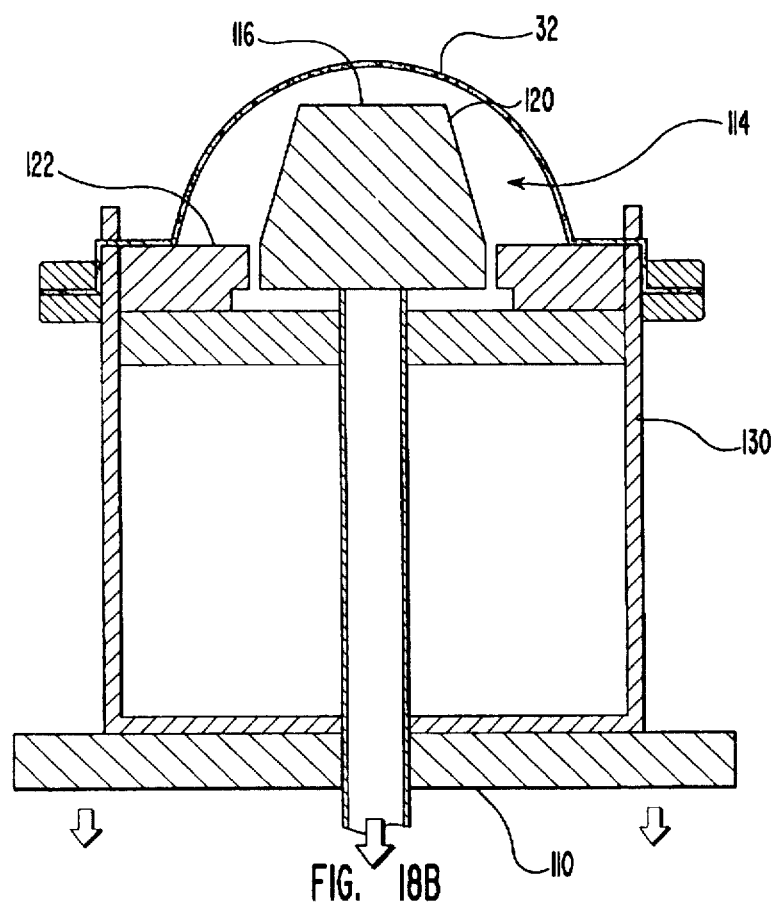

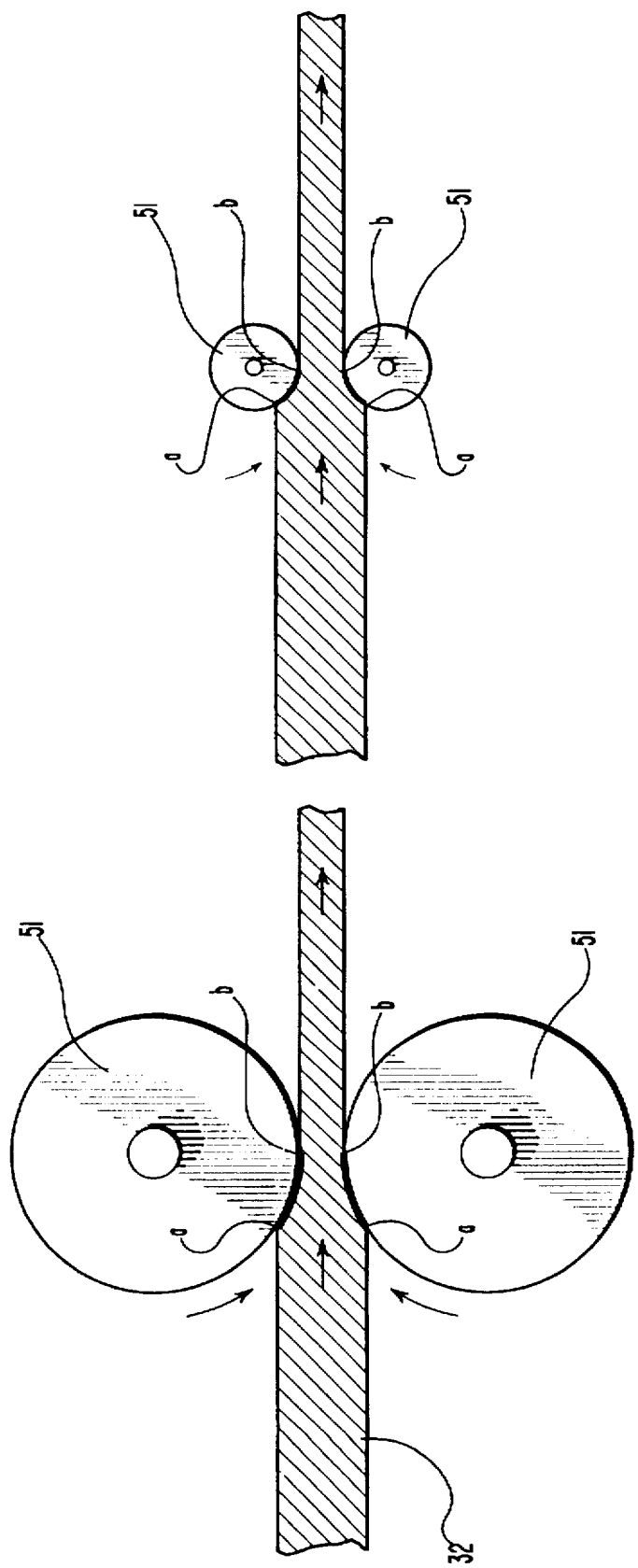

METHODS FOR MANUFACTURING ARTICLES FROM SHEETS OF UNHARDENED HYDRAULICALLY SETTABLE COMPOSITIONS

BACKGROUND

1. Related Applications

This application is a continuation-in-part of application Ser. No. 08/095,662 entitled "Hydraulically Settable Containers and Other Articles for Storing, Dispensing, and Packaging Food and Beverages and Methods for Their Manufacture", filed Jul. 20, 1993 in the names of Per Just Anderson, Ph.D., and Simon K. Hodson, now U.S. Pat. No. 5,385,764; which is a continuation-in-part of application Ser. No. 08/019,151, entitled "Cementitious Materials for Use in Packaging Containers and Their Methods of Manufacture", filed Feb. 17, 1993, in the names of Per Just Anderson, Ph.D. and Simon K. Hodson, now U.S. Pat. No. 5,453,310; and a continuation-in-part of application Ser. No. 07/929,898, entitled "Cementitious Food and Beverage Storage, Dispensing, and Packaging Containers and the Methods of Manufacturing Same", filed Aug. 11, 1992, in the names of Per Just Anderson, Ph.D., and Simon K. Hodson, now abandoned.

2. The Field of the Invention

The present invention relates to methods and systems for manufacturing articles of manufacture, primarily containers, from sheets of uncured hydraulically settable material. More particularly, the present invention relates to methods and systems for microstructurally engineering a hydraulically settable mixture that is formed into a sheet. The sheet is then pressed into a form-stable article or container of a desired shape while the sheet is still in the green state. The subsequently hardened articles of manufacture are economically competitive with and have properties substantially similar to articles made from traditional materials such as paper, plastic, and metal.

3. The Relevant Technology

A. Articles of Manufacture.

A huge variety of objects such as containers, packaging materials, kitchen implements, structural components, and decorative items are presently mass-produced from paper (including cardboard), plastic (particularly polystyrene), metal, and glass. The vast majority of such items eventually wind up within our diminishing landfills, or worse, are scattered on the ground or dumped into bodies of water as litter. Because plastic is essentially nonbiodegradable it persists within the land and water as unsightly, value diminishing, and (in some cases) toxic foreign materials. Even paper, glass, and metal, believed by many to be biodegradable, can persist for years, even decades, within landfills where they are shielded from air, light, and water, all of which are required for normal biodegradable activities.

In spite of the more recent attention that has been given to reduce the use of such materials, they continue to be used because of their strength properties and mass productability. Moreover, for any given use for which they were designed, such materials are relatively inexpensive, lightweight, easy to mold, strong, durable, and resistant to degradation during use.

Although each of these materials may be comparably priced to any of the other materials presently available, they are usually far more expensive than typical cementitious materials. Because no rational business would ignore the economic benefit which would necessarily accrue from the substitution of radically cheaper cementitious materials from paper, cardboard, plastic, or polystyrene, the failure to do so can only be explained by a marked absence of available technology to make the substitution.

B. The Impact of Paper, Plastic, Glass and Metal.

Recently there has been a debate as to which of these materials (e.g., paper, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each have their own unique environmental weaknesses.

Polystyrene products, particularly containers and other packaging materials, have more recently attracted the ire of environmental groups. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) are still significantly harmful, and their elimination would be beneficial.

As a result, there has been widespread pressure for companies to stop using polystyrene products in favor of more environmentally safe materials. Some environmental groups have favored a temporary return to the use of natural products such as paper or wood, which are believed to be biodegradable. Nevertheless, other environmental groups have taken the opposite view in order to minimize cutting trees and depleting the forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachloro-dibenzo[b,e]

[1,4]dioxin, is a highly toxic, teragenic contaminant, and is extremely dangerous even in very low quantities. Toxic effects of dioxin in animals and humans include anorexia, severe weight loss, hepatoxicity, hematoporphyria, vascular lesions, chloracne, gastric ulcers, porphyrinuria, porphyria, cutanea tarda, and premature death. Most experts in the field believe that dioxin is a carcinogen.

The highest level of dioxin allowed in the discharge waters from paper mills is about 0.5 part per trillion. However, fish found downstream from paper pulp mills can contain nearly 200 parts per trillion of dioxin, with levels of 50 parts per trillion being not uncommon.

The manufacturing processes of metal cans (particularly those made of aluminum and tin), glass bottles, and ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment.

With glass and ceramic materials, in addition to the high processing costs, the final product is brittle. Further, while glass can be recycled, that portion which ends up in landfills is essentially nonbiodegradable. (For purposes of convenience, since many of the problems of metal materials, when compared to the products of the present invention, are the same as with glass and ceramic materials, reference hereinafter will generally be made only to metal prior art materials and problems. However, it will be appreciated that many, if not most, of the same comments are applicable to containers and articles made from glass or ceramic materials.)

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw material set comes from nonrenewable resources.

Another problem with paper, cardboard, polystyrene, and plastic is that each of these requires relatively expensive organic starting materials, some of which are nonrenewable, such as the use of petroleum in the manufacture of polystyrene and plastic. Although trees used in making paper and cardboard are renewable in the strict sense of the word, their large land requirements and rapid depletion in certain areas of the world undermines this notion. Hence, the use of huge amounts of essentially nonrenewable starting materials in making disposable containers cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

From a manufacturing perspective, paper has the additional frustration of requiring that the newly formed rolled paper be allowed to set for about three to five days before it can be formed into a desired product. Such a delay precludes the formation of a single production line that can continuously take raw paper components and form final paper products.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Traditional Hydraulically Settable Materials.

On the other hand, for millennia, man has made great use of nondepletable inorganic materials such as clay or stone. Similarly, hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. For example, cement is a hydraulically settable binder derived from clay and limestone, and it is essentially nondepletable.

Those materials containing a hydraulic cement are generally formed by mixing hydraulic cement with water and usually some type of aggregate to form a cementitious mixture, which hardens into a solid material, commonly known as concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and are molded into the final form by pouring the mixture into a space having externally supported boundaries or walls.

It is precisely because of this lack of moldability (which be is result of poor workability and/or poor form stability), coupled with the low tensile strength per unit weight, that cementitious materials have traditionally been useful only for applications where size and weight are not limiting factors and where the forces or loads exerted on the concrete are generally limited to compressive forces or loads, as in, e.g., roads, foundations, sidewalks, and walls.

Moreover, cementitious materials have historically been brittle, rigid, unable to be folded or bent, and having low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical cementitious materials have not been suitable for making small, lightweight objects, such as containers or thin sheets, which are better if made from materials with much higher tensile and flexural strengths per unit weight compared to typical cementitious materials.

More recently, higher strength cementitious materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984).

However, such high strength cementitious materials have been prohibitively expensive and would be unsuitable for making inexpensive containers where much cheaper materials better suited for such uses (e.g., paper and plastic) are readily available. Another drawback is that MDF concrete cannot be used to mass produce small lightweight objects due to the high amount of time and effort involved in forming and hardening the material and the fact that it is highly water soluble. Therefore, MDF concrete has been limited to expensive objects of simple shape.

Another problem with traditional and even more recently developed high strength concretes has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the cementitious articles until they have obtained sufficient strength to be demolded. Movement or demolding prior to this time has usually resulted in cracks and flaws in the cementitious structural matrix. Once self-supporting, the object could be demolded, although it has not typically attained the majority of its ultimate strength until days or even weeks later.

Since the molds used in forming cementitious objects are generally reused in the production of concrete products and a substantial period of time is required for even minimal curing of the concrete, it has been difficult to economically and commercially mass produce cementitious objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a cementitious object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled cementitious articles or shapes other than flat slabs, particularly in any type of a commercial mass production.

If the bond between the outer wall of the molded cementitious article and the mold is greater than the internal cohesive or tensile strengths of the molded article, removal of the mold will likely break the relatively weak walls or other structural features of the molded article. Hence, traditional cementitious objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the structural matrix. This is usually accomplished through various methods of vibration or poking. The problem with consolidating, however, is that the more extensive the consolidation of the concrete after it has been placed, the greater the segregation or bleeding of the concrete.

"Bleeding" is the migration of water to the top surface of freshly placed concrete caused by the settling of the aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also some fine material, thereby resulting in inhomogeneity or nonuniformity which manifest themselves as subsequent surface defects.

An additional limitation of conventional concrete is its inability to elongate. Elongation is the ability of a material to stretch without rupturing. It is the ability to elongate which allows materials such as plastics, paper, and metals to be stretched and shaped into customary containers and articles using standard manufacturing processes. As conventional concrete has almost zero elongation, it cannot be incorporated into such manufacturing processes.

For each of the foregoing reasons, as well as numerous others which cannot be listed here, cementitious materials have not generally had application outside of the formation of large, slab-like objects, such as in buildings, foundations, walk-ways, or highways, or as mortar to adhere bricks or cured concrete blocks. It is completely counterintuitive, as well as contrary to human experience, to even imagine the manufacture of small lightweight objects (such as containers comparable to the lightweight materials made from paper, plastic, or metal) from cementitious materials within the scope of the present invention.

Due to the more recent of the tremendous environmental impacts of using paper, cardboard, plastic, polystyrene, and metals for a variety of single-use, mainly disposable items such as containers (not to mention the ever mounting political pressures), there has been an acute need (long since recognized by those skilled in the art) to find environmentally sound substitute materials, such as cementitious materials, for these disposable items.

In spite of such pressures and long-felt need, the technology simply has not existed for the economic and feasible production of cementitious materials which could be substituted for paper, cardboard, plastic, polystyrene, or metal products such as containers. However, because cementitious materials essentially comprise such environmentally neutral components such as rock, sand, clay, and water, they would be ideally suited from an ecological standpoint to replace paper, cardboard, plastic, or polystyrene materials as the material of choice for such applications.

Such materials are not only made from nondepletable components, they do not impact the environment nearly as much as do paper, cardboard, plastic, and polystyrene. Another advantage of cementitious and other inorganic materials is that they are far less expensive than paper, cardboard, plastic, polystyrene, or metals.

While paper, cardboard, plastic, polystyrene, and metal products might be comparably priced to each other, they are far more expensive than typical cementitious materials. Because no rational business would ignore the economic benefit which would necessarily accrue from the substitution of radically cheaper cementitious materials for paper, cardboard, plastic, polystyrene, or metals, the failure to do so can only be explained by a marked absence of available technology to make such a substitution.

In light of the foregoing, new methods and systems are needed for manufacturing containers and other articles from materials other than paper, cardboard, plastic, or polystyrene. Such methods and systems would represent a significant advancement in the art if they could function without relying so heavily on the use of trees, petroleum, or other essentially nonrenewable or slowly renewing resources as the source of the primary starting material.

It would yet be an advancement in the art if such methods and systems manufactured containers and articles that were more environmentally neutral than conventional containers, both in their manufacture and in their disposal. More particularly, it would be a tremendous advancement in the art if the manufacture of the containers and articles did not result in the release of dioxin, CFCs or other dangerous chemicals into the environment, as does the use of presently used systems. Similarly, it would be an advancement if such methods and systems created containers that were essentially made of components found naturally within the earth into which they may eventually be discarded.

It would be a significant advancement if such methods and systems could manufacture containers with a high percentage of air voids so as to provide the insulation properties of containers made from polystyrene. It would yet be a significant advancement in the art if such methods and systems could also make the containers to have similar properties of strength and aesthetics of paper, plastic, or thin metal.

It would be a significant improvement if such new methods and systems could manufacture containers to have each of the properties found in existing materials used to make all of the various articles or containers found in the marketplace. This improvement would be even more important if such methods and systems could manufacture the containers to possess yet other properties not found in any of the existing materials (such as long shelf life, noncorrosive, and fire and heat resistant), which could be exploited to manufacture new articles or containers which have not hitherto been possible.

From a practical point of view, it would be a significant improvement in the art if such methods and systems could be used to manufacture containers at a cost that is comparable to and even less expensive than existing containers.

From a manufacturing perspective, it would be a significant advancement in the art if such methods and systems could manufacture containers that can rapidly obtain form stability, maintain their shape without external support, and can be handled in a manner similar to other materials presently used to manufacture containers.

Such methods and systems used to manufacture containers are disclosed and claimed herein.

BRIEF SUMMARY AND OBJECTS OF THE INVENTION

The present invention relates to novel methods and systems for readily and economically manufacturing hydraulically settable articles, especially containers, that have properties similar to those made of paper, plastic, glass or thin-walled metals. More particularly, the present invention applies novel combinations of time, temperature, and pressure to a hydraulically settable mixture developed through materials science and microstructural engineering approaches. The articles are manufactured by first fashioning the mixture into wet sheets. The wet sheets are then pressed into the desired shapes for the articles, the pressed articles having sufficient form stability to be dried in a self-supporting state. Finally, the articles are finished, such as by applying a printing or coating, and then packaged and shipped.

The materials science and microstructural engineering approaches of the present invention build into the microstructure of the hydraulically settable compositions of the present invention the desired physical characteristics and properties, while at the same time remaining cognizant of costs and other complications involved in the large scale manufacturing systems. In doing so, many of the problems have been overcome which have historically relegated the use of most hydraulically settable materials to bulky, massive structural objects.

As discussed in greater detail hereinafter, the materials science and microstructural engineering approaches, instead of the traditional trial-and-error, mix-and-test approach, specifically allow for the design of hydraulically settable materials with the properties of good elongation, high yield stress with good flow (low viscosity) characteristics, high tensile and flexural strength, high insulation, low weight, low cost, and low environmental impact desired for disposable containers. Control of the design of the hydraulically settable compositions on the microstructural level has come, in part, from the discovery that during formation of an object either (a) the rheology of the composition should be chemically modified to give moldability and rapid form stability, or (b) the water to cement ratio of the composition should be reduced by processing or by the addition of energy.

The result is the ability to mass produce on a commercially viable scale a wide variety of containers and articles (including many which are disposable) from hydraulically settable materials at a cost that is usually competitive with, and in most cases even superior to, the cost involving using other materials. Moreover, because the hydraulically settable materials of the present invention comprise environmentally neutral components, the manufacture of containers and articles therefrom impacts the environment to a much lesser extent than does the manufacture of containers from these other materials. The hydraulically settable materials of the present invention preferably do not require the use of high concentrations of wood pulp or petroleum products as does the manufacture of containers from paper, cardboard, plastic, polystyrene, or metals.

The major components within the hydraulically settable materials of the present invention include mainly inorganic materials, such as a hydraulic binder (like cement or gypsum), aggregates (like perlite, sand, glass, silica, vermiculite, clay, mica, and even waste concrete products), and sufficient water to hydrate, or react with, the hydraulic binder.

Although certain embodiments may also include organic components, such as cellulose-based fibers and/or rheology-modifying agents, these represent a small fraction of the overall mass of the hydraulically settable materials used to manufacture containers. Together, the organic components will make up usually less than about 30% by volume of the unhardened hydraulically settable mixture; preferably, this fraction will be less than about 15% by volume.

However, due to the versatility of the hydraulically settable mixtures used in the manufacture of containers and other objects, a wide range of fibers, both organic and inorganic, can be used. Any abundant fiber, not just wood fiber, but preferably those that can be planted and harvested in an agribusiness setting, works well within the invention. The use of such fibrous materials would have the additional beneficial effect of preserving our dwindling forests.

In any event, natural fibers from, e.g., wood, flax, abaca, hemp, cotton, and bagasse are preferred. Because they are held together with a hydraulic binder, they do not require the intense processing used to make most paper or cardboard products. Such processes are necessary in the paper industry in order to release the lignin within the wood pulp and to fray the fibers in order to achieve a web effect between the fibers in order to bind the fibers together. No such intense processing is necessary in the present invention, which to a major extent preserves the strength of the fibers and allows them to be included in far lesser amounts while still deriving a high level of strength therefrom.

Hence, the advantages of fibers can be incorporated into a hydraulic binder, with the addition of smaller concentration and without the extensive processing as in paper. Further, contaminated water is not a significant byproduct in the processing of the present invention as it is in the case of paper production.

Unlike the manufacture of plastic or polystyrene, the hydraulically settable materials of the present invention utilize little or no petroleum-based products or derivatives as starting materials. Thus, although some amount of fossil fuel is necessary to generate the energy used in manufacturing the hydraulically settable containers, only a fraction of the petroleum used in the manufacture of polystyrene or plastic products will be consumed overall. In addition, the energy requirements of the present invention are much less than the energy requirements of paper manufacturing; similarly, the initial capital investments can be less with the present invention.

Finally, another advantage of the hydraulically settable containers of the present invention is that their disposal impacts the environment less than paper and cardboard products, and much less than plastic or polystyrene products. The hydraulically settable materials of the present invention can be readily recycled. Nevertheless, even if not recycled, the hydraulically settable containers of the present invention can be discarded and reduced to a fine granular powder which has a composition complementary to the components of the earth into which it will be placed.

This disintegration process is not dependent on biodegradation forces but will occur as the result of various forces which may be present, such as moisture and/or pressure. For example, the rheology-modifying agent will dissolve over time through exposure to water, thereby creating voids within the matrix of the material. These voids make the material soft and easier to crush. In addition, both the rheology-modifying agent and the cellulose fibers are biodegradable (i.e., subject to breakdown by microorganisms, heat, light, and water).

If the hydraulically settable waste materials are discarded into a landfill, they will crumble into a fine granular powder under the weight of the other garbage present, thereby increasing the specific surface area available for further biodegradation and erosion. If discarded on the ground, the forces of water and wind, and even fortuitous compressive forces such as from cars running over them or people stepping on them, will cause the hydraulically settable waste materials to be reduced to a substantially inorganic, more innocuous granular powder in a short period of time relative to the time it usually takes for the typical disposable paper or polystyrene foam cup to decompose under the same circumstances.

A plastic or metal article thrown into a lake or stream will last for decades, perhaps even centuries, while a hydraulically settable article will dissolve in a short period of time into essentially a dirt-like sand or mud, the time of dissolution being dependent largely on the mix design of the hydraulically settable mixture used to manufacture the article.

The preferred structural matrix of the articles and containers manufactured according to the present invention is formed from the reaction products of a cementitious or other hydraulically settable mixture. A hydraulically settable mixture will at a minimum contain a hydraulic binder, such as hydraulic cement or gypsum hemihydrate, and water.

In order to design the desired specific functional properties into the hydraulically settable mixture and/or the hardened structural matrix for a specific container, a variety of other additives can be included within the hydraulic mixture, such as rheology-modifying agents, dispersants, one or more aggregate materials, fibers, air entraining agents, blowing agents, or reactive metals. The identity and quantity of any additive will depend on the desired properties or performance criteria of both the hydraulically settable mixture as well as the final hardened container made therefrom.

Rheology-modifying agents can be added to increase the cohesive strength, "plastic-like" behavior, and the ability of the mixture to retain its shape when molded or extruded. They act as thickeners and increase the yield stress of the hydraulically settable mixture, which is the amount of force necessary to deform the mixture. This creates high "green strength" in the molded or extruded product. Suitable rheology-modifying agents include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating a charged area on the particle surface or in the near colloid double layer.

In the case where both a rheology-modifying agent and a dispersant are used, it will usually be advantageous to add the dispersant first and the rheology-modifying agent second in order to obtain the beneficial effects of each. Otherwise, if the rheology-modifying agent is first adsorbed by the binder particles, it may create a protective colloid layer, which will prevent the dispersant from being adsorbed by the particles and imparting its beneficial effect to the hydraulically settable mixture.

It may be preferable to include one or more aggregate materials within the hydraulically settable mixture in order to add bulk and decrease the cost of the mixture. Aggregates often impart significant strength properties and improve workability. An example of one such aggregate is ordinary sand or clay, which is completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight, rocklike materials. These aggregates are likewise environmentally neutral and relatively inexpensive.

Fibers may be added to the hydraulically settable mixture in order to increase the compressive, tensile, flexural, and cohesive strengths of the wet material as well as the hardened container made therefrom. Fiber should preferably have high tear and burst strengths (i.e., high tensile strength), examples of which include abaca, southern pine, flax, bagasse (sugar cane fiber), cotton, and hemp. Fibers with a high aspect ratio work best in imparting strength and toughness to the hydraulically settable material.

One significant aspect of the present invention is that the articles and containers can be economically and mass producibly manufactured. The products disclosed herein are not intended to be handmade at the rate of a few at a time, but are intended to be made at the rate of hundreds, thousands, or tens of thousands per hour. The creation of new materials that can be rapidly processed in such a manner (that is, similar to paper, plastic, or metals) comes from utilization of one of the following approaches during the manufacturing process: (a) chemically modifying the hydraulically settable mixture (such as by the addition of a rheology-modifying agent) in order to give the mixture workability and then rapid form stability, or (b) reducing the water to cement ratio during the formation process (such as by the addition of energy in the form of heat or pressure). The application of these principles will become readily apparent from the following methods of manufacture.

The hydraulically settable articles of the present invention are obtained by the following steps. First, a hydraulically settable mixture is prepared. The components of the mixture are selected by a microstructural engineering approach so that the resulting mixture has desired properties. The components are preferably combined in a mixer extruder but can also be combined through conventional high energy and normal mixers.

Second, the mixture having the desired characteristics is extruded through a die, for example, a double or single auger- or piston-type extruder, into thin sheets of a predetermined thickness. In one embodiment, a vacuum is attached to the auger to remove excess air from the mixture.

Third, the extruded sheets are "calendered" by passing them between a set of reduction rollers to form sheets with a more uniform thickness and a smoother surface. The rollers can be heated to create a steam barrier that minimizes adherence between the rollers and hydraulically settable mixture. Heating the rollers also has the effect of driving off a portion of the water within the sheets. Likewise, the rollers can also be cooled to prevent sticking of the mixture. In some cases it may be preferable to pass the sheets through a series of sets of rollers having progressively smaller distances between the sets of rollers to obtain a calendered sheet having a progressively thinner thickness.

In addition, by using a pair of rollers having different orientations in the "Z" direction (or normal to the surface of the sheet), such as by using a flat roller paired with a conical roller, a percentage of the fibers oriented in the "Z" plane can be oriented in the "X" (or width-wise) direction. In this way a sheet having bidirectionally oriented fibers can be manufactured. Sheets having bidirectionally aligned fibers produce containers having a more uniform strength.

Fourth, a portion of the sheet in the green state is then fashioned into a desired shape for a container or article. This is preferably accomplished by pressing the sheet between a male die of a desired shape and a female die having a substantially complementary configuration of the male die shape. Alternative types of dies that can be used include split dies and progressive dies. The containers can also be formed by applying one of many vacuum forming techniques to the hydraulically settable sheets.

Fifth, to economically produce the containers and articles, the fashioned containers must quickly obtain form stability. In one embodiment, the dies are each heated to a predetermined temperature so as to rapidly dry the surface of the container, thereby creating a form-stable container. As with the rollers, heating the dies also functions to form a steam barrier that minimizes the adhering of the container to the dies. Additional methods such as cooling the dies or adding a non-hydrating liquid that rapidly evaporates can also be used to quickly impart form stability to the containers. Still other methods used to impart form stability include the addition of carbon sources, accelerators, methyl cellulose, starch, and fibers to the mixture or limiting the amount of water in the mixture.

Sixth, the containers are then passed through a drying tunnel to evaporate additional amounts of water within the container, thereby increasing the strength and improving the form stability of the container. The heat imparted by the drying tunnel also increases the rate of hydration of the hydraulic cement and reduces the time in which the cementitious matrix ultimately cures.

Finally, the containers are cut from the remaining sheet and are optionally sprayed with an appropriate coating material. In addition, they may receive some form of printing, usually by means of an offset printer.

In an alternative embodiment, the hydraulically settable sheet can have the printing and coating applied to it prior to the formation of the container. Typically, this requires that the sheet be sufficiently dried or hardened to receive the printing and coating without deformation. Once the coating or printing is applied, the sheet is then rewetted to impart the desired flexibility and workability necessary to subsequently form the desired container without rupturing the sheet.

Additional embodiments of the present invention include the addition of air voids in order to add insulative properties to the containers. These air voids are created by the incorporation of gas through various techniques into the cementitious mixture—one method being the mechanical incorporation of air voids during the mixing process, and another being the incorporation of a gas which is chemically generated in situ within the cement paste.

The compositions of the present invention can be varied to yield products of substantially different character. For example, very lightweight products (similar to that of polystyrene foam) with rigid walls can be manufactured. For convenience, this first type of product is sometimes herein referred to as a "foam-like" product.

Alternatively, products that have an appearance more like that of a pottery or ceramic product can be made according to the present invention. However, the products of the present invention can be made much lighter, typically having a bulk specific gravity less than about 1.5, whereas pottery or ceramic products typically have a bulk specific gravity of 2.0 or greater. However, the mixtures of the present invention can be selectively designed to produce products having a bulk specific gravity of about 2 or even as high as 3. This second type of product of the present invention is sometimes herein referred to as a "clay-like" product, because it is a zero-slump, form stable hydraulically settable material that still has excellent workability properties.

A key feature of the microstructural engineering design of the present invention is the materials science optimization of each desired property (including minimization of cost). It is only because of the unique microstructural engineering of the present invention that the cementitious mixtures can be molded into a thin-walled, complex, lightweight product such as a food and beverage container and still maintain its shape without external support during the green state until hardening can be accomplished.

Indeed, the economic viability of mass producing articles and containers from cementitious materials is only possible because the cementitious mixture is self-supporting during the green state and will maintain its molded state throughout the curing process. In addition, the compositions of the present invention importantly provide cementitious mixtures that rapidly reaches a sufficiently high tensile and compressive strengths so that the molded containers can be handled and manipulated using conventional means.

From the foregoing, it will be appreciated that an object of the present invention is to provide methods and systems for manufacturing hydraulically settable articles that have properties similar to articles presently made of paper, plastic, metal, and glass.

It is also an object of the present invention to provide methods and systems for mass producing the above containers and articles at a cost that is comparable to and even less expensive than existing containers.

Another object of the present invention is to provide methods and systems for the manufacture of hydraulically settable articles which can be molded from materials which will rapidly gain form stability and maintain their shape in the green state without external support.

Still another object of the present invention is to provide methods and systems for manufacturing hydraulically settable sheets that can be drawn for fashioning and shaping articles similar to plastic.

Yet another object of the present invention is to provide methods and systems for manufacturing articles which do not result in the generation of pollutants and wastes like those involved in the manufacture and disposal of paper, cardboard, plastic, polystyrene, or metal containers.

An additional object of the present invention is to provide methods and systems for forming hydraulically settable articles that do not adhere to the forming apparatus.

Still another object and feature of the present invention is to provide methods of manufacture which are less energy intensive, conserve valuable natural resources, and require lower initial capital investments.

Finally, it is yet another object of the present invention to provide methods and systems for forming hydraulically settable articles that have sufficient form stability to be handled without deformation directly after forming.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 17 is a schematic view of snapback vacuum forming.

FIG. 18 is a schematic view of billow/air-slip vacuum forming.

FIG. 23 is a side view comparing the effects of sheet reduction.

DETAILED DESCRIPTION OF THE PREFERRED EMBODIMENTS

Figure 1:
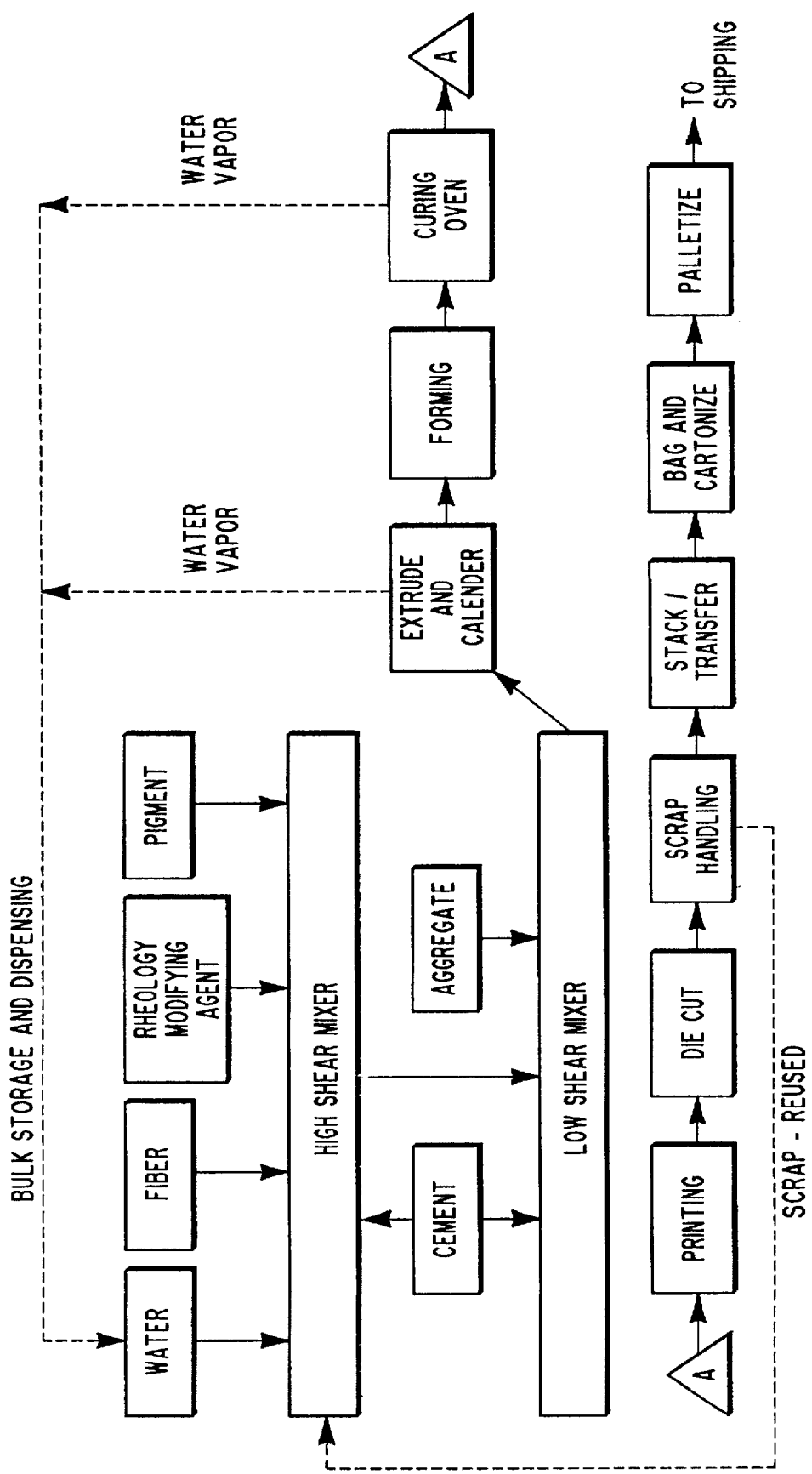
FIG. 1 is a flow diagram of an assembly system for mass producing hydraulically settable containers.

The present invention relates to manufacturing articles of manufacture, primarily containers for use in packaging, storing, shipping, or dispensing various types of products or objects (such as food and beverage products) for which materials such as paper, plastic, glass, and metal have previously been used. More particularly, the present invention includes novel methods and systems for forming a hydraulically settable mixture into flat sheets that are subsequently pressed into form stable articles of a desired shape while the hydraulically settable mixture is still in the green state. The article is then dried and finished, such as by trimming and applying a coating or printing, in preparation for its intended use.

The mixture used in manufacturing the present articles is selectively designed using a materials science and microstructural engineering approach that permits the economic production of a cementitious material having a relatively high elongation and high yield stress with good flow (low viscosity) characteristics for forming thin-walled, lightweight, insulative, high tensile and flexural strength, and environmentally compatible containers and articles. The methods and systems within the scope of the present invention are particularly useful for manufacturing disposable containers and cups for use in dispensing food and beverages.

A. General Discussion

Hydraulic cement products and the methods of utilizing various hydraulic cements have literally been known for millennia. The types of such cementitious products which have been made over the centuries are various and numerous. However, these products are similar in that they are extremely bulky and require significant size and mass in order to achieve the desired strength and other performance criteria.

While the types of cementitious products have varied over the years, the methods of manufacturing such products have not. Essentially all processes require pouring the cement mixture into forms and then allowing extensive time for the products to set and cure. Once the product has substantially cured, the forms can be removed, and the process repeated for the next product.

Accordingly, under traditional processing techniques of standard concrete, it is impossible, due to the required curing or "form stability" period, to rapidly and economically mass produce cementitious articles. More importantly, it is not even feasible using traditional processing techniques to produce lightweight, small capacity containers having sufficient strength and other properties necessary to make them functional for the uses disclosed herein.

As mentioned above, containers and articles of the present invention have been developed from the perspective of microstructural engineering in order to build into the microstructure of the hydraulically settable material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of rheology (or the forming state) strength, weight, insulation, cost, and environmental neutrality (in the final state) that are necessary for the manufacturing and use of the articles and containers of the present invention in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). Partially, it is this specialization and conservative thinking that has limited the consideration of using hydraulically settable materials for a variety of products, such as in connection with the food and beverage industry.

Nevertheless, once it is realized that hydraulically settable materials have such a wide utility and can be designed and microstructurally engineered, then their applicability to a variety of possible products becomes obvious. Hydraulically settable materials have an additional advantage over other conventional materials in that they gain their properties under relatively gentle and nondamaging conditions. (Other materials require high energy or severe heat or harsh chemical processing that significantly affects the material components.) Therefore, many non-hydraulically settable materials can be incorporated into hydraulically settable materials with surprising synergistic properties or results if properly designed and engineered.

The design of the compositions of the present invention has been developed and narrowed, first by primary constraints dictated by the design, and then by seeking the subset of materials which maximize the performance of the components. At all times during the process, however, it is important to realize the necessity of designing products which can be manufactured in a cost-competitive process.

Primary constraints in materials selection are imposed by characteristics of the design of a component which are critical to a successful product. With respect to a cup or container, those primary constraints include minimal weight, strength (both compressive and tensile), and toughness requirements, while simultaneously keeping the costs to those comparable to paper, plastic, glass and metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach a substantial degree of their optimum strength. Even with expensive "set accelerators," this strength gain occurs over a period of days. Such time periods are certainly impractical for the economic mass production of disposable containers and similar products.

As a result, an important feature of the present invention is that when the hydraulically settable mixture is molded, it will maintain its shape (i.e., support its own weight subject to minor forces, such as gravity and movement through the processing equipment) in the green state without external support. Further, from a manufacturing perspective, in order for production to be economical, it is important that the molded container (or sheet used to make a container) rapidly (in a matter of minutes, or even seconds) achieve sufficient strength so that it can be handled using ordinary manufacturing procedures, even though the hydraulically settable mixture may still be in a green state and not fully hardened.

Another advantage of the microstructural engineering approach of the present invention is the ability to develop compositions in which cross-sections of the structural matrix are more homogeneous than have been typically achieved in the prior art. Ideally, when any two given samples of a volume at about 0–5 $n^3$, where "n" is the cross-section of the wall of the article, of the hydraulically settable structural matrix are taken, they will have substantially similar amounts of voids, aggregates, fibers, any other additives, and properties of the matrix.

In its simplest form, the process of using materials science in microstructurally engineering and designing a hydraulically settable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the same of the particles) is determined, and the strength of the particles is ascertained.

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system that fills or more than fills the spaces between the "macro" particles. By modification of the lubricants (which may be water, rheology-modifying agents, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed rough cement particles will interact with the lubricants differently.

Finally, the manufacturing processing can be modified to manipulate the balance between workability and form stability. As applied to the present invention, this becomes important in significantly increasing the yield stress during formation of the article of manufacture by either chemical additive (such as by adding a rheology-modifying agent) or by adding energy to the system (such as by heating the molds). Indeed, it is this discovery of how to manipulate the hydraulically settable compositions in order to easily form and then quickly increase the form stability of the compositions during the formation process that make the present invention such a significant advancement in the art.

From the following discussion, it will be appreciated how each of the component materials within the hydraulically settable mixture, as well as the processing parameters, contributes to the primary design constraints of the article or container so that they can be economically mass produced. Specific compositions are set forth in the examples given later in order to demonstrate how the maximization of the performance of each component accomplishes the combination of desired properties.

B. Articles of Manufacture

The present invention is directed to the manufacturing of articles of manufacture, primarily containers. The term "article" or "article of manufacture" as used in the specification and appended claims, is intended to include all goods that can be fashioned, such as by die pressing or vacuum forming, from a sheet of hydraulically settable material as disclosed herein. Such articles include, but are not limited to, goods that are currently manufactured from sheets of paper, plastic, styrofoam, metal, and composites.

The terms "container" or "containers," as used in this specification and the appended claims, are intended to include any receptacle or vessel utilized for packaging, storing, shipping, serving or dispensing various types of products or objects (including but not limited to food and beverage products), whether such use is intended to be for a short-term or a long-term duration of time. Examples of such containers include boxes, hot and cold cups, vending plates, jars, clam shells, french fry containers, meat packaging platters, breakfast plates, substantially spherical objects, bottles, cartons, cases, crates, dishes, egg cartons, lids, straws, cutlery or other types of objects. In short, the "container" should be capable of holding its contents, whether stationary or in movement or handling, while maintaining the integrity of itself and the materials contained therein. This does not mean that the container is required to be used in shipping goods, or that it must be capable of withstanding the forces often encountered when goods are actually shipped from one location to another. The container should, however, be capable of containing the goods when lifted and placed in another location.

The container should also be capable of containing its goods and maintaining its integrity for a sufficient period of time to satisfy its intended use. It will be appreciated that, under certain circumstances, the container may seal the contents from the external environments and in other circumstances may merely hold or retain the contents.

In addition to integrally formed containers, containment products used in conjunction with the containers are also intended to be included within the term "containers." Such products include, for example, lids, liners, partitions, wrappers, cushioning materials, and any other object used in packaging storing, shipping, portioning, serving, or dispensing an object within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material (i.e., without causing significant extraordinary environmental hazards).

Containers are the preferred article of manufacture of the present invention and, as such, are referenced extensively throughout the specification. Furthermore, containers are used as an example in describing the steps and systems of manufacturing. It should be noted, however, that the term "container" is used only by way of example and not by limitation and that its use is intended to include any "article" of manufacture covered by the present invention.

C. Methods for Production of the Present Invention

The following is a detailed discussion of each of the steps for the production of the inventive containers.

The underlying goal of the present invention is to create methods and systems for rapidly shaping and forming a hydraulically settable mixture into a lightweight, thin-walled, form-stable, container or article of manufacture that can subsequently be handled even in the green state (immediately or shortly after the shaping process) without the support of a mold. Articles or containers that do not require the use of a mold during the curing process can be mass produced so as to make them economical and satisfy commercial manufacturing criteria.

The present invention accomplishes its goal through the steps of (1) preparing a hydraulically settable mixture including the components of hydraulically settable binder, water and selective additives, such as a rheology-modifying agent, aggregates, and fibers; (2) extruding the mixture into a sheet having sufficient tensile strength to be drawn; (3) feeding the sheet between at least one set of rollers to form the sheet into the desired thickness; (4) fashioning a portion of the sheet into a desired shape for a container or desired article of manufacture; (5) imparting form stability to the container while the mixture is in the green state; (6) drying the mixture to gain strength in the desired shape of the container; and, when desirable, (7) applying a coating so as to finish the surface of the container and make it water resistant; (8) fixing desired print on to the container; and finally, (9) cutting the container from the remainder of the sheet for subsequent packaging and transport of the container.

Step One: Preparing the Hydraulically Settable Mixture

The first step in the method of manufacturing is preparing a hydraulically settable mixture. The composition of the mixture is preferably determined through a materials science and microstructural engineering approach. This approach is discussed in greater detail in the currently pending United States patent applications entitled "Cementitious Food and Beverage Storage, Dispensing, and Packaging Containers and The Methods of Manufacturing Same," Ser. No. 07/929,898, filed Aug. 11, 1992, in the names of Per Just Andersen, Ph.D., and Simon K. Hodson; "Cementitious Materials For Use in Packaging Containers and Their Methods of Manufacture," Ser. No. 08/019,151, filed Feb. 17, 1993, in the names of Per Just Andersen, Ph.D., and Simon K. Hodson; "Cementitious Materials for Use In Cushioning, Spacing, Partitioning, Portioning, Or Wrapping Objects And The Methods Of Manufacturing Such Materials," Ser. No. 08/018,773, filed Feb. 17, 1993, in the names of Per Just Andersen, Ph.D., and Simon K. Hodson now abandoned; and "Laminate Insulation Barriers Having A Cementitious Structural Matrix And Methods For Their Manufacture," Ser. No. 08/027,451, filed Mar. 8, 1993, in the names of Per Just Andersen, Ph.D., and Simon K. Hodson now abandoned. For purposes of disclosure, the above-referenced patent applications are incorporated herein by specific reference. While reference to the foregoing applications will provide greater detail, the following summary is helpful and is believed to be satisfactory for the general understanding of the present invention.

As previously discussed, microstructural engineering is the process of building into the microstructure of composition certain desired, predetermined properties. In turn, these desired properties are exhibited in the final product. Such a process permits one skilled in the art to select components, as well as their relative concentrations, in order to obtain a hydraulically settable mixture having desired properties and minimum cost.

Some of the properties considered to be generally desirable with regard to the hydraulically settable mixtures are adequate workability, plastic-like qualities, and green strength for a given extrusion, rolling, and/or molding process. As discussed below in greater detail, the level of water, rheology-modifying agent, and (optionally) dispersant will determine the level of workability and extrudability of the mixture, as will the other components within the mixture, such as aggregates, fibers, set accelerators, etc. Based on the teachings incorporated herein by specific reference, one skilled in the art will be able to adjust the identities and amounts of the various components in order to optimize the workability, plastic-like behavior, and green strength necessary to carry-out any particular sheet forming or die pressing process.

With regard to the final cured or hardened product, some of the properties considered generally desirable to design into the structural matrix of the container include high tensile strength (in general or along particular vectors), flexural strength, flexibility, and ability to elongate, deflect or bend. In some cases it may be desirable to obtain containers or articles which substantially incorporate the properties of existing paper, plastic, or cardboard products. However, in other cases it may be desirable to obtain a structural matrix having properties not obtainable using ordinary wood pulp or other traditional paper-making starting materials. These may include increased rigidity, toughness, higher modulus of elasticity, water resistance or lower bulk density.

The flexibility, tensile strength, flexural strength, or modulus of elasticity can be tailored to the particular performance criteria of the sheet, container, or other object in question by adjusting the components and relative concentrations of the components within the hydraulically settable mixture. In some cases higher tensile strength may be an important feature. In others it may be less significant. Some containers should preferably be more flexible while others will be stiff. The important thing is to achieve a material which has properties adequate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

The hydraulically settable articles and containers formed using the compositions described above will preferably have a tensile strength within the range from about 0.05 MPa to about 75 MPa, and more preferably within the range from about 1 MPa to about 30 MPa and most preferably in a range from about 3 MPa to about 15 MPa. In addition, the containers will preferably have a bulk density within the range from about 0.1 g/cm$^3$ to about 3 g/cm$^3$ and more preferably in a range from about 0.5 g/cm$^3$ to about 2.0 g/cm$^3$. Whether a container will have a density at the lower, intermediate, or higher end of this range will generally depend on the desired performance criteria for a given usage. Finally, the hydraulically settable articles and containers of the present invention will preferably have a tensile strength to bulk density ratio within the range from between about 1 MPa-cm$^3$/g to about 150 MPa-cm$^3$/g, and more preferably within the range from between about 3 MPa-cm$^3$/g to about 50 MPa-cm$^3$/g.

One of the important properties of the present invention is the ability of the hydraulically settable sheet to be elongated or drawn during the formation of the desired article. The term "elongate" as used in the specification and appended claims with regard to the hydraulically settable sheet means that the structural matrix of the sheet is capable of being stretched without rupturing and still have a finished surface. In other words, the structural matrix of the sheet is capable of moving or changing shape without rupture or tearing by application of a force such as pulling, pressing, or stretching. The ability of the structural matrix of the sheet to elongate before rupture is measured by an Instron tensile test and a stress strain test.

By optimizing the mix design it is possible to manufacture a sheet which has a structural matrix capable of elongating within the range from about 0.5% to about 10% before tearing or rupturing occurs. This is usually accomplished by optimizing the amount of fiber and/or rheology-modifying agent within the hydraulically settable mixture. To produce a sheet which is capable of elongating within the specified range, fibers can be added to the mixture in a range between about 0.2% and about 50% by volume of the hydraulically settable mixture. In an alternative embodiment, such a sheet can also be formed by adding a rheology-modify agent to the mixture in a range between about 0.1% and about 20% by volume of the mixture. Of course, various combinations of the fibers and rheology-modifying agent can also be used.

The ability to elongate or be drawn allows the hydraulically settable sheet to be formed and molded by conventional processes used with forming paper, plastic, or metal objects. Through such processes, the hydraulically settable sheets are capable of being formed into articles that were once limited to materials such paper, plastics and the like.

In order to prepare a desired hydraulically settable mixture, the fiber, water, rheology-modifying agent and other additives are preferably blended together in a high shear mixer in order to form a well-dispersed, homogeneous mixture. In some cases it may be preferable to also add the hydraulic binder, as well as certain lower concentration aggregates such as mica, during the high shear mixing step. High shear mixing is used for the addition of fibrous material to insure that the fibrous materials are well dispersed throughout the mixture. This results in a more uniformly blended mixture, which improves the consistency and cohesion of the uncured mixture as well as increasing the strength of the final cured product.

The addition of fibers by normal cement-mixing techniques can result in the conglomeration of the fibers, leading to deformities in the resulting containers or articles. Standard mixers, such as drum mixers, combine the components of the desired mixture by applying low energy stirring or rotating to the components. In contrast, high-shear energy mixers are comparable to heavy duty blenders that are capable of rapidly blending the mixture so as to apply high shearing forces on the particles of the hydraulically settable materials and the added fibers. As a result, the fibers and other additives are uniformly dispersed throughout the mixture, thereby permitting a homogenous structure for the subsequent containers.

For the purposes of disclosure and understanding such high shear energy mixers and their methods of use, U.S. Pat. No. 4,225,247 entitled "Mixing and Agitating Device," U.S. Pat. No. 4,552,463 entitled "Method and Apparatus For Producing A Colloidal Mixture," U.S. Pat. No. 5,061,319 entitled "Process for Producing Cement Building Material," U.S. Pat. No. 4,944,595 entitled "Apparatus for Producing Cement Building material," and U.S. Pat. No. 4,889,429 entitled "Rotary Mill" are incorporated herein by specific reference. Furthermore, mixers such as the Eirich Rv-11 are common in the art and are considered high-shear energy mixers.

It is also preferred that rheology-modifying agents be added to the mixture through high-shear energy mixing. The rheology-modifying agents tend to agglomerate into balls of gel as they are initially combined with the mixture. High-shear energy mixing is useful in dispersing the agents uniformly throughout the mixture such that the mixture has a consistent plasticity.

Thereafter, aggregates included in higher concentrations (and sometimes the hydraulic binder) are blended into the mixture using a conventional low shear mixer. This is particularly true where lightweight aggregates are added which cannot withstand high shear conditions without breaking, such as perlite or hollow glass spheres. One method for low shear mixing is using the auger associated with the extruding process to combine the hydraulic binder, aggregate, and previously mixed additives. Whether or not the hydraulic binder is added during the steps of high or low shear mixing depends on the nature of the hydraulic binder as well as how the mixture is handled.

In alternative embodiments, other additives such as air entraining agents and reactive metals can be incorporated into the mixture in order to obtain a final material with lower density and higher insulating ability. It is preferable that the size of the aggregates not exceed 25% of the final matrix since oversized aggregates could damage the rollers and create flaws within the sheet surface.

As previously discussed the types and quantities of admixtures incorporated into a mixture depends on the desired properties of both the wet mixture and the hardened container. Below is a discussion of each of the components in the hydraulically settable mixture.

a. Hydraulically Settable Materials

The materials used to manufacture the containers and articles of the present invention develop strength through the chemical reaction of water and a hydraulic binder, such as hydraulic cement, calcium sulfate (or gypsum) hemihydrate, and other substances which harden after being exposed to water. The term "hydraulically settable materials" as used in this specification and the appended claims includes any material whose structural matrix and strength properties are derived from a hardening or curing of a hydraulic binder.

The terms "hydraulically settable materials," "hydraulic cement materials," "cementitious materials," "hydraulically settable mixtures," and "mixtures" as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products.

The terms "hydraulically settable binder" or "hydraulic binder" as used in this specification and the appended claims are intended to include any inorganic binder such as hydraulic cement, gypsum hemihydrate, or calcium oxide which develops strength properties and hardness by chemically reacting with water and, in some cases, with carbon dioxide in the air and water. The hydraulically settable binders used in the present invention are to be distinguished from other cements or binders such as polymerizable, water insoluble organic cements, glues, or adhesives. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), calcium aluminate cements (including calcium aluminate cements without set regulators), plasters, silicate cements (including β-dicalcium silicates, tricalcium silicates, and mixtures thereof), gypsum cements, phosphate cements, high alumina cements, microfine cements, slag cements, magnesium oxychloride cements, Pyrament, MDF, "densit-type" cements, and aggregates coated with microfine cement particles.

The term "hydraulic cement" is also intended to include other cements known in the art, such as a-dicalcium silicate, which can be made hydraulic under hydrating conditions within the scope of the present invention. The basic chemical components of the hydraulic cements within the scope of the present invention usually include $CaO$, $SiO_2$, $Al_2O_3$, $Fe_2O_3$, $MgO$, $SO_3$, in various combinations thereof. These react together in a series of complex reactions to form insoluble calcium silicate hydrates, carbonates (from $CO_2$ in the air and added water), sulfates, and other salts or products of calcium and magnesium, together with hydrates thereof. The aluminum and iron constituents are thought to be incorporated into elaborate complexes within the above mentioned insoluble salts. The cured cement product is a complex matrix of insoluble hydrates and salts which are complexed and linked together much like stone, and are similarly inert.

Hydraulically settable compositions are typically formed by mixing a hydraulic binder or combinations thereof (such as hydraulic cement) and water; the resulting mixture may be referred to as a "hydraulic paste" (or "cement paste"). The hydraulic binder and water are mixed either simultaneously or subsequently, with some sort of aggregate blended to form a "hydraulically settable mixture." Mortar and concrete are examples of hydraulically settable mixtures formed by mixing hydraulic cement, water, and some sort of aggregate, such as sand or rock.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important as other characteristics (e.g., the rate of hardening) in some applications. In terms of cost, gypsum and calcium oxide have an advantage over hydraulic cement, because they are somewhat less expensive. Moreover, in the case where the hydraulically settable material contains a relatively high percentage of weak, lighter weight aggregates (such as perlite), the aggregates will often comprise a "weak link" within the structural matrix. At some point, adding a stronger binder may be inefficient because the binder no longer contributes its higher potential strength due to a high content of weaker aggregates.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form stability of the hydraulically settable material in the green state.

As mentioned above, preferable hydraulic binders include white cement, portland cement, microtine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

The present invention may include other types of cementitious compositions such as those discussed in co-pending patent application Ser. No. 07/981,615, entitled "Methods of Manufacture and Use For Hydraulically Bonded Cement" filed Nov. 25, 1992, in the names of Hamlin M. Jennings, Ph.D., Per Just Andersen, Ph.D., and Simon K. Hodson now U.S. Pat. No. 5,358,676, which is a continuation-in-part of patent application Ser. No. 07/856,257 filed Mar. 25, 1992, in the names of Hamlin M. Jennings, Ph.D. and Simon K. Hodson now abandoned, and entitled "Hydraulically Bonded Cement Compositions and Their Methods of Manufacture and Use" which is a file wrapper continuation of patent application Ser. No. 07/526,231 filed May 18, 1990, in the names of Hamlin M. Jennings, Ph.D. and Simon K. Hodson now abandoned, and entitled "Hydraulically Bonded Cement Compositions and Their Methods of Manufacture and Use" and now abandoned. In these applications, powdered hydraulic cement is placed in a near net final position and compacted prior to the addition of water for hydration. For purposes of disclosure, the forgoing patent applications are incorporated herein by specific reference.

Additional types of hydraulic cement compositions include those wherein carbon dioxide is mixed with hydraulic cement and water. Hydraulic cement compositions made by this method are known for their ability to more rapidly achieve green strength. This type of hydraulic cement composition is discussed in copending patent application Ser. No. 07/418,027 filed Oct. 10, 1989, in the names of Hamlin M. Jennings, Ph.D. and Simon K. Hodson now U.S. Pat. No. 5,232,496, and entitled "Process for Producing Improved Building Material and Products Thereof," wherein water and hydraulic cement are mixed in the presence of a carbonate source selected from the group consisting of carbon dioxide, carbon monoxide, carbonate salts, and mixtures thereof. For purposes of disclosure, the foregoing patent is incorporated herein by specific reference.

In many situations, it may not be desirable for the container or article to be water soluble. Unfortunately, certain materials which might be desirable to incorporate into such containers dissolve in water. An important advantage of using a hydraulically settable mixture is that the resulting structural matrix is generally water insoluble (at least over the period of time during which use of the product is intended), which allows it to encapsulate the water soluble aggregates or other materials added to the hydraulically settable mixture. Hence, an otherwise water soluble component can be incorporated into the greatly insoluble hydraulically settable matrix and impart its advantageous properties and characteristics to the final product.

Nevertheless, in order to design a disposable container which will more readily decompose or disintegrate after it has fulfilled its intended use, it may be desirable for the container to break down in the presence of water or moisture. One of the advantages of the microstructural engineering approach of the present invention is the ability to design into the hydraulically settable structural matrix the desired properties of water resistance or solubility. In order to obtain a container that readily decomposes in the presence of water, it will generally be necessary to decrease the amount of hydraulic binder within the material. Hence, the degree of water solubility or insolubility is generally related to the concentration of hydraulic binder, particularly hydraulic cement, within the hydraulically settable mixture. In most cases, adding more hydraulic binder will make the container less soluble in water.

The term "form stable," as used in the specification and the appended claims, means that the container or article is mechanically self-supporting without significant deformation, i.e., can maintain its shape indefinitely against the force of gravity without any exterior support such as a mold.

The terms "hydraulically settable compositions" or "hydraulic compositions," as used herein, are intended to broadly define compositions that contain both a hydraulically settable material and water, regardless of the extent of hydration or curing that has taken place. Hence, it is intended that the term "hydraulically settable compositions" shall include paste or mixtures in a green (i.e., unhardened) state, as well as dried hydraulically settable products.

b. Hydraulic Paste.

In each embodiment of the present invention, the hydraulic paste or cement paste is the key constituent which eventually gives the container or article the ability to "set up" and develop strength properties. The term "hydraulic paste" shall refer to a hydraulic binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials has been added, whether in the green state or after it has hardened and/or cured. The other ingredients added to the hydraulic paste serve the purpose of altering the properties of the unhardened, as well as the final hardened product, including, but not limited to, strength, shrinkage, flexibility, bulk density, insulating ability, color, porosity, surface finish, and texture.

Although the hydraulic binder is understood as the component which allows the hydraulically settable material to set up, to harden, and to achieve much of the strengthened properties of the material, certain hydraulic binders also aid in the development of better early cohesion and green strength. For example, hydraulic cement particles are known to undergo early gelling reactions with water even before it becomes hard; this can contribute to the internal cohesion of the mixture.

It is believed that aluminates, such as those more prevalent in portland grey cement (in the form of tricalcium aluminates) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., cohesion and plasticity) of hydraulically settable materials made therefrom. As set forth more fully below, additives such as fibers and rheology-modifying agents can make substantial contributions to the hydraulically settable materials in terms of tensile, flexural, and compressive strengths. Nevertheless, even where high concentrations of fibers and/or rheology-modifying agents are included and contribute substantially to the tensile and flexural strengths of the hardened material, it has been shown that the hydraulic binder nevertheless continues to add substantial amounts of compressive strength and other important properties to the final hardened material. In the case of hydraulic cement, it also substantially reduces the solubility of the hardened material in water.

The percentage of hydraulic binder within the overall mixture varies depending on the identity of the other added constituents. However, the hydraulic binder is preferably added in an amount ranging from between about 5% to about 90% as a percentage by weight of the wet hydraulically settable mixture. From the disclosure and examples set forth herein, it will be understood that this wide range of weights covers hydraulically settable materials used to manufacture foam-like, clay-like, or sheet-like materials and containers.

It will be appreciated from the foregoing that embodiments within the scope of the present invention will vary from a very lightweight "foam-like" product to a somewhat higher density "clay-like" product. In addition, either foam-like or clay-like materials may first be molded into sheets to form a "sheet-like" product, resulting in a product which can be handled much like paper, cardboard, plastic, or even a sheet of metal. Within these broader categories will be other variations and differences which will require varying quantities and identities of the components. The components and their relative quantities may substantially vary depending upon the specific container or other product to be made.

Generally, when making a "foam-like" product, it will be preferable to include the hydraulic binder within the range from between about 10% to about 90% by weight of the wet hydraulically settable mixture, and more preferably within the range from between about 20% to about 50%.

When making a "clay-like" product, it will be preferable to include the hydraulic binder within the range from between about 5% to about 75% by weight of the wet hydraulically settable mixture, more preferably within the range from between about 8% to about 60%, and most preferably within the range from between about 10% to about 45%.

Finally, when making a "sheet-like" product, it will be preferable to include the hydraulic binder within the range from between about 5% to about 90% by weight of the green hydraulically settable mixture, preferably within the range from about 8% to about 50%, and most preferably within a range from about 10% to about 30%.

Despite the foregoing, it will be appreciated that all concentrations and amounts are critically dependent upon the qualities and characteristics that are desired in the final product. For example, in a very thin-walled structure (even as thin as 0.05 mm) where strength is needed, such as in a drinking straw, it may be more economical to have a very high percentage of hydraulic binder with little or no aggregate. In such a case, it may also be desirable to include a high amount of fiber to impart flexibility and toughness.

Conversely, in a product in which high amounts of air are incorporated (such as a low density, lightweight, insulating cup), there may be a greater percentage of the rheology-modifying agent, a smaller amount of cement, and larger amounts of lightweight aggregates. Such materials can have as high a percentage of air as do polystyrene foam products.

The other important constituent of hydraulic paste is water. By definition, water is an essential component of the hydraulically settable materials within the scope of the present invention. The hydration reaction between hydraulic binder and water yields reaction products which give the hydraulically settable materials the ability to set up and develop strength properties.

In most applications of the present invention, it is important that the water to cement ratio be carefully controlled in order to obtain a hydraulically settable mixture which after molding, extrusion, and/or calendering is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable material, as well as the molding or forming process to be used, the specific product to be made, and its properties.

The preferred amount of added water within any given application is primarily dependent upon two key variables: (1) the amount of water which is required to react with and hydrate the binder; (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted and optimized to the particular molding process being used to form the article or container.

In each of the molding processes, it may be desirable to initially include a relatively high water to cement ratio in light of the fact that the excess water can be removed by heating the molded products during or shortly after the molding process. One of the important features of the present invention as compared to the manufacture of paper is that the amount of water in the initial mixture is much less; hence, the yield stress is greater for the hydraulically settable mixtures. The result is that the total amount of water that must be removed from the initial mixture to obtain a self-supporting material (i.e., a form stable material) is much less in the case of the present invention when compared to the manufacture of paper.

Nevertheless, one skilled in the art will understand that when more non-optimized packed aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water. Porous, lightweight aggregates can also internally absorb significant amounts of water due to their high void content.

Both of the competing goals of greater workability and high green strength can be accommodated by initially adding a relatively large amount of water and then driving off much of the water as steam during the molding process, usually by the use of heated molds, rollers, or drying tunnels.

Based on the foregoing qualifications, typically hydraulically settable mixtures within the scope of the present invention will have a water-to-hydraulically settable binder ratio within a range from about 0.1 to about 4, preferably about 0.3 to about 3.5, and most preferably from about 0.5 to about 2. The total amount of water remaining after drying the material to remove excess water will range up to about 10% by weight with respect to the dry, hardened hydraulically settable container.

It should be understood that the hydraulic binder has an internal drying effect on the hydraulically settable mixture because binder particles chemically react with water and reduce the amount of free water within the interparticulate interstices. This internal drying effect can be enhanced by including faster reacting hydraulic binders such as gypsum hemihydrate along with slower reacting hydraulic cement.

According to a preferred embodiment of the present invention, it has been found desirable that the hydraulic binder and water be mixed in a high shear mixer such as those previously disclosed. The use of a high shear mixer has resulted in a more homogeneous hydraulically settable mixture, which has resulted in a product with higher strength. Furthermore, these high shear mixes can be utilized to entrain significant amounts of air into the hydraulically settable mixture to create "foam-like" products.

C. Rheology-modifying Agents.

The inclusion of a rheology-modifying agent acts to increase the plastic or cohesive nature of the hydraulically settable mixture so that it behaves more like a moldable clay. The rheology-modifying agent tends to thicken the hydraulical-settable mixture by increasing the yield stress without greatly increasing the viscosity of the mixture. Raising the yield stress in relation to the viscosity makes the material more plastic-like and moldable, while greatly increasing the subsequent form stability or green strength.

A variety of natural and synthetic organic rheology-modifying agents may be used which have a wide range of properties, including viscosity and solubility in water. For example, where it is desirable for the container to more quickly break down into environmentally benign components, it may be preferable to use a rheology-modifying agent which is more water soluble. Conversely, in order to design a material capable of withstanding prolonged exposure to water, it may be preferable to use a rheology-modifying agent which is less soluble in water or to use a high content of the hydraulic binder with respect to the rheology-modifying agent.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials which have the same or similar properties as these would also work well.

Suitable starch-based materials include, for example, amylopectin, amylose, seagel, starch acetates, starch hydroxyethylethers, ionic starches, long-chain alkylstarches, dextrins, amine starches, phosphates starches, and dialdehyde starches.

Other natural polysaccharide-based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen (derivatives extracted from animal connective tissue such as gelatin and glue), and casein (the principle protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex, which is a styrene-butadiene copolymer.

The rheology of polylactic acid is significantly modified by heat and could be used alone or in combination with any other of the foregoing rheology-modifying agents.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 can act to plasticize the mixture rather than thicken it, which helps during extrusion or rolling procedures.

More particularly, lower molecular weight rheology-modifying agents improve the internal flow of the hydraulically settable mixture during molding processes by providing additional lubrication to the particles. This reduces the friction between the particles as well as between the mixture and the adjacent mold surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the molded hydraulically settable material a smoother surface. Finally, polyethylene glycol can create a coating around soluble components of the mixture and thereby render the hardened product less water soluble.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of a particular food or beverage container.

The rheology-modifying agent within the hydraulically settable materials of the present invention can be included in an amount up to about 50% by weight of the mixture. Generally, however, the preferable concentration is up to about 20%, with less than about 10% being more preferable.

d. Aggregates.

Aggregates common in the concrete industry may be used in the hydraulically settable mixtures of the present invention, except that they often must be more finely ground due to the size limitations imposed by the generally thin-walled structures of the present invention. The diameter of the aggregates used will most often be less than about 30% of the cross-section of structural matrix of the container.

Aggregates may be added to increase the strength, decrease the costs by acting as a filler, decrease the weight, and/or increase the insulation ability of the resultant hydraulically settable materials. Aggregates, particularly plate-like aggregates, are also useful for creating a smooth surface finish. Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock, and other geologic materials.

Unreacted cement particles may also be considered to be "aggregates" in the broadest sense of the term. Even discarded hydraulically settable materials, such as discarded sheets, containers, or other objects of the present invention can be employed as aggregate fillers and strengtheners. It will be appreciated that the containers of the present invention can be effectively recycled.

Both clay and gypsum are particularly important aggregate materials because of their ready availability, extreme low cost, workability, ease of formation, and because they can also provide a degree of binding and strength if added in high enough amounts. Clay is a general term used to identify essentially all earths that form a paste with water and harden when dried. The predominant clays include silica and alumina (used for making pottery, tiles, brick, and pipes) and kaolinite. The kaolinite clays are anauxite, which has the chemical formula $Al_2O_3 \cdot SiO_2 \cdot H_2O$, and montmorilonite which has the chemical formula $Al_2O_3 \cdot SiO_2 \cdot H_2O$. However, clays may contain a wide variety of other substances such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a hydraulically settable mixture.

Examples of aggregates which can add a lightweight characteristic to the cementitious mixture include perlite, vermiculite, glass beads, hollow glass spheres, calcium carbonate, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the cement industry, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be combined with the hydraulic cements within the scope of the present invention. Even materials such as seeds, starches, gelatins, and agar-type materials can be incorporated as aggregates in the present invention.

From the foregoing, it will be understood that the amount of a particular aggregate within a mixture will vary depending upon the desired performance criteria of a particular article or container. There are many situations when little or no aggregate will be used. However, in most situations, the aggregate will be included in an amount of up to about 80% by weight of the green or wet hydraulic settable mixture.

In the products contemplated by the present invention where high insulation is desired, the amount of lightweight aggregate will usually be within the range from between about 3% to about 50% by weight, and most preferably, within the range from about 20% to about 35% by weight of the green mixture. Heavier weight aggregates will also be included in roughly the same amounts, albeit in lower quantities per unit of mass.

Further, it will be appreciated that for any given product, certain of these aggregates may be preferable while others may not be usable. For example, certain of the aggregates may contain harmful materials that, for some uses, could leach from the hydraulically settable mixture; nevertheless, most of the preferred materials are not only nontoxic under most uses in the food and beverage industry, but they are also more environmentally neutral than the components in existing disposable products.

Fibrous aggregates are used in the present invention primarily to modify the weight characteristics of the cementitious mixture, to add form stability to the mixture, and to add strength and flexibility to the resulting cementitious matrix, although certain fibers may also impart some level of insulation to the final product. Therefore, the term "aggregates" will refer to all other filler materials, which are nonfibrous, and whose function is mainly to impart strength, rheological, textural, and insulative properties to the materials.

It is often preferable, according to the present invention, to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

In order to optimize the packing density, differently sized aggregates with particle sizes ranging from as small as about 0.5 µm to as large as about 2 mm or more may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired characteristics in the final hydraulically settable article or container.

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference. The advantages of such packing of the aggregates can be further understood by reference to the examples in the previously incorporated patent application "Hydraulically Settable Containers and Other Articles For Storing, Dispensing, and Packaging Food and Beverages and Methods For Their Manufacture" in which hollow glass spheres of varying sizes are mixed in order to maximize the amount of the glass balls in the hydraulically settable mixture.

In embodiments in which it is desirable to obtain an article or container with high insulation capability, it may be preferable to incorporate into the hydraulically settable matrix a lightweight aggregate which has a low thermal conductivity, or "k-factor" (defined as W/m-K). The k-factor is roughly the reciprocal of the expression commonly used in the United States to describe the overall thermal resistance of a given material, or "R-factor," which is generally defined as having units of hr•ft$^2$°F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr•ft$^2$°F./BTU•in.

For purposes of this specification, the insulation ability of a given material will here and after be expressed only in terms of the IUPAC method of describing thermal conductivity, i.e., "k-factor." (The conversion of thermal resistance expressed in British units (hr•ft$^2$°F./BTU•in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mix design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties into the cementitious food container, is within the purview of the present invention.

e. Fibers.

As used in the specification and the appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, flexural, tensile and, on occasion, compressive strengths of the resulting hydraulically settable material. Fibrous materials reduce the likelihood that the hydraulically settable container will shatter when a strong cross-sectional force is applied.

Fibers which may be incorporated into the structural matrix are preferably naturally occurring fibers, such as cellulosic fibers extracted from hemp, cotton, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hard wood or soft wood, such as southern pine), and cotton. Recycled paper fibers can be used, but they are somewhat less desirable because of the fiber disruption or degradation that occurs during the original paper manufacturing process. Any equivalent fiber, however, which imparts strength and flexibility is also within the scope of the present invention. Abaca fibers are available from Isarog Inc. in the Philippines. Glass fibers, such as Cemfill® are available from Pilkington Corp. in England.

These fibers are preferably used in the present invention due to their low cost, high strength, and ready availability. Nevertheless, any equivalent fiber which imparts compressive and tensile strength, as well as toughness and flexibility (if needed), is certainly within the scope of the present invention. The only limiting criteria is that the fibers impart the desired properties without adversely reacting with the other constituents of the hydraulic material and without contaminating foodstuffs stored or dispensed in the containers containing such fibers.

The fibers used to make the containers of the present invention preferably have a high length to width ratio (or "aspect ratio") because longer, narrower fibers can impart more strength to the structural matrix without significantly adding bulk and mass to the mixture. The fibers should have an aspect ratio of at least about 10:1, preferably at least about 100:1, and most preferably at least about 200:1.

Preferred fibers should also have a length that is several times the diameter of the hydraulic binder particles. Fibers having a length that is at least twice the length of the hydraulic binder particles will work; fibers having a length that is at least 10 times the diameter of the hydraulic binder particles is preferred, with at least 100 times being more preferred, and even 1000 times being very useful.

The amount of fibers added to the hydraulically settable mixture matrix will vary depending upon the desired properties of the final product, with strength, toughness, flexibility, and cost being the principle criteria for determining the amount of fiber to be added in any mixed design. In most cases, fibers will be added in the amount within the range from about 0.2% to about 50% by volume of the hardened hydraulically settable mixture, more preferably within the range from about 1% to about 30% by volume, and most preferably within the range from about 5% to about 15% by volume.

It will be appreciated, however, that the strength of the fiber is a very important feature in determining the amount of the fiber to be used. The stronger the tensile strength of the fiber, the less the amount that must be used to obtain the same tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

It should be understood that the fibers used within the scope of the present invention differ from fibers typically employed in making paper or cardboard products, primarily in the way in which the fibers are processed. In the manufacture of paper, either a Kraft or a sulfite process is typically used to form the pulp sheet. In the Kraft process, the pulp fibers are "cooked" in a NaOH process to break up the fibers. In a sulfite process, acid is used in the fiber disintegration process.

In both of these processes, the fibers are first processed in order to release lignins locked within the fiber walls. However, in order to release the lignins from the fiber, some of the strength of the fiber is lost. Because the sulfite process is even more severe, the strength of the paper made by a sulfite process will generally have only about 70% of the strength of paper made by the Kraft process. (Hence, to the extent wood fibers are included, those processed using a Kraft process would be preferred.)

Once the wood has been made into wood pulp by either a Kraft or a sulfite process, it is further processed in a beater in order to further release lignins and hemicellulose within the fibers and also to fray the fibers. A slurry generally containing 99.5% water and 0.5% wood pulp is subjected to heavy beating in order to release enough hemicellulose and fray the fibers sufficiently to form a fibrous mixture that is essentially self-binding through an intertwining web effect between the fibers.

The fibers are essentially self-binding through a web effect of the frayed fiber ends and the adhesive ability of the released lignins and hemicellulose, as well as the hydrogen bonding between the fibers. Hence, "web physics" and hydrogen bonding governs the forces maintaining the integrity of the resultant paper or cardboard product. However, the cost of such harsh treatment is that the fibers develop major flaws along the entire length of the fiber, thereby resulting in a loss of much of their tensile, tear, and burst strengths.

In contrast, the fibers within the scope of the present invention undergo no such harsh treatment from the beater and, therefore, retain most of their initial strength. This is possible because they are bound together using a hydraulic binder. Hence, matrix to fiber adhesion rather than web physics forces are chiefly responsible for maintaining the integrity of the products of the present invention.

Consequently, far less fiber may be added to the hydraulically settable mixtures of the present invention while still deriving a high level of strength from the fibers. Employing less fiber while maintaining good strength properties allows a more economically produced sheet or container (as compared to paper) because (1) fiber is typically far more expensive than either the hydraulic binder or the aggregates, and (2) the capital investment for the processing equipment is much less.

It should also be understood that some fibers such as southern pine and abaca have high tear and burst strengths, while others such as cotton have lower strength but greater flexibility. In the case where both flexibility and high tear and burst strength is desired, a mixture of fibers having the various properties can be added to the mixture.

f. Dispersants.

The term "dispersant" is used herein to refer to the class of materials which can be added to reduce the viscosity and yield stress of the hydraulically settable mixture. A more detailed description of the use of dispersants may be found in the Master's Thesis of Andersen, P. J., "Effects of Organic Superplasticizing Admixtures and their Components on Zeta Potential and Related Properties of Cement Materials" (1987). For purposes of disclosure, the foregoing Master's Thesis is incorporated herein by specific reference.

Dispersants generally work by being adsorbed onto the surface of the hydraulic binder particles and/or into the near colloid double layer of the binder particles. This creates a negative charge on or around the surfaces of the particles causing them to repel each other. This repulsion of the particles adds "lubrication" by reducing the friction or attractive forces that would otherwise cause the particles to have greater interaction. Hence, less water can be added initially while maintaining the workability of the hydraulically settable mixture.

Greatly reducing the viscosity and yield stress may be desirable where plastic-like properties, cohesiveness, and/or form stability are less important. Adding a dispersant aids in keeping the hydraulically settable mixture workable even when very little water is added, particularly where there is a "deficiency" of water. Hence, adding a dispersant allows for an even greater deficiency of water, although the molded sheet or container may have somewhat less form stability if too much dispersant is used. Nevertheless, including less water initially will theoretically yield a stronger final cured product according to the Feret Equation.

Whether or not there is a deficiency of water is both a function of the stoichiometric amount of water required to hydrate the binder and the amount of water to occupy the interstices between the particles in the hydraulically settable mixture, including the hydraulic binder particles themselves, the particles within the aggregate material, and/or the fibrous material. As stated above, particle packing reduces the volume of the interstices between the hydraulic binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® is added, the dispersant must be added first and the flocculating agents second. Otherwise, the dispersant will not be able to become adsorbed on the surface of the hydraulic binder particles as the Tylose® will be irreversibly adsorbed to form a protective colloid on the surface, preventing the dispersant from being adsorbed.

A preferred dispersant is sulfonated naphthaleneformaldehyde condensate, an example of which is WRDA 19, which is available from W. R. Grace, Inc. located in Baltimore. Other dispersants which would work well include sulfonated melamine-formaldehyde condensate, lignosulfonate, and polyacrylic acid.

The amount of added dispersant will generally range up to about 5% by weight of the hydraulic binder, more preferably within the range of between about 0.2% to about 4%, and most preferably within a range of between about 0.5% to about 2%. However, it is important not to include too much dispersant as it tends to retard the hydration reactions between, e.g., hydraulic cement and water. Adding too much dispersant can, in fact, prevent hydration, thereby destroying the binding ability of the cement paste altogether.

The dispersants contemplated within the present invention have sometimes been referred to in the concrete industry as "superplasticizers." In order to better distinguish dispersants from rheology-modifying agents, which often act as plasticizers, the term "superplasticizer" will not be used in this specification.

g. Air Voids.

Where insulation, not strength, is the overriding factor (i.e., whether it is desired to insulate hot or cold materials), it may be desirable to incorporate tiny air voids within the hydraulically settable structural matrix of the containers in addition to, or in place of, lightweight aggregates in order to increase the container's insulating properties. The incorporation of air voids into the cementitious mixture is carefully calculated to impart the requisite insulation characteristics without degrading the strength of the container to the point of nonutility. Generally, however, if insulation is not an important feature of a particular product, it is desirable to minimize any air voids in order to maximize strength and minimize volume.

In certain embodiments, nonagglomerated air voids may be introduced by high shear, high speed mixing of the hydraulically settable mixture, with a foaming or stabilizing agent added to the mixture to aid in the incorporation of air voids. The high shear, high energy mixers discussed above are particularly useful in achieving this desired goal. Suitable foaming and air entraining agents include commonly used surfactants. One currently preferred surfactant is a polypeptide alkylene polyol, such as Mearlcrete® Foam Liquid.

In conjunction with the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the rheology-modifying agent can act to stabilize the entrained air. Different air-entraining agents and stabilizing agents impart different degrees of foam stability to the hydraulically settable mixture, and they should be chosen in order to impart the properties that are best suited for a particular manufacturing process.

During the entrainment of air, the atmosphere above the high speed mixer can be saturated with a gas such as carbon dioxide, which has been found to cause an early false setting and create form and foam stability of the hydraulically settable mixture. The early false setting and foam stability is thought to result from the reaction of $CO_2$ and hydroxide ions within the hydraulically settable mixture to form soluble sodium and potassium carbonate ions, which in turn can interact with the aluminate phases in the cement and accelerate the setting of the mixture.

Foam stability helps maintain the dispersion, and prevents the agglomeration, of the air voids within the uncured hydraulically settable mixture. Failure to prevent the coalescence of the air voids actually decreases the insulation effect, and it also greatly decreases the strength of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

During the process of molding and/or hardening the hydraulically settable mixture, it is often desirable to heat up the hydraulically settable mixture in order to increase the volume of the air void system. Heating also aids in rapidly removing significant amounts of the water from the hydraulically settable mixture, thereby increasing the green strength of the molded product.

If a gas has been incorporated into the hydraulically settable mixture, heating the mixture to 250° C., for example, will result (according to the ideal gas equation) in the gas increasing its volume by about 85%. When heating is appropriate, it has been found desirable for the heating to be within a range from about 100° C. to about 250° C. More importantly, if properly controlled, heating will not result in the cracking of the structural matrix of the container or yield imperfections in the surface texture of the container.

In other applications, where viscosity of the hydraulically settable mixture is high, such as is required in certain molding processes, it is much more difficult to obtain adequate numbers of air voids through high shear mixing. In this case, air voids may alternatively be introduced into the hydraulically settable mixture by adding an easily oxidized metal, such as aluminum, magnesium, zinc, or tin into a hydraulic mixture that is either naturally alkaline (such as a hydraulic cement or calcium oxide containing mixture) or one that has been made alkaline (such as those containing gypsum or another alkaline hydraulic binder).

This reaction results in the evolution of tiny hydrogen bubbles throughout the hydraulically settable mixture. Adding a base such as sodium hydroxide to, and/or heating (as described below), the hydraulically settable mixture increases the rate of hydrogen bubble generation.

It may further be desirable to heat the mixture in order to initiate the chemical reaction and increase the rate of formation of hydrogen bubbles. It has been found that heating the molded product to temperatures in the range of from about 50° C. to about 100° C., and preferably about 75° C. to about 85° C., effectively controls the reaction and also drives off a significant amount of the water. Again, this heating process does not result in the introduction of cracks into the matrix of the molded product. This second method of introducing air voids into the structural matrix can be used in conjunction with, or in place of, the introduction of air through high speed, high shear mixing in the case of low viscosity hydraulic mixtures used in some molding processes.

Finally, air voids may be introduced into the hydraulically settable mixture during the molding process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture and kept under pressure while heated. The liquid blowing agent penetrates into the pores of the individual talc particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize, the increase in pressure prevents the agent from vaporizing, thereby temporarily creating an equilibrium. When the pressure is released after the molding or extrusion of the material, the blowing agent vaporizes, thereby expanding or "blowing" the hydraulically settable material. The hydraulically settable material eventually hardens with very finely dispersed voids throughout the structural matrix. Water can also act as a blowing agent as long as the mixture is heated above the boiling point of water and kept under pressure of up to 50 bars.

Air voids increase the insulative properties of the hydraulically settable containers and also greatly decrease the bulk density and, hence, the weight of the final product. This reduces the overall mass of the resultant product, which reduces the amount of material that is required for the manufacture of the containers and which reduces the amount of material that will ultimately be discarded in the case of disposable containers.

It has also been discovered that, after the cementitious container has solidified, many of the compositional designs of the present invention result in a matrix that is slightly permeable, especially to tiny hydrogen gas molecules, which can diffuse out of the structural matrix. This breathability factor is highly desirable of certain types of food containers, such as the "claim-shell" containers used in the fast food industry, so that bread products do not become soggy.

h. Set Accelerators.

In some cases it may be desirable to accelerate the initial set of the hydraulically settable mixture by adding to the mixture an appropriate set accelerator. These include $Na_2CO_3$, $KCO_3$, $KOH$, $NaOH$, $CaCl_2$, $CO_2$, triethanolamine, aluminates, and the inorganic alkali salts of strong acids, such as $HCl$, $HNO_3$, and $H_2SO_4$. In fact, any compound which increases the solubility of gypsum and calcium hydroxide will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding the hydraulically settable mixture, the temperature of the mixture, and the identity of the accelerator. One of ordinary skill in the art will be able to adjust the amount of added set accelerator according to the parameters of a particular manufacturing process in order to optimize the setting time of the hydraulically settable mixture.

Step Two: Extruding The Hydraulically Settable Sheet

The second step in the manufacturing process is forming the hydraulically settable mixture into a sheet. To form the sheet, the hydraulically settable mixture is extruded through a die orifice having a length and a height. As the mixture is pressed through the orifice, the mixture is formed into a sheet having a desired thickness and width. Although the cross-section of the die orifice is typically rectangular, the die orifice can be a variety of shapes and sizes so as to vary, if desired, the thickness of the sheet along its width or the rate of extrusion.

By varying the thickness of the sheet, one can selectively position additional material to reinforce certain areas of the container when the container is pressed from the sheet. Furthermore, increased thicknesses in the sheet at specific locations can ensure that the container or other article will have a desired or uniform thickness when the sheet is pressed or stretched into the desired shape for the container. For similar reasons, it may also be beneficial to vary the thickness of the sheet along the length of the sheet. By way of example and not by limitation, the thickness of the sheet along the length of the sheet can be varied by selectively varying the height of the die orifice as the mixture is extruded into the sheet.

Where wide sheets are desired, it may be more convenient to have the die orifice curved so that the sheet unfolds as the sheet is extruded through the die. By curving the die orifice, the die orifice occupies a minimal amount of space. By way of example, the die orifice can be "U" shaped such that as the mixture is extruded in the "U" shape it subsequently unfolds into a flat sheet. Similarly, the die orifice can be substantially circular such that the mixture is extruded in a tubular shape. A knife can then be used to slice open the tube allowing the sheet to open flat.

The amount of pressure applied in extruding the mixture depends on several factors. High pressures can result in higher strength products. As pressure is applied to the mixture, particles within the mixture are pressed closer together, thereby making the water and other microrheology based lubricants within the mixture more effective in surrounding and lubricating the particles. As such, the mixture increases in flowability and workability. Accordingly, mixtures positioned under pressure require less water to obtain a desired workability and, as a result of less water, have increased form stability and subsequent strength.

Although high pressures are generally desirable, they also have a negative effect. To produce a lightweight or insulative container or article, low density aggregates (such as perlite or hollow glass spheres) are typically added to the mixture. As the pressure exerted by the extruder is increased, these aggregates are crushed, thereby increasing the density of the aggregate and the density of the resulting container. Crushing the aggregate also decreases the insulating effect of the aggregates since they no longer contain air pockets.

To optimize the extruding pressure in light of these opposing factors, the pressure applied on the hydraulically settable mixture during extrusion is in a range between about 20 psi to about 10,000 psi, with 50 psi to about 5,000 psi being preferred, and 75 psi and about 3,500 psi being most preferred.

In one embodiment, a vacuum is applied to the mixture before it is extruded into a sheet. The vacuum removes air from the mixture which can form undesirable pockets or irregularities in the matrix of the sheet. Typically, the vacuum is applied by auger feeding the mixture into a sealed chamber having a vacuum applied to it (hereinafter "vacuum chamber"). The mixture is ground or cut up as it enters the vacuum chamber so as to maximize the surface area of the mixture and, thereby, maximize the amount of air withdrawn from the mixture. Once the mixture enters the vacuum chamber and the air is withdrawn, the mixture feeds into a second auger where it is extruded through the above described die orifice in the sheet.

Alternatively, the unwanted air voids may by removed from the hydraulically settable mixture by a process known as "back venting" wherein the excess air collects under pressure within the interior chamber and escapes then through the back of the auger screw while the mixture is compressed and moved forward by the auger screw.

At times, a uniform dispersion of small air voids in the mixture may be desirable; and, thus, removal of the air may not be necessary. Trapped air is an effective means of insulating. Accordingly, a container having trapped air pockets positioned within its walls can have a high K-factor. One method for forming and regulating the size, shape and concentration of air voids in a mixture is through the process of nucleation using blowing agents and adsorbing materials, as previously discussed.

One of ordinary skill in the art will appreciate that the extrusion step need not formerly employ the use of an "extruder" as the term is used in the art. The purpose of the extrusion step is to provide a continuous, well-regulated supply of hydraulically settable material to the rollers. The extrusion step preferably orients the fibers in the direction of the flow of the material. These may be achieved by other mechanisms known to those skilled in the art to effect the "extrusion" or flow of material through an appropriate opening. The force needed to cause a hydraulically settable mixture to flow may, for example, be supplied by gravity.

Step Three: Feeding The Sheet Through Rollers

In one embodiment, the extruder can independently produce a sheet in a condition suitable for forming the desired container or article. In the preferred embodiment, however, the sheet is subsequently run through at least one set of reduction rollers so as to impart a finished surface to the sheet and to provide the sheet with a desired thickness. The term "calendering" as used in the specification and appended claims is intended to include the application of rollers to the hydraulically settable sheet for reducing, finishing, drying, shaping, or in any way modifying the sheet.

Reduction rollers can also be used to orientate fibers within the sheet. To form the preferred containers or articles of the present invention, the sheet should have a thickness in a range between about 0.05 mm to about 1 cm, with 0.25 mm to about 3 mm being preferred, and 0.5 mm to about 2 mm being most preferred. Of course, the thickness of the sheet can be increased where thicker articles are desired.

Typically, the sheet is fed through a set of reduction rollers to obtain a desired thickness for forming the desired containers. The term "reduction rollers" as used in the present invention and appended claims includes two rollers positioned adjacent to one another so as to define a slot between the rollers. Each of the rollers rotates toward the slot so as to feed the hydraulically settable sheet between the rollers, thereby pressing the sheet into the desired thickness. The distance between the rollers is defined as the "gap distance." As will be discussed more fully below, each of the rollers comprising the reduction rollers can have a variety of sizes, shapes, and orientations.

As the thickness of the sheet is reduced when passing through the reduction rollers, the sheet is also elongated. One consequence of sheet elongation is that the fibers will further be oriented or lined up in the "y" direction or along the length of the sheet. In this way, the reduction process in combination with the initial extrusion process will create a sheet having substantially unidirectionally oriented fibers in the "y," or lengthwise, direction.

Another consequence of sheet elongation is that the sheet will increase in velocity as it passes between a pair of reduction rollers. It should be understood that the rotational speed of the rollers will closely correspond to the speed of the thinner, elongated sheet as it exits the rollers, not as it enters the gap distance between the rollers. More precisely, the tangential speed of the outer surfaces of the rollers at the point where the radius of the rollers is perpendicular to the surface of the sheet will be substantially equal to the speed of the sheet as it exits the pair of rollers. The consequence of this is that the roller speed will be "faster" relative to the speed of the sheet as it enters into the rollers.

By way of example, if the sheet thickness is reduced by 50% and assuming there is no widening of the sheet during the reduction process the sheet will elongate to twice its original length. This corresponds to a doubling of the sheet's velocity before it enters the rollers compared to when it exits the rollers. Thus, if the sheet thickness is reduced by 50%, then $v_1 = 2 \times v_0$; the velocity doubles from point "a" to point "b" as designated in FIG. 23.

The average acceleration of the sheet corresponds to the time it takes for the sheet to pass from point "a" to point "b," although the actual acceleration of the sheet will necessarily be greater as the sheet first passes through the rollers. Because the downward angle of the roller is greatest as the sheet first passes between the rollers, the shearing forces and the acceleration are also greatest at this point.

The sheet "speeds up" while passing between a pair of rollers by being squeezed or pressed into a thinner sheet by the rotating rollers. This process of squeezing or pressing the sheet, as well as the speed differential between the entering sheet and the rollers, creates a certain amount of shearing forces on the sheet. The application of an excessively large shearing force can disrupt the integrity of the structural matrix of the sheet and create flaws within and weaken the sheet.

To avoid the above problems, the thickness of the sheet can be incrementally decreased by feeding the sheet between a plurality of sets of rollers each having an incrementally decreasing gap distance. In light of typical production parameters (such as, e.g., minimizing the number of reduction steps, orienting the fibers, and controlling the rheology of the hydraulically settable mixture) the reduction in thickness of a sheet will preferably not exceed about 75% during any single reduction step (i.e., while passing between any one set of rollers), more preferably no greater than about 50%, and most preferably no greater than about 30%.

Furthermore, it is important to remember, especially where light-weight aggregates are being used, not to set the gap distance between the rollers smaller than the diameter of the aggregate. Such a setting of the rollers would at least partially crush the aggregate and, thereby decrease their ability to make a light weight container.

The diameter of each of the rollers should be optimized depending on the properties of the hydraulically settable mixture and the amount of thickness reduction of the hydraulically settable sheets. When optimizing the diameter of the rollers, two competing interests should be considered. The first relates to the fact that narrower rollers tend to impart a greater amount of shearing force into the sheet as it passes between the rollers. This is because less of the hydraulically settable sheet is in contact with the narrower diameter roller as is passes between the rollers. Using broader rollers allows more of the sheet to come in contact with the surface of the rollers as the sheet passes between the rollers. Thus, the step of squeezing or pressing the sheet into a thinner sheet by the rollers is accomplished along a shorter length and in a shorter period of time when narrower rollers are used compared to broader rollers.

However, the use of broader rollers also has the drawback in that as more of the hydraulically settable material comes into contact with the roller there is a greater tendency of the material to stick or adhere to the rollers. Although the rollers are preferably treated in order to reduce the adherence of the hydraulic material to the rollers, such anti-adhesion methods are not perfect and some level of adherence usually occurs if the rollers are too broad.

When the rollers are heated, as will be discussed later, the use of larger diameter rollers has the drawback of the hydraulically settable material coming into contact with the roller for a greater period of time, thereby resulting in an increase in drying of the sheet during the calendering process in the case where the rollers are heated to prevent adhesion. (Because more of the sheet comes into contact with a larger diameter roller, heating is even more important when using larger diameter rollers to prevent adhesion).

While some drying is advantageous, drying the sheet too quickly during the calendering process could result in the introduction of fractures and other flaws within the structural matrix. A dryer sheet is less able to conform to a new shape without a rupture in the matrix compared to a wetter sheet subjected to the same level of shearing forces. Consequently, from this perspective the use of smaller diameter rollers is advantageous for reducing the drying effect of the reduction rollers. Thus, the diameter of the rollers are preferably optimized in order to have rollers that are sufficiently narrow to prevent adhesion of the material to the rollers, but sufficiently broad so that the amount of shearing force imparted to the sheet is reduced, thereby allowing a greater reduction of sheet thickness when passing through a particular roller pair.

The optimization of the roller diameters in order to achieve the greatest amount of reduction of sheet thickness, while at the same time preventing adhesion of the hydraulically settable sheet to the rollers, is preferred in order to reduce the number of reduction steps in a manufacturing process. Besides reducing the number of working parts, reducing the number of reduction steps also eliminates the number of rollers whose speed must be carefully synchronized in order to prevent sheet buildup behind the rollers (in the case of rollers rotating too slow) or sheet tearing (in the case of rollers rotating too fast). Because each of the roller pairs reduces the thickness of the sheet as it passes therebetween, the sheet will speed-up each time it passes through a set of rollers. Therefore, each of the roller pairs must independently rotate at the proper speed in order to prevent interruption of the calendering process. Eliminating the number of reduction steps greatly simplifies the synchronization problems.

The shearing force that is applied by the rollers on the sheets also corresponds to the speed of the rollers, including the differential between the sheet as it passes between a pair of rollers and the speed of the rollers. As the sheets are fed through the rollers at higher speeds, the amount of shear that is applied also increases. Therefore, the speed with which the hydraulically settable mixture is extruded and subsequently calendered can be optimized in order to reduce flaws caused by excess shear while maintaining the highest speed possible in order to maximize production of sheets. The optimal speed with which a hydraulically settable mixture is first extruded and then calendered depends upon a number of interrelated variables including, for example, the rheology and other properties of the mixture, the thickness of the extruded sheet, the amount of reduction of the sheet, and the level of adhesion between the mixture and the rollers. In light of the various parameters, there is no preferred speed with which the sheet is extruded and then calendered.

Several methods are available for preventing the hydraulically settable mixture from adhering to the rollers. The methods typically include creating a water deficiency on the surface of the sheet contacting the rollers. The preferred method is to heat the rollers to a temperature sufficient to cause a portion of the water in the hydraulically settable mixture to form into steam. In turn, this steam forms a boundary layer between the rollers and the sheet which prevents them from adhering to one another.

Heating the rollers also serves to drive off excess water from the sheet, thereby increasing the stability of the sheet and lowering the concentration of water. The higher the temperature of the rollers, the greater the steam and the more stable the sheet. Preferably, however, the temperature of the rollers should not be so high as to completely dry or harden the surface of the sheet. That is, the sheet must not be so dried as to produce residual stresses, fractures, flaking or any other type of deformity or irregularity in the container when it is subsequently pressed from the sheet. Accordingly, the temperatures of the heated rollers should be in the range from about 50° C. to about 300° C., with 50° C. to about 150° C. being preferred, and 50° C. to about 100° C. being most preferred. The actual temperature used varies depending on the water content in the mixture. The lower the concentration of water, the lower the required temperature of the dies needed to inhibit adherence of the mixture to the rollers.

Because heated rollers can drive off significant amounts of water and improve the form stability, the amount of acceptable sheet thickness reduction will generally decrease in each successive reduction step as the sheet becomes drier. This is because a drier, stiffer sheet can tolerate less shear before flaws are introduced into the structural matrix.

In an alternative embodiment, adhesion between the hydraulically settable sheets and rollers can be reduced by cooling the rollers to or below room temperature. Heating the mixture in the extruder to a relatively high temperature, for example, and then cooling the sheet surface causes the vaporizing water to condense, which is thought to create a thin film of water between the sheet and the roller. The rollers should be cool enough to prevent the surface of the sheet from adhering to the rollers, but not so cold to cause the sheet to freeze or become so stiff or inflexible that it will fracture or shatter during the calendering process.

Overcooling the material can also greatly retard the hydration reaction, although this may be desirable in some cases. Accordingly, it is preferable to cool the rollers to a temperature within the range from between about −20° C. to about 40° C., more preferably to between about 0° C. to about 35° C., and most preferably to between about 5° C. to about 30° C.

In order to obtain the beneficial nonadhesive effects of cooling the rollers, it will generally be necessary to first heat the hydraulically settable mixture before or during the extrusion process to a temperature that is significantly higher than the temperature of the cooled rollers. This allows for the beneficial condensation of water vapor from the heated mixture onto the cooled rollers, thereby creating a thin layer of lubricating water between the rollers and the hydraulically settable mixture. Accordingly, it will generally be preferable to heat the extruding mixture to a temperature within the range from between about 20° C. to about 80° C. The temperature will correlate with the temperature of the rollers.

As previously discussed, the selected temperature of the rollers also influences the size and rotation speed of the rollers. The larger the rollers, the more surface area of the rollers that contacts the mixture and, thus, the quicker the mixture dries or freezes. Furthermore, the slower the rotation of the rollers, the longer the mixture is in contact with the rollers and, thus, the quicker the mixture dries or freezes.

The application of conventional non-stick coatings to the rollers can further decrease adherence of the mixture to the rollers. Furthermore, the composition of the rollers and how they are heated or cooled, also affects adherence of the mixture. Rollers are typically made from polished stainless steel and coated with a nonstick material such as polished chrome, nickel, or teflon. It should also be noted that mixtures using low concentrations of water typically do not adhere to the rollers. Accordingly, such mixtures can be rolled into sheets of a described thickness using rollers at ambient temperatures.

As with the extruder, the rollers can also be used to vary the thickness of the sheet along the width and length of the sheet. By way of example and not by limitation, the thickness of the sheet along its width can be varied by using rollers that have a diameter that varies along the length of the rollers or by angling the rollers so that the rollers have a smaller gap distance at one end than at the other. The thickness of the sheet can be varied along the length of the sheet by having rollers that can be adjusted to vary their gap distance as the sheet passes between the rollers. The benefit of having a variance in the thickness of the sheet are as previously discussed with the extruder.

An additional benefit of varying the thickness of the sheet is to orientate the fibers in the sheet. As a mixture is extruded into a sheet, fibers within the mixture are substantially oriented along the length of the sheet, thereby increasing the tensile strength along the length of the sheet. By passing the sheet between a set of conically shaped rollers, often referred to as z-oriented rollers, a portion of the mixture is repositioned so as to align a portion of the fiber at varying angles with the width of the sheet. In turn, these repositioned fibers increase the tensile strength of the sheet along the width of the sheet, thereby producing a sheet with a more uniform tensile strength along both its width and length.

Although the sheet forming step often results in partial or even substantial drying of the hydraulically settable sheet, it may be desirable to further dry the sheet in order to obtain a sheet with the desired properties of tensile strength and toughness. In one embodiment, it may be desirable to dry the sheet to a point where printing and a coating can be applied to the sheet without deforming the sheet. The steps of printing and coating are discussed later in the application.

One method of drying the sheet involves the use of large diameter, heated drying rollers sometimes known in the art as "Yankee" rollers. In contrast to the reduction rollers, which are generally aligned in pairs of rollers, the drying rollers are individually aligned so that the sheet passes over the surface of each individually in sequence. In this way the two sides of the hydraulically settable sheet are alternatively dried in steps. While the sheet passes through the reduction rollers during the sheet forming step in a generally linear path, the sheet follows a generally sinusoidal path when wrapping around and through the drying rollers during the drying step.

The side adjacent to the first drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and roller. The drying rollers may have tiny holes within the surface in order to allow some of the water vapor to escape through the holes during the drying step.

As the sheet continues on its path it is rolled over a second drying roller where the other side comes into contact with the roller surface and is dried. This process may be continued for as many steps as needed in order to dry the sheet in the desired amount. The amount of drying will depend on a number of factors, including the amount of water within the sheet, the thickness of the sheet, and the desired properties of the sheet. In some cases it may be preferable to dry one side of the sheet more than the other. This may be accomplished by designing a system which maximizes the contact of one side of the sheet with the drying roller while minimizing the contact of the other side.

The temperature of the drying rollers will depend on a number of factors, including the moisture content of the sheet as it passes over a particular roller. In any event, the temperature of the drying rollers should be less than about 300° C. Although the hydraulically settable material should not be heated above 250° C. in order to prevent the destruction of the organic constituents (such as rheology-modifying agent or fibers), rollers heated to above this temperature may be used so long as there is adequate water within the mixture which can cool the material as the water vaporizes. Nevertheless, as the amount of water decreases during the drying process, the temperature of the rollers should be reduced to prevent overheating of the material.

Once the sheet is dried and received its coating and/or printing (these process will be discussed later) the sheet can be rewetted so as to again obtain the needed workability for forming the desired container. In the preferred embodiment, only one side of the sheet initially receives a coating or printing thus permitting the opposing side to be rewetted without affecting the coating or printing.

Wetting can be performed by conventional methods such as by spraying liquid water or steam onto the sheet. Furthermore, the sheet can be exposed to a high humidity environment. By wetting the sheet, a portion of the rheology-modifying agent dissolves into the water, thereby increasing the flexibility and workability of the sheet. As discussed later in greater detail, it is, in part, the dried rheology-modifying agent acting as a binding agent that increases the hardness and form stability of the sheet and subsequent container.

The present invention also envisions forming the sheet directly from the roller without the use of an extruder. By way of example and by limitation, a mixer can be structured to feed directly between a set of rollers to form a sheet. The use of a plurality of rollers as previously discussed, can then be used to provide the sheet with the desired thickness.

Finally, the production of the hydraulically settable sheets also includes the process of layering. That is, prior to the formation of the container, various material sheets can be combined into a single sheet. Several benefits can be obtained by this process. First, by selectively combining sheets having different orientations of fibers, a single sheet having multiple orientations of fibers can be easily obtained. Such a sheet would have greater strength along each of its axes.

Another benefit to combining layers is to optimize or gain properties from other materials. By combining a hydraulically settable sheet with a sheet of another material, the hydraulic sheet obtains the other sheet's properties. For example, aluminum foil is a reflective metal sheet. Pressing a sheet of aluminum foil with a hydraulic sheet can form a hydraulic sheet with reflective properties. The types of alternative material sheets that can be combined with the hydraulically settable sheet are innumerable and must be selected based on the desired properties.

For purposes of disclosure and further understanding of the sheet forming process, U.S. patent application Ser. No. 08/101,500, filed Aug. 3, 1993, now abandoned, in the names of Simon K. Hodson and Per Just Andersen, Ph.D. and entitled "Methods and Apparatus for Manufacturing Moldable Hydraulically Settable Sheets Used in Making Containers, Printed Materials, and Other Objects" is incorporated herein by specific reference.

Step Four: Fashioning the Container

Once the sheet is formed, the next step is to fashion a portion of the sheet into the desired shape for the container or article. In the preferred embodiment, the sheet is pressed between a male die of a desired shape and a female die having a substantially complementary shape of the male die. As a portion of the sheet is pressed between the dies, the mixture is formed into a container having the complementary shape of the dies.

Although solid single piece dies (the male die and the female die each comprising one solid piece) are the preferred dies based on ease and economy, alternative dies include split dies, progressive dies and collapsible dies. The types of dies can be combined in the fashioning process, for example, a solid male die and split female die can be used together. Split dies are multi-component dies that simultaneously press together, usually from different angles, to form single dies during the pressing phase. For example, a female die may comprise two sides and a top which simultaneously press together onto the male die to shape the mixture. Split dies are useful in the production of complex shapes, especially shapes with negative angles, and are easily removed from the mold.

In contrast to the split die where the components press together simultaneously to form the object, a progressive die is a multi-component die whose various parts are pressed together in a delayed sequence to form the desired container. By selecting the order and time when the various components of the die are pressed together, a complex container can be formed having a more uniform thickness. For example, a progressive male die used to make a bowl may include a base and a side component. By having the base component press first, the remainder of the sheet is pulled in against the side of the female die. The side component of the male die can then be pressed against the female die to form the side of the bowel without stretching the sheet, thereby forming a bowl having a more uniform thickness.

Collapsible dies are also well known in the art. As used herein, the term "collapsible die" defines those die that expand and contract to assist in fashioning an article.

The amount of pressure exerted by the dies onto the sheet serves several functions which must be considered when determining how much pressure to apply. At a minimum, the pressure must be sufficient to actually mold the sheet between the dies so as to obtain the desired shape. It is preferable that this pressure be sufficient to produce a container with a uniform and smooth finished surface.

The amount of pressure applied to the hydraulically settable mixture also affects the strength of the resulting container. Research has found that the strength of the resultant product is increased for mixtures where the hydraulically settable particles are close together. The greater the pressure used to press the sheet between the dies, the closer the particles are pushed together, thereby increasing the strength of the resulting container.

Furthermore, as with the extruding processes, the more pressure applied by the dies on the sheet, the more plastic or workable the mixture becomes. Accordingly, as the sheet is pressed between the dies, the hydraulically settable mixture both flows and elongates into the desired shape of the article. The ability to flow is especially important in the production of complex shaped articles where the mixture must flow to obtain the desired shape. The process of flowing has the added benefit of limiting stresses on the structure of the article and providing an article with a more uniform thickness. In addition, the more pressure applied to the mixture, the less water that needs to be added to make the mixture flowable, thus, the stronger the resulting container.

One detriment of using high pressures on the mixture is that the light weight aggregates in the mixture can be crushed, inhibiting the production of light weight containers and minimizing their insulating capabilities. Accordingly, the pressure applied by the dies should be optimized so as to maximize the strength, structural integrity, and low density of the container.

Under the present invention, the pressure exerted by the male die and the female die on the hydraulically settable mixture in the form of a sheet is in the range from about 25 psi to about 10,000 psi, with 100 psi to about 7,000 psi being preferred, and 150 psi to about 1,000 psi being most preferred. However, as discussed in the next step, the amount of pressure will vary depending upon the temperature and time of the molding process.

Failure to fully remove the air between the dies can result in air pockets or deformities in the structural matrix of the container. Typically, the air simply escapes from between the dies as the dies are pressed together. However, as the depth of the mold cavity increases and the speed of the dies increases, the probability of air being trapped between the dies increases. Accordingly, the speed of the dies should not exceed the capability of the air to escape from the mold cavity.

It is envisioned that the dies could be pressed together in two stages. In the first stage, a high speed could be used to press the dies together to a point just prior to mating. In the second stage, the speed of the dies is slowed down sufficiently to permit the air between the dies to escape prior to complete mating of the dies. This combination of first and second stage speeds permits one to optimize production time. The actual speed of the dies during the second stage varies according to the size and shape of the container being formed and how much air needs to escape.

In an alternative embodiment, the dies also comprise a plurality of vent holes extending through the dies so as to make the dies permeable. As the dies are pressed together, the air between the dies is expelled through the vent holes, thereby preventing the formation of air pockets. The vent holes also prevent the creation of a vacuum within the cavity by allowing air to return into the cavity as the dies are separated. Such a vacuum could exert an undue force on the newly formed container, thereby disrupting its structural integrity.

Furthermore, vent holes also permit the escape of excess steam created during the heating process which will be discussed later. The vent holes can exist in either or both of the dies. The number of vent holes varies depending on speed of the dies and the amount of air that needs to escape. The diameter of the vent holes varies. For relatively dry sheets, the vent holes typically range from about 0.05 mm to about 5 mm, with 0.1 mm to about 2 mm being preferred, and 0.2 mm to about 0.5 mm being most preferred. It is also preferred that the vent holes be located at positions on the dies corresponding to unobtrusive locations on the containers, for example, the base of the container. For relatively wet and plastic mixtures, vent holes cannot be used as they will get plugged by the mixture.

In an alternative method for fashioning the container from the sheet, the various methods of vacuum forming, commonly used in the plastics industry, can be incorporated. Vacuum forming uses atmospheric pressure (14.7 psi) to force the sheet to conform to a mold. Both male and female molds can be used for vacuum forming. The term "vacuum mold" as used in the specification and appended claims is intended to include either or both the male mold and female mold used in vacuum forming. The type of molds elected dictates which forming technique should be used. Common vacuum-forming techniques are discussed below. The apparatus related to these processes are disclosed in a later section on the systems used for production.

Drape forming, as shown in FIG. 16, is used with male molds. The sheet is positioned over the top of the mold, or the mold is placed into the sheet. The air between the sheet and the mold is then evacuated, contouring the sheet around the mold. The resulting product is thickest in the center of the part, where the material first touches the mold. It is thinnest in high-draw areas around the periphery, which contacts the mold last.

Straight vacuum forming, shown in FIG. 14, is used with female molds. The sheet is sealed against the top of the female mold. The mold cavity is evacuated, and atmospheric pressure pushes the material against the sidewalls of the cavity. This forming technique results in material distribution (thin in the middle and thick around the edges) that is essentially opposite of that obtained when the same part is produced by drape forming on a male mold.

Figure 15A:
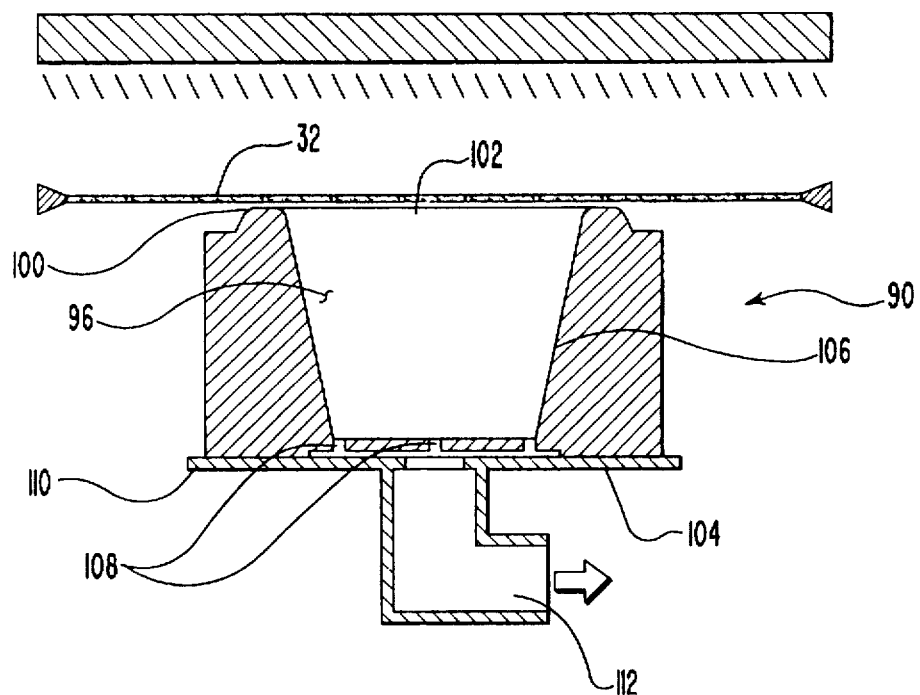
FIG. 15 is a schematic view of drape vacuum forming.
Figure 15B:
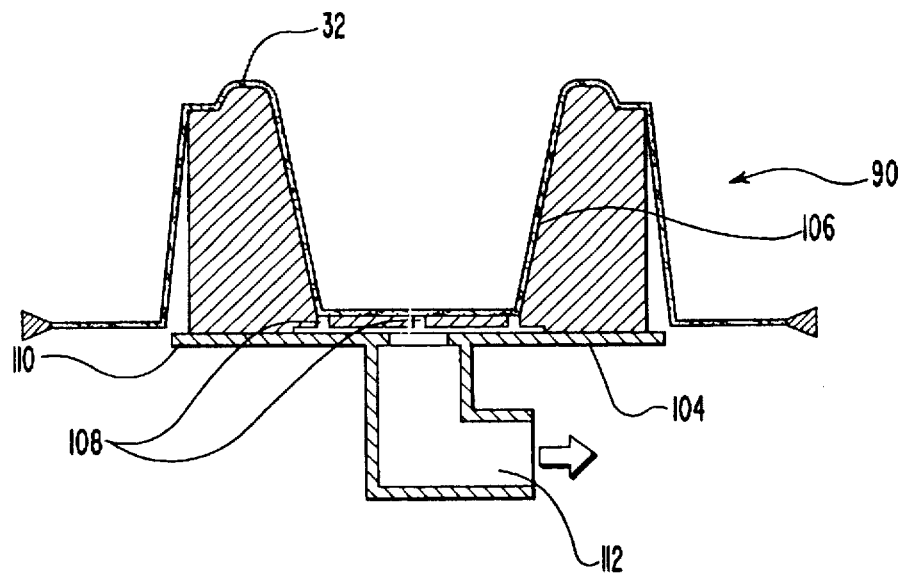

Drape vacuum forming, shown in FIG. 15, as opposed to drape forming, is similar to straight vacuum forming except that the edges of the sheet are pressed all the way to the base of the female mold before the cavity is evacuated. This provides a better vacuum for the molding process.

Snapback, billow/air slip, and billow drape are multi-step vacuum forming techniques designed to improve the wall thickness uniformity of products produced on male molds by prestretching the sheet prior to its contacting the mold. Stretching the sheet freely in air without touching anything allows the material to thin out uniformly. As a result, the sheet's surface area is also increased so that it more closely matches that of the mold.

Snapback vacuum forming, as shown in FIG. 16, utilizes a vacuum box to prestretch the sheet. The vacuum box is mounted to a platen opposite the male mold. The cementitious sheet is sealed against the vacuum box, and a partial vacuum, sufficient to achieve the desired amount of stretching is applied to the box. The mold is then pushed into the concave sheet. The box is vented to the atmosphere and a vacuum is drawn on the mold. The atmosphere pressure then forces the material against the mold.

Billow/air-slip vacuum forming, illustrated in FIG. 17, utilizes a pressure box with a male mold positioned inside it. The sheet is sealed against the box. The box is pressured with compressed air and the sheet billows up to form a bubble that provides the appropriate stretching. The mold is pushed up into the convex bubble. The box and the male mold are then evacuated and the sheet is forced against the mold.

Billow drape vacuum forming is a reverse draw technique that utilizes a pressure box to blow a bubble in the sheet, as shown in FIG. 18. The male mold, mounted opposite the box, is pushed into the convex bubble. The air in the bubble is vented to the atmosphere in a controlled manner. By matching the amount of air being vented to that being displaced by the mold, the sheet material is wiped or draped against the mold. When the mold completely penetrates the sheet, a vacuum is applied to the mold and the box is vented to the atmosphere to complete the forming operation.

Plug-assist and billow/plug-assist/snap back are multistep vacuum forming techniques designed to improve the wall thickness uniformity of parts produced with female molds. They utilize mechanical assists (plugs) to force more material into high dry areas of the part.

Plug assist vacuum forming, which is shown in FIG. 19, is used in conjunction with straight vacuum or drape forming techniques. The plug is mounted on a platen opposite the female mold. The sheet is sealed against the mold, and the plug pushes the material into the mold prior to drawing a vacuum. When the mold is evacuated, the material is forced off the plug and up against the mold cavity.

Billow/plug-assist/snap back forming combines several different forming techniques, as shown in FIG. 20. The sheet is sealed against a female mold. The mold is pressurized to stretch the sheet by blowing a bubble. A plug mounted opposite the mold is forced into the convex bubble, and controlled venting of the displaced air in the bubble causes the material to be draped over the plug. When the plug is fully extended, the mold is evacuated and the material is pushed off the plug and onto the mold.

Pressure forming, shown in FIG. 21, uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum forming techniques previously described.

Twin sheet forming process, shown in FIG. 22, produces hollow parts. Two sheets are positioned between two female molds with matching perimeters or contact surfaces. The mold cavity contours may or may not be identical. The molds come together and bind the two sheets together where the molds meet. The two sheets may be either pressure formed simultaneously or vacuum formed subsequently utilizing conventional forming techniques.

The term "vacuum forming processes" as used in the appended claims is intended to include pressure form and twin sheet forming processes in addition to the specifically enumerated vacuum forming techniques. In an alternative embodiment, it may also be beneficial to subsequently press the vacuum shaped article between corresponding shaped solid dies so as to improve the surface finish of the article.

Step Five: Imparting Form Stability to the Container

One of the novel features of the present invention is the ability to create containers or articles that are form stable almost immediately upon formation. Form stable containers are capable of being removed from their molds and being free standing during curing without deformation. As such, the containers can be mass produced since the dies or molds can continue to produce the containers without the traditional delay of waiting for the mixture to cure before being removed from the molds. The preferred method for imparting form stability is to heat the mixture during formation of the article. In one embodiment, this is accomplished by heating the male die and the female die each to a respective temperature before pressing the hydraulically settable mixture.

Increasing the temperature of the dies prior to the pressing step serves several functions. An excess of water is usually added to light-weight mixture for ease in molding the mixtures into the desired shape without crushing the aggregate. By applying heated dies to the mixture, a portion of the water on the surface of the container is evaporated in the form of steam, thereby decreasing the percent volume of water and, thus, increasing the form stability of the container. As this water on the surface of the container evaporates, that portion of the mixture rapidly becomes dry. The compressed dry particles on the surface of the mixture form a strong thin shell on the surface of the container which provides the container with a majority of its structural form stability.

In mixtures where Tylose® or other rheology modifying agents are used, evaporation of the water containing Tylose® results in a film of dry Tylose® bonding the cement and aggregate particles together. In turn, this bonding force increases the form stability of the containers.

The application of heat to the mixture also increases the rate of hydration and curing of the cement. As is discussed below, however, the dies remain pressed on the mixture for such a short period of time that only a fraction of the mixture reacts to become cured. The majority of strength required for form stability is a result of the friction forces of the particles and the binding strength of the dried rheology agent. As a result, the container is still considered as being in the green state even after achieving form stability.

Another benefit of increasing the temperature of the dies is to minimize adherence of the mixture to the dies. As the steam is emitted from the mixture, it creates a boundary layer between the dies and the mixture. This boundary layer provides a substantially uniform force that pushes the mixture away from the die and, thus, prevents the mixture from sticking to the dies.

Furthermore, experiments have determined that if the male die and female die have a variance in temperature, the material will have a tendency to remain on the die with the lower temperature when the dies are separated. Accordingly, one can select the die on which the container is to remain on as the dies are separated, by having the desired die have a lower temperature.

The thickness of the sheet used to make the containers must also be taken into consideration in determining the temperature of the dies and their duration of pressing. The thinner the sheet the faster the sheet dries and becomes hard. Accordingly, time and temperature for pressing is minimized as the sheet becomes thinner.

The respective temperatures of the dies is important to maximizing the speed of the manufacturing process and is dependent, in part, upon the duration that the dies are in contact with material. In general, it is desirable that the temperature be as high as possible—the higher the temperature, the faster the drying on the surface of the containers, the quicker the containers can be removed, and the more containers that can be made per unit time.

The problem with high temperatures, however, is that if the mixture becomes too hot, the water throughout the mixture, as opposed to just on the surface of the container, turns to steam. Once the dies are separated, relieving pressure on the container, the steam expands, thereby causing the container to crack or even explode.

Furthermore, the faster the material cures, the greater the likelihood of a deformity in the container as a result of differential flow. That is, as the dies are pressed together, the material flows and stretches into the desired shape. However, once the mixture on the surface of a container starts to dry, the dried cement has different flow properties than the remaining wet mixture. Differential flow can also result from misalignment of the dies which causes the mixture to flow differently on different sides of the container. This differential in flow properties can result in deformities such as conglomerates, voids, cracks and other irregularities in the structural matrix of the container.

Studies have also found that excessively high temperatures can damage some of the admixtures. For example, although cellulose fibers are initially protected by steam from the evaporating water, once typically about 20% of the water of the mixture is removed, subjecting the fibers to temperatures over about 250° C. results in degradation of the cellulose fibers. If subjected to these conditions, the cellulose fibers are unable to impart the desired flexural and tensile strength to the container.

Finally, the temperature and speed of the dies are also affected by the draw of the article being formed. An article, such as a cup, which has deep draw requires the hydraulically settable sheet to both flow and stretch over a greater distance than an article with a small draw, such as a plate. For deep draw articles, it is preferred that the dies press together under an increased velocity. By increasing the velocity of the dies, a relatively high pressure can be instantaneously applied to the hydraulically settable sheet. This pressure increases the flowability of the mixture, thereby requiring the sheet to stretch less and, thus, producing a more uniform article. Furthermore, by applying an instantaneous pressure, the duration of time that the dies are in contact with the sheet is minimized, thereby avoiding the risk of overdrying and increasing production speed. At times, it may be desirable to repeatably impact the sheet between the dies having a velocity, thereby minimizing the time period that the heated dies are actually in contact with the material.

Accordingly, the interrelationship between time and temperature is as follows: the temperature of the dies can be increased as the time that the dies are in contact with the mixture is decreased. Furthermore, the temperature can be increased as the gap distance between the dies is decreased. However, there are limits to how high the temperature can go before the admixtures become damaged.

To achieve the above-desired objectives, it has been found that the temperature of the male die and the female die should be in a range from about 50° C. to about 300° C., with 75° C. to about 200° C. being preferred, and 120° C. to about 140° C. being most preferred. In an embodiment where it is preferred to have the container remain on one die after the dies are separated, the current invention envisions a temperature variance between the male die and the female die preferably in a range between about 10° C. to about 30° C.

The process of heating the die can be achieved through a variety of methods known in the art. In the preferred embodiment, heated oil is pumped through the body of the press which in turn transfers the heat to the dies. Oil is used as it provides a uniform heat that can be easily regulated. Other fluids, such as water, can also be used. Furthermore, the dies can be heated through the use of electrical heating filaments attached to the dies or press.

The duration of time in which the heated male die and the heated female die, either in conjunction or independently, are in contact with the mixture so as to impart form stability to the container, is preferably in a range from about 0.1 seconds to about 30.0 seconds, with about 0.1 seconds to about 10.0 seconds being preferred and 0.1 seconds to about 2.0 seconds being most preferred. By lowering the temperature of the dies, however, the process of imparting form stability to the containers can be slowed to minutes, hours, or even days.

In the embodiment in which vacuum forming is used to fashion the container, the container can be heated by heating the vacuum molds. The temperatures used are similar to those described above. Where only one mold is used, the opposing surface of the container can be exposed to heated air for assistance in imparting form stability to the container. The temperature of the air should be in a range from about 50° C. to about 400° C., with 100° C. to about 350° C. being preferred and 150° C. to about 250° C. being most preferred.

As previously discussed with the rollers, form stability can also be obtained by cooling the dies. That is, by lowering the temperature of the dies below room temperature, the water on the surface of the formed containers becomes stiff, thereby imparting form stability to the container. By heating the sheet in the sheet forming process and then cooling the dies below room temperature, a thin film of water can condense between the article and dies thus inhibiting the article from adhering to the dies. In the preferred embodiment, only the surface of the container is cooled since this permits the interior mixture to continue to hydrate and, thus, gain strength while the shell thaws.

Optimization of the cooling process entails the dies being a temperature between about $-20°$ C. and about 40° C., with $-0°$ C. to about 35° C. being preferred and $-5°$ C. to about 30° C. being most preferred.

In yet another embodiment, form stability can be established through rapid evaporation. By mixing the hydraulically settable material and other desired additives with the minimal amount of water needed for hydration and then adding a non-hydrating liquid having a low vapor point to the mixture, one is able to obtain a mixture that is easily moldable and that results in a high-strength article. Once the mixture has been positioned into the desired shape, the non-hydrating liquid can be allowed to quickly evaporate, thereby producing a form stable container that can be removed from the mold for subsequent curing. The non-hydrating liquids must be highly soluble in water and uniformly dispersed in the mixture. By way of example and not by limitation, the non-hydrating liquids include alcohols, e.g., methanol, ethanol, n-propanol, n-butanol, and n-pentanol. Such non-hydrating liquids are typically added in a range between about 2% and about 50% by percent volume of water.

Other additives which assist in rapidly producing a form stable container include various carbon sources and accelerators. As previously incorporated by reference, the patent application "Process for Producing Improved Building Material And Product Thereof" discloses the addition of various sources of carbon, such as $CO_2$ and CO, to a hydraulically settable mixture. The result of the addition of carbon is, in part, a mixture that obtains early strength or form stability. Sodium carbonate and potassium carbonate can also be added to the mixture so as to obtain early form stability of the desired container. Typically, the carbonates are added to the mixture in a range between about 0.002% by molarity of the water to about 0.5%, with 0.01% to about 0.15% being preferred, and 0.1% to about 0.15% being most preferred. Similarly, citric acid can also be incorporated into the mixture for obtaining early form stability. The citric acid is typically added by weight of cement in a range between about 0.01% to about 5%, with 0.05% to about 1% being preferred, and 0.1% to about 0.2% being most preferred.

Various cellulose admixtures and starch also function to increase form stability of the container. Cellulose admixtures such as methylethylcellulose, methylcellulose, and ethylcellulose form a gel upon being heated to temperatures above about 60° C. Accordingly, by combining cellulose with the hydraulic mixture and then heating the mixture through the heated rollers or other means of heat transfer, the resulting gel can assist in imparting form stability to the container. To be effective in creating form stability, the methyl cellulose should be combined to the mixture in a range between about 0.1% by weight of the wet mixture to about 10%.

Starch can also be combined with the methylcellulose or can be combined separately with the mixture to impart form stability to the container. Heating a mixture containing starch to a temperature above 100° C. melts or dissolves the starch. Allowing the mixture to then cool, permits the starch to solidify which binds the cement particles and aggregate into an increased form stable condition. To be effective as a binding agent, the starch should be combined with the mixture in a range between about 0.1% by weight of the wet mixture to about 10%. The combination of starch and methyl cellulose thus increases form stability during heating and cooling of the mixture.

As previously discussed in the application, there are also a number of well-known accelerators used in the art of concrete that can be added to hydraulically settable mixtures to limit the time necessary for a formed article to obtain form stability. Such accelerators are typically added to the mixture in a range between about 0.05% to about 1% by weight of the cement.

With regard to the appended claims, the term "set accelerator" is intended to include the above-described carbon sources, sodium carbonate, potassium carbonate, cellulose admixtures and starch in addition to the well-known accelerators.

Finally, it should be noted that under conditions where only a minimal amount of water is added to a mixture or a water deficiency exists, it is possible to obtain a container that is form stable using dies having an ambient temperature. On the other hand, mixtures having high water concentration or the use of thick sheets may require the container to remain momentarily supported on one die after the dies are separated before form stability is reached. To assist such containers in reaching form stability, various forms heat transfer such as blowing heated air or applying microwaves can be used to dry the exposed surface of the container.

Step Six: Drying the Container

The sixth step in the manufacturing process is drying the hydraulically settable mixture so as to gain strength in the desired shape of the container. To economically produce the inventive container, the container must be rapidly dried to a point where it has sufficient strength to proceed through the remaining manufacturing processes, i.e., printing, coating, and packaging, without deformation. Furthermore, the container must gain sufficient strength for its intended use. Of course, the required strength will vary depending on the type of article manufactured.

In the preferred embodiment, drying the container is accomplished by exposing the container to heated air, such as in a conventional tunnel oven. The oven can be configured either for batch mode drying or for a continuous conveyor process. The application of the heated air drives off a portion of the water in the hydraulically settable mixture, thereby increasing the friction forces between the particles and creating a bonding film of Tylose®, thereby, increasing the strength of the resulting container.

Furthermore, the application of heated air to the containers increases the hydraulic reaction rate of the hydraulically settable material which, in turn, provides early strength to the container. Accordingly, as the container is dried, the container obtains its strength from friction forces between the particles, Tylose® bonding, and curing of the hydraulically settable mixture.

To increase the rate at which water is removed from the hydraulically settable mixture, the heated air is blown over the container. Studies have found that the higher the air speed, the shorter the drying time. The air speed, however, must not be so great as to disrupt the production process.

Ideally, the container is dried only to the extent that it has sufficient strength for production and transport without deformation. By permitting the container to retain a small amount of unreacted water, the container continues to cure, and, thus, increase in strength, during the time period it is transported and stored prior to use.

It is the ability to rapidly harden the containers that makes it possible to economically complete their mass production. Drying of the containers is influenced by five different parameters: time, temperature, air speed, surface area, and thickness of the material. Empirical studies have made the following conclusions with regard to these parameters:

1) The higher the temperature, the shorter the drying time.
2) The higher the air speed, the shorter the drying time.
3) Once a majority of the water is removed from a container, exposing the container to temperatures above 250° C. will burn the fibers in the mixture, thereby decreasing tensile strength of the fibers and containers.
4) The thinner the material wall of the container, the shorter the drying time.
5) The higher the temperature, the lower the tensile strength of the container.
6) Air speed and total time in the oven have no effect on the tensile strength of the container.

Based on the above observations, the recommended drying conditions for a conventional cup having a thickness in a range from about 1 mm to about 2 mm includes the air in the oven having a temperature in a range of about 100° C. to about 300° C., with about 140° C. to about 250° C. being preferred, and from about 150° C. to about 200° C. being most preferred. The time period during which the container is exposed to the heated air can range up to about 1 hour, with less than 15 minutes being preferred, and less than 1 minute being most preferred. The above values, however, change depending on the size, shape, and thickness of the article and the water content of the mixture.

In an alternative embodiment, since the fibers do not burn in the mixture at temperatures above 250° C. until a majority of the water is removed, the drying process can also be accomplished in two stages. First the containers can be exposed to temperatures above 250° C., typically in the range between about 250° C. and about 500° C., so as to rapidly remove a portion of the water. Once between about 60% to about 80% of the water is removed, the temperature is decreased to below 250° C. for removal of the remainder of the water. This process increases the rate at which the containers are dried but must be regulated with greater care so as not to burn the fibers. Of course, other conventional means for drying the containers (e.g., microwaves, infrared light, etc.) can be used.

Step Seven: Coating

If necessary, the seventh step in manufacturing process is applying a coating to the container. It is envisioned that some containers, especially those used for dispensing beverages, may require the application of a coating. Coatings are desirable in providing a surface that is aesthetically pleasing to the consumer and inhibits liquids from absorbing into the dried hydraulically settable container.

The preferred method for the application of the coating comprises spraying the coating onto the surface. Both the inside and outside surfaces of the container can receive the coating. Alternative methods for application of the coating include dipping or painting the coating on the surface. The step of applying the coating may further include applying heated air, as previously discussed in the drying step, to dry the coating.

There are a variety of times during the manufacturing process when the coating can be applied. For example, the coating can be applied after the sheet is formed but before the container is shaped. Likewise, the coating can be applied after the container is dried or after the printing is applied. Application of the coating while the mixture is in the sheet form can be accomplished by any of a number of means well known in the art of applying coating to paper. For example, the coating can be applied to the surface of the sheet by means of a gravure roller, often in conjunction with a doctor blade in order to smooth or adjust the thickness of the coating. In addition, coatings may be coextruded along with the sheet in order to integrate the coating process with the extrusion process.

There are also numerous types of coatings that can be applied. In one embodiment, the containers are coated and sealed with a layer of calcium carbonate to ensure that they are impermeable to liquids. Besides calcium carbonate, any FDA approved coating material would work depending on the application involved. Other coatings include clay and mica, which have good printing capability.

For example, a coating comprised of sodium silicate, which is acid resistant, is a particularly useful coating where the container is exposed to goods having a high acid content. Where it is desirable to protect the container from basic substances, the containers can be coated with an appropriate polymer or wax, such as bee's wax or mineral wax or starches, which have been used to coat paper containers.

In some applications, such as in the products which tend to emit water vapor, it is important that the coating allow the container to "breathe," or be permeable to water molecules, while still maintaining its ability to be waterproof. In other words, in a "breathable" container, water cannot pass through the wall of the container, but water vapor can. This can be an important quality of a "clam shell" used by the fast food industry to dispense hamburgers and sandwiches.

Another type of coating that may be placed on the surface of the cementitious containers of the present invention is a reflective coating for reflecting heat into or out of the container. Such reflective coatings are known in the art, although their applicability to containers is novel.

While the specific coating which may be used will depend upon the desired features for the final products, most coatings will be applied in a solvent. Upon evaporation of the solvent, the coating remains on the surface of the article of manufacture. Examples of suitable coatings include melamine, polyvinyl chloride, polyvinyl alcohol, polyvinyl acetate, sodium silicates, calcium carbonates, polyacrylates, acrylic acrylate, polyurethanes, polylatic acid, biopolylatic acid, other biodegradable polymers, and Opadry Type F® which contains hydroxypropyl methylcellulose and polyethylene glycol and is manufactured by Colorcon of West Point, Pa.

Step Eight: Printing

Another optional step in the manufacturing process is applying print or designs to the container. It is envisioned that a conventional transfer printer will be used to apply ink or other printing indicia in the desired design. However, any hand or mechanical means can be used. Of course, hydraulically settable products such as those disclosed herein are particularly well suited for such a use. Furthermore, as mentioned above, it is within the scope of the present invention to coat the containers with a government approved coating, most of which are currently used and well adapted for placing indicia thereon.

As with the step of coating, printing can be applied at various points along the manufacturing process such as on to the sheet and after the container is formed. Application of print to the mixture in the sheet can be applied by a conventional offset printer. Furthermore, heated air can be applied to the container, if necessary, to quickly dry the printing.

Step Nine: Cutting and Packaging

Once the container has been dried, it can be cut from the remaining portion of the sheet by a conventional stamp press. Cutting the container from the sheet can be performed before, during, or after the coating and printing steps. The remainder of the hydraulically settable sheet not used in the formation of container can be either disposed of, such as in a landfill, or can be ground-up and recycled in the hydraulically settable mixture or used as an aggregate in other conventional cement based materials. Finally, once the containers have completed their manufacturing process, they are packaged in preparation for transportation.

D. System For Production of Containers

The following is a preferred manufacturing system and alternative embodiments for mass producing cementitious containers, more specifically, "clam shells" for fast food restaurants. The system uses a calendering/molding process and has an estimated production capacity of upwards to 1000 or more containers per minute. The manufacturing system can be discussed in terms of twelve stations or separate processes which are memorialized in the flow diagram of FIG. 1 and the schematic drawing of FIG. 2. The system disclosed is only an example of one possible embodiment. The various stations or processes can be added, subtracted, or reorganized to fit specific design parameters. It is envisioned that the apparatus comprising the system will be operated under the conditions and parameters as discussed above in the method section. Although the system discloses the production of a "cementitious container" it should be noted that the same system is applicable to the production of containers or articles from any hydraulically settable material.

1. Bulk Storage

Figure 2:
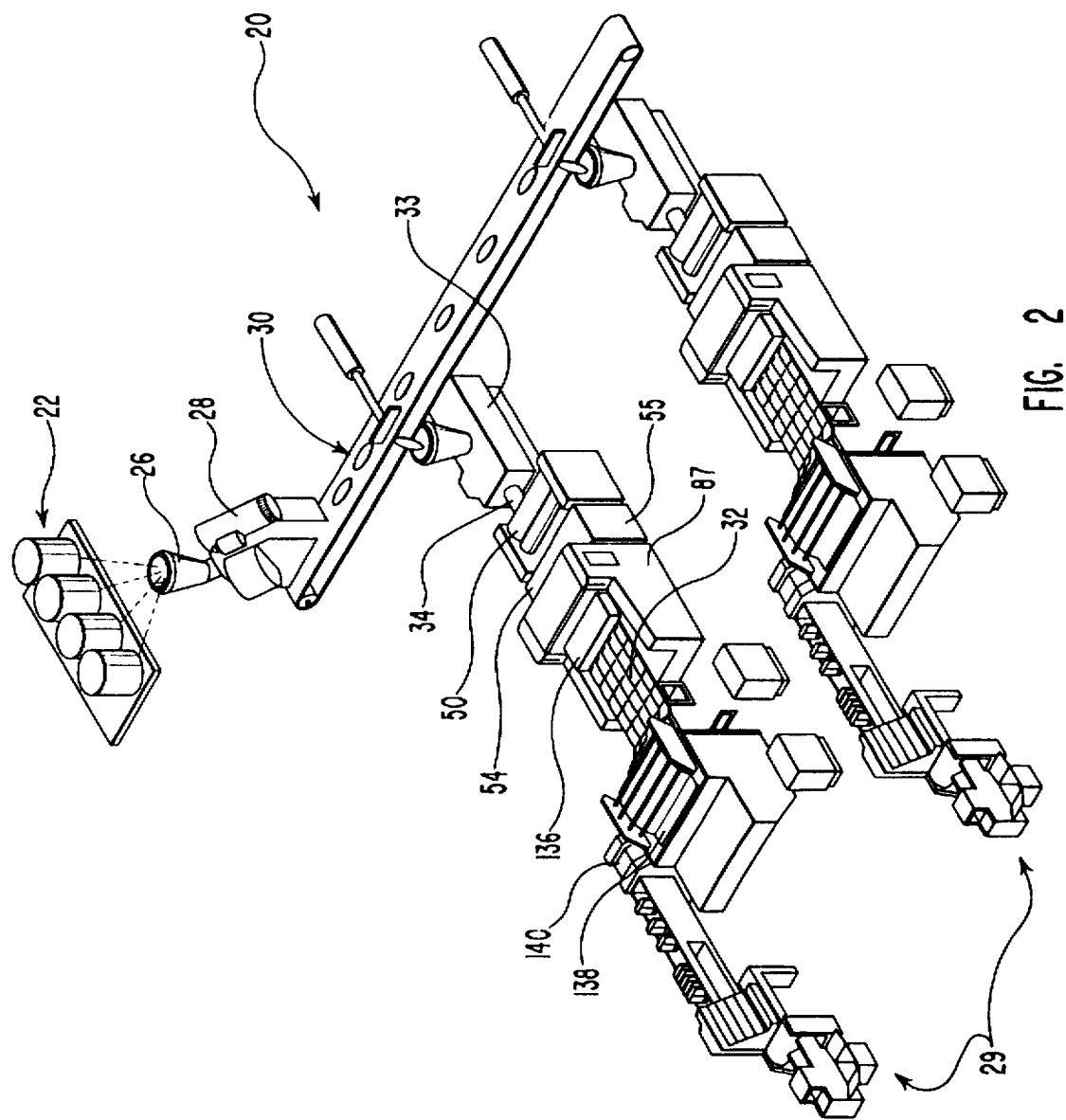
FIG. 2 is a schematic view of an assembly system for mass producing hydraulically settable containers.

As shown in FIG. 2, a system 20 used to manufacture cementitious containers includes a bulk storage area 22 used to contain the components for the cementitious mixture. The components include water, hydraulic cement (such as a portland-type cement), fibrous material (typically a cellulose fiber such as abaca fiber), rheology-modifying agents (such as methylhydroxyethylcellulose, more commonly known Tylose®), and aggregates (such as perlite or hollow glass spheres). A more comprehensive list of all possible components of the cement mixture is discussed in the above method section and can be found in the United States patent applications entitled "Cementitious Materials For Use In Packaging Containers and Their Methods of Manufacture" and "Cementitious Food and Beverage Storage, Dispensing, and Packaging Containers and The Methods of Manufacturing Same" which were specifically incorporated by reference earlier in the specification.

These materials are shipped and stored in bags, cartons, or bins which are moved with conventional manually operated transport equipment (fork lifts, 2-wheelers, etc.). Experience has shown that with minimal automation, one operator will, on average, be able to move 20–25 pounds of bulk material per minute over the course of a typical shift.

2. Metering/Mixing

Once system 20 is in operation, the selected components are loaded into hopper 26 where they are metered by weight and feed into a cement mixer 28 for the creation of the cementitious mixture. As previously discussed, the cementitious mixture is microstructurally engineered such that the metering of the components depends on the properties desired. In a typical mixture, the components are preferably added in the following order:

| Mix Conditions | Materials | Amounts (lb/10,000 Clamshells) | Duration |
| --- | --- | --- | --- |
| High Shear | Water | 377 | 1 Minute |
|  | Cellulose Fiber | 13.5 |  |
|  | "Tylose" Additive | 6.7 |  |
| Low Shear | Cement | 134.5 | 5 Minutes |
|  | Perlite | 201.8 |  |
| TOTAL |  |  | 6 Minutes |

In the preferred embodiment, cement mixer 28 is capable of both high and low shear mixing. The internal components of the mixer can be made of stainless steel because the abrasion to the mixer is not great due to the lubrication as a result of the water component. However, the internal components of the mixer can be carbide hard-coated for extended life, thereby resisting the abrasion expected from the aggregates and the cement. Such mixers are well known in the art and include the Eirich Rv-11 mixer.

Alternative high energy mixers as previously discussed are depicted in U.S. Pat. No. 4,225,247 entitled "Mixing and Agitating Device" and U.S. Pat. No. 4,552,463 entitled "Methods and Apparatus For Producing A Colloidal Mixture" which were previously incorporated herein by specific reference.

A single mixer can typically supply mixed material for two downstream production lines 29. The mixer can handle up to 13 cubic feet of material per batch and assuming a 6 minute mix cycle, is capable of producing 4000 pounds of material per hour assuming thirty-one pounds per cubic foot. A total of about 1400 pounds per hour is required for desired production, representing an excess capacity of about 200%.

Figure 3:
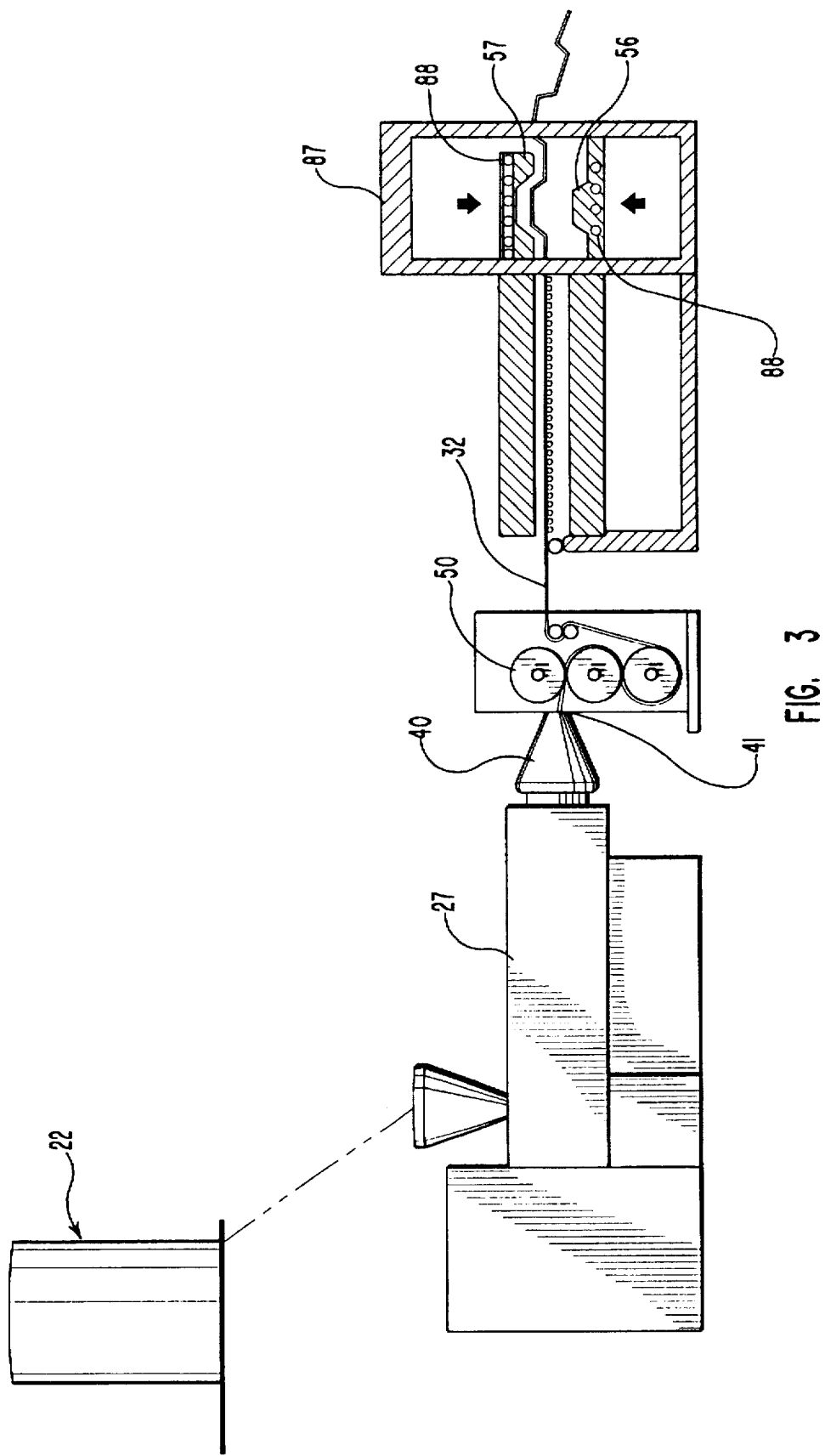
FIG. 3 is a side view of a portion of the assembly system of FIG. 2.

Depicted in FIG. 3, the currently preferred embodiment for the industrial setting is equipment in which the materials incorporated into the hydraulically settable mixture are automatically and continuously metered, mixed, deaired, and extruded by a twin auger extruder apparatus 27. A twin auger extruder apparatus 27 has sections with specific purposes such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into twin auger extruder apparatus 27. The preferable twin auger extruder apparatus 27 utilizes uniform rotational augers wherein the auger rotate in the same direction. Counter-rotational twin auger extruders, wherein the augers rotate in the opposite directions, accomplish the same purposes. A pug mill may also be utilized for the same purposes. Equipment meeting these specifications is available from Buhler, Inc., located in Minneapolis, Minn.

3. Extruder

Figure 4:
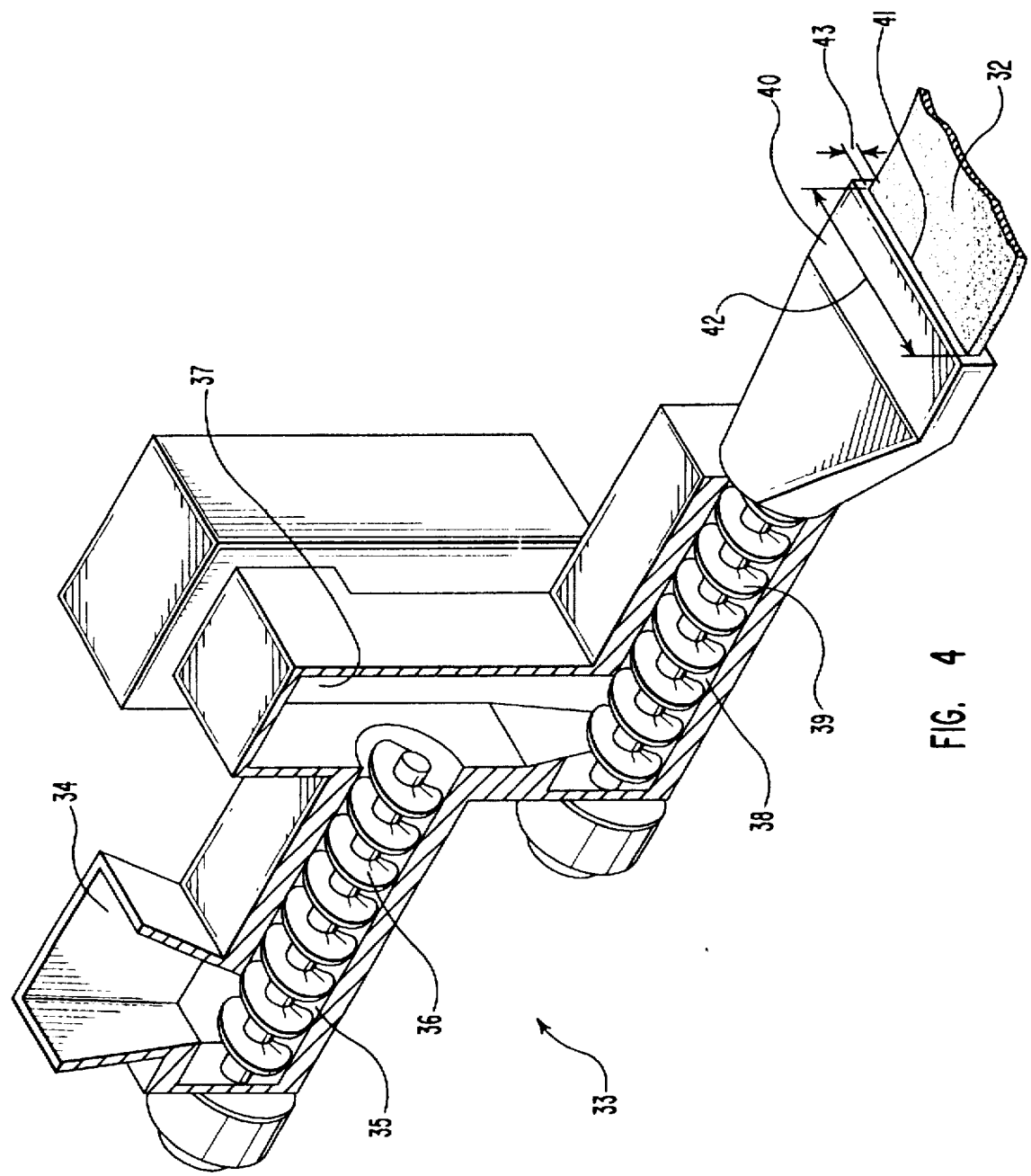
FIG. 4 is a cross sectional view of an auger extruder with a vacuum chamber.

Once an appropriate cementitious mixture has been obtained, the mixture is conveyed by means of a conveyer belt 30 into an extruder that forms the cementitious mixture into a cementitious sheet 32. FIG. 4 is a closeup view of an auger extruder 33, which includes a feeder 34 that feeds the hydraulically settable mixture into a first interior chamber 35 within auger extruder 33. Within first interior chamber 35 is a first auger screw 36 which exerts forward pressure on and advances the hydraulically settable mixture through first interior chamber 35 toward vacuum chamber 37. Typically, a negative pressure or vacuum will be applied to vacuum chamber 37 in order to remove unwanted air voids within the hydraulically settable mixture.

Thereafter, the hydraulically settable mixture will be fed in a second interior chamber 38. A second auger screw 39 will advance the mixture toward a die head 40 having a die orifice 41 with a die length 42 and a die height 43. The cross-sectional shape of the die orifice 41 is configured to create a sheet of a desired width and thickness that will generally correspond to the die length 42 and die height 43.

Figure 5:
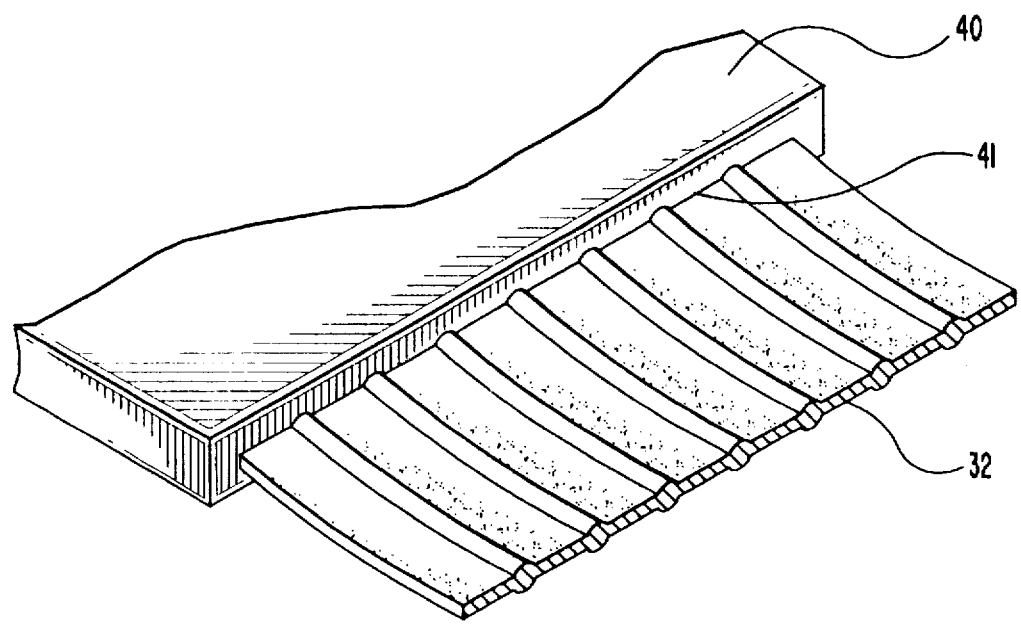
FIG. 5 is a perspective view of a die orifice having a varied thickness along its length.

Although die orifice 41 is typically rectangular in shape, as shown in FIG. 4, die height 43 can very along die length 42 so as to selectively shape cementitious sheet 32 as shown in FIG. 5. In the system disclosed, the die orifice is 42 inches in length and 1.0 inches in height, thereby producing cementitious sheet 32 having a width and thickness of respective corresponding measurements.

Figure 6:
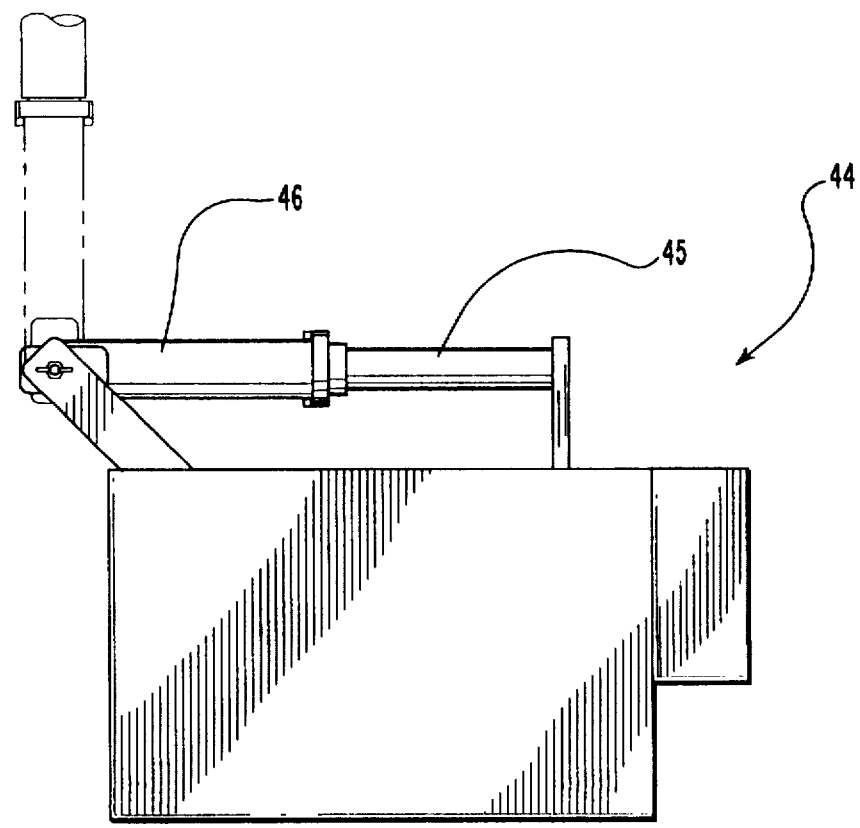
FIG. 6 is a side view of a piston extruder.

Alternatively, as seen in FIG. 6, the extruder may comprise a piston extruder 44 instead of an auger extruder 33. Piston extruder 44 utilizes a piston 45 instead of an auger screw in order to exert forward pressure on and advance the hydraulically settable mixture through the interior chamber 46. An advantage of using a piston extruder 44 is the ability to exert much greater pressures upon the hydraulically settable mixture. Nevertheless, due to the highly plastic-like nature of mixtures typically employed in the present invention, it is not generally necessary, or even advantageous, to exert pressures greater than those achieved using an auger extruder 33.

In contrast, an important advantage of using an auger extruder 33 is that it allows for a continuous extrusion process, whereas a piston extruder 44 will generally be useful for extruding in batches. In addition, an auger extruder 33 has the ability to remove unwanted macroscopic air voids within the hydraulically settable mixture.

The above-discussed extruders are well known in the art and can be purchased from companies such as Frecon Ceramics of Cincinnati, Ohio, and Buhler, Inc. of Minneapolis, Minn.

4. Calendering

Figure 7:
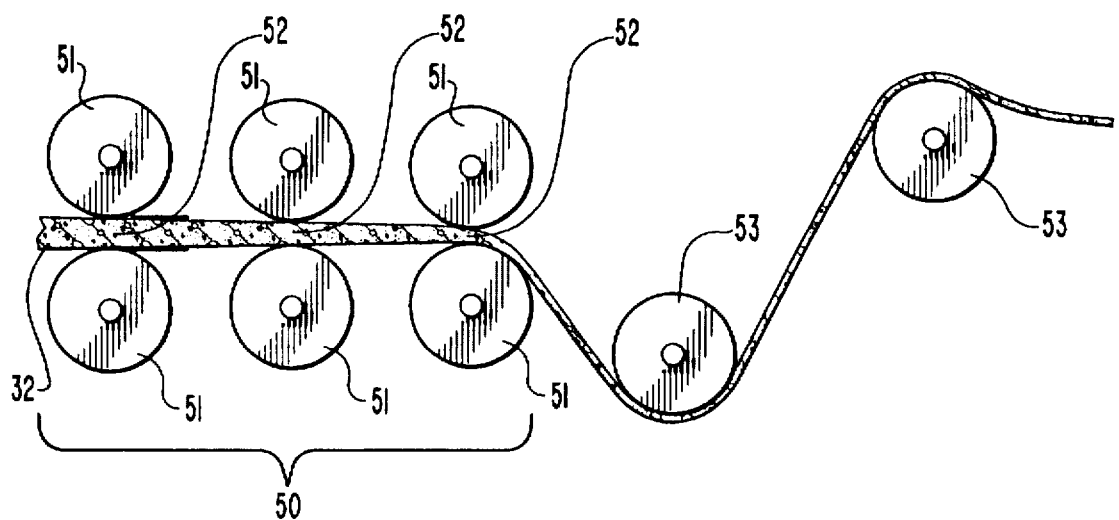
FIG. 7 is a side view of a plurality of reduction rollers and drying rollers through which the hydraulically settable sheet is passing.

As shown in FIG. 2, cementitious sheet 32 is then conveyed to reduction rollers 50 for imparting a desired thickness and surface to the cementitious sheet. FIG. 7, reveals a plurality of reduction rollers 50. Each set of the reduction rollers includes two rollers 51 separated by a gap distance 52 through which the cementitious mixture passes. Gap distance 52 incrementally decreases in each subsequent set of reduction rollers 50, thereby incrementally decreasing the thickness of cementitious sheet 32 until it achieves the desired thickness of about 2 mm.

Reduction rollers 50 are heated to provide a steam layer that minimizes adhering of cementitious sheet 32 to the rollers. The heated rollers also drive off a portion of the water from the mixture to increase stability of cementitious sheet 32. Where it is desirable to further dry the sheet, the sheet can be passed over drying rollers 53.

Reduction rollers 50 are typically made of metal and preferably made of polished chrome or nickel to assist in preventing the cementitious mixture from adhering to the rollers. Non-stick coating, such as teflon, can also be applied to rollers.

Figure 8:
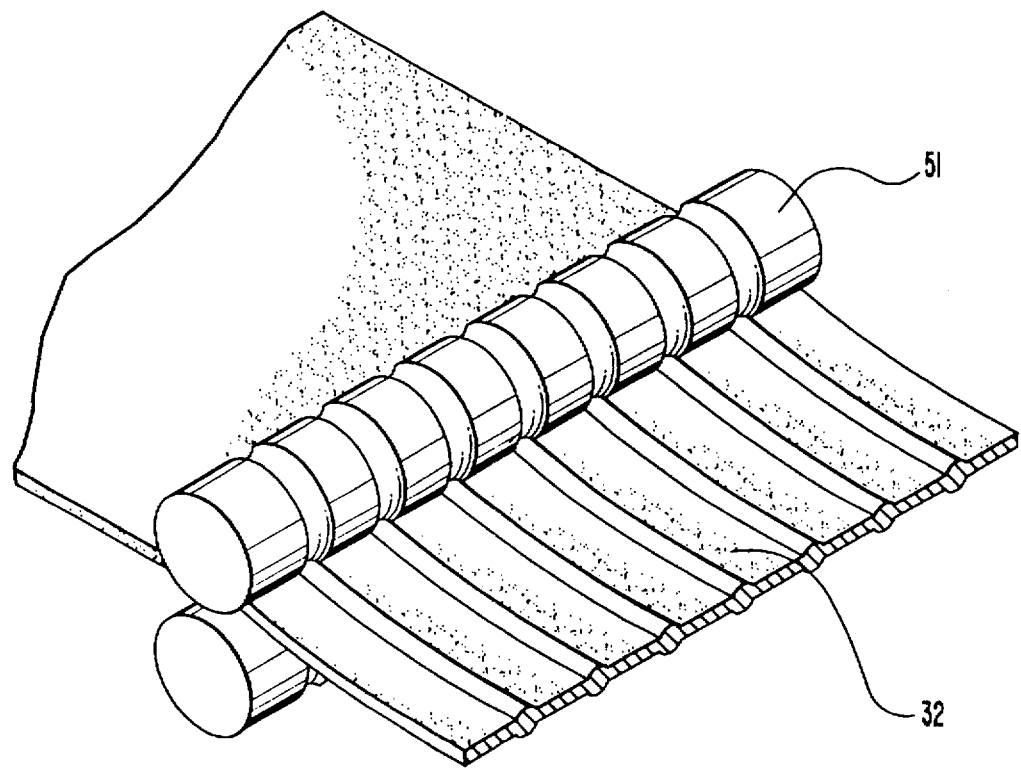
FIG. 8 is a perspective view of a set of reduction rollers having a varied diameter along their length.

In some cases it may be desirable to vary the thickness of cementitious sheet 32 along the length and width of cementitious sheet 32 as it passes through the rollers. This can be accomplished in a number of ways such as varying the diameter of the rollers along their length (See FIG. 8). Furthermore, the rollers can be regulated to vary the gap distance between the rollers as cementitious sheet 32 is fed between the rollers. The above rollers are known in the art and can be obtained from companies such as B. F. Perkins of Chicopee, Mass., and Beloit of Beloit, Wis.

With regard to the appended claims, the means for forming the hydraulically settable mixture into sheets comprises the above-discussed extruder and rollers and the equivalence thereof.

5. Offset Printing

As shown in FIG. 2, while the cementitious material is still in sheet form, a printer 54, preferably an off-set or flexo-graphic print system, is used to print multi-colored labels and designs onto the cementitious sheet. The application of printing indicia, if desired at all, can also be performed by a conventional transfer printer after the container is formed and hardened. Conventional printers can be obtained from Heidelberg West of Domingus Hills, Calif.

6. Coating

A coating mechanism 55 can also be used to apply a coating to cementitious sheet 32 before the cementitious container is formed. The coating serves to provide a better finish to the container and to prevent the container from absorbing liquids during use. The coating can be applied to either one or both sides of the sheet by conventional sprayers. Further, conventional coaters used in the coating process of paper can be used. Such coaters include blade coaters, puddle coaters, air-knife coaters, roller coaters, and gravure coaters.

As with the printing, the coating can also be applied after the container is formed. In such an embodiment, nozzles can be lowered into the container which spray on the coating as the nozzles are raised. No rotation of the cups is anticipated but could be useful under certain circumstances.

It is envisioned that conventional spray equipment can be used. If the coating process requires two steps, a primer and a final coat, two such spray systems can be readily used.

7. Molding

Figure 9:
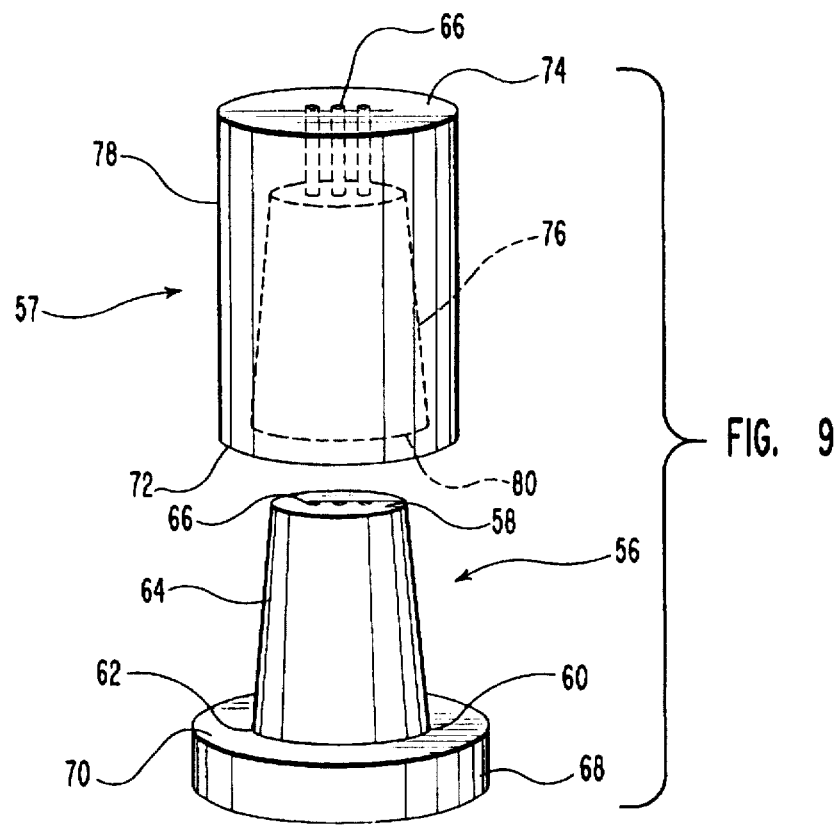
FIG. 9 is a schematic view of the solid male die and the solid female die.

In accordance with the present invention there are also provided means for pressing the cementitious mixture into a desired shape for a cementitious container. By way of example and not limitation, there is shown in FIG. 9 a male die 56 of a desired shape and a female die 57 having a configuration substantially complementary of the male die shape. The cementitious sheet 32 is positioned between the dies after which a portion of cementitious sheet 32 is pressed between the dies, thereby forming the cementitious container.

The dies can be made of several different types of materials. Such materials, however, must be able to withstand the corrosive and abrasive effect of the cementitious mixture and be able to endure the pressures and temperatures of the manufacturing process as previously discussed. By way of example and not by limitation, such materials may be ceramics, composites, plastics, and metals. The preferred materials are metals (such as brass, steal, aluminum, and copper) due to their high durability and conductive properties. Metals which are most preferred are nickel and chrome which can be polished to a smooth surface which improves mold release. The dies can also be coated with any of a number of traditional non-stick coatings which would be useful in preventing adhesion of the cementitious mixture to the dies.

Figure 10:
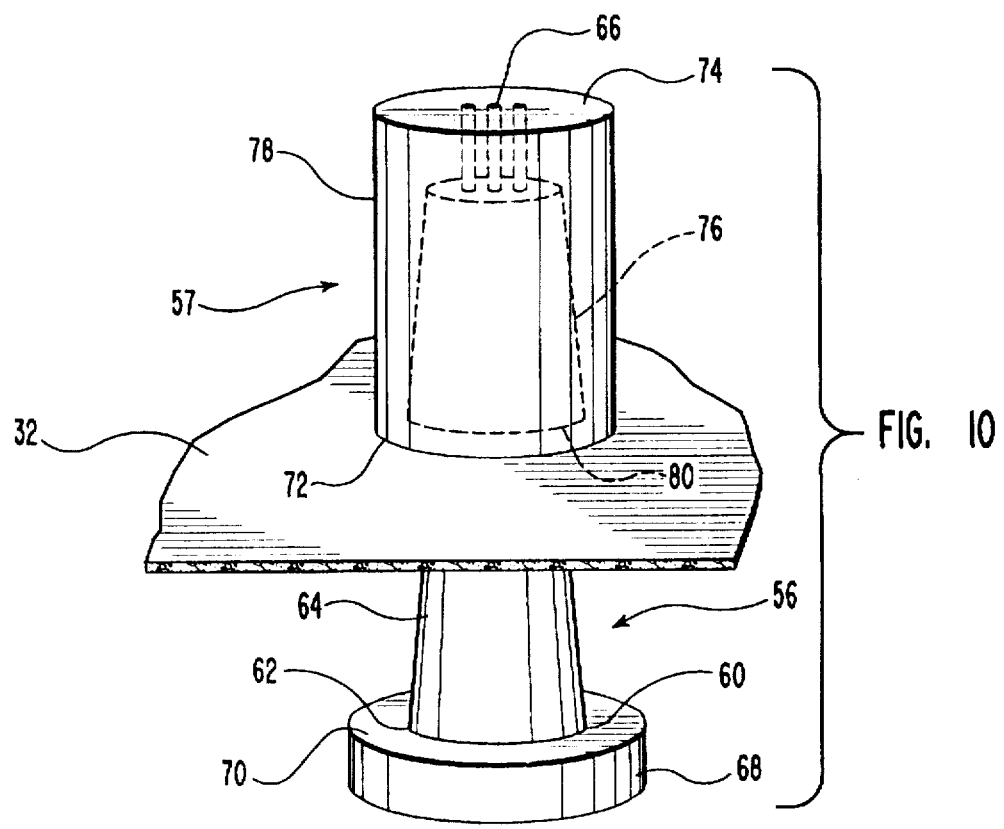
FIG. 10 is a schematic view of a portion of the hydraulically settable sheet positioned between the male die and female die of FIG. 9.
Figure 11:
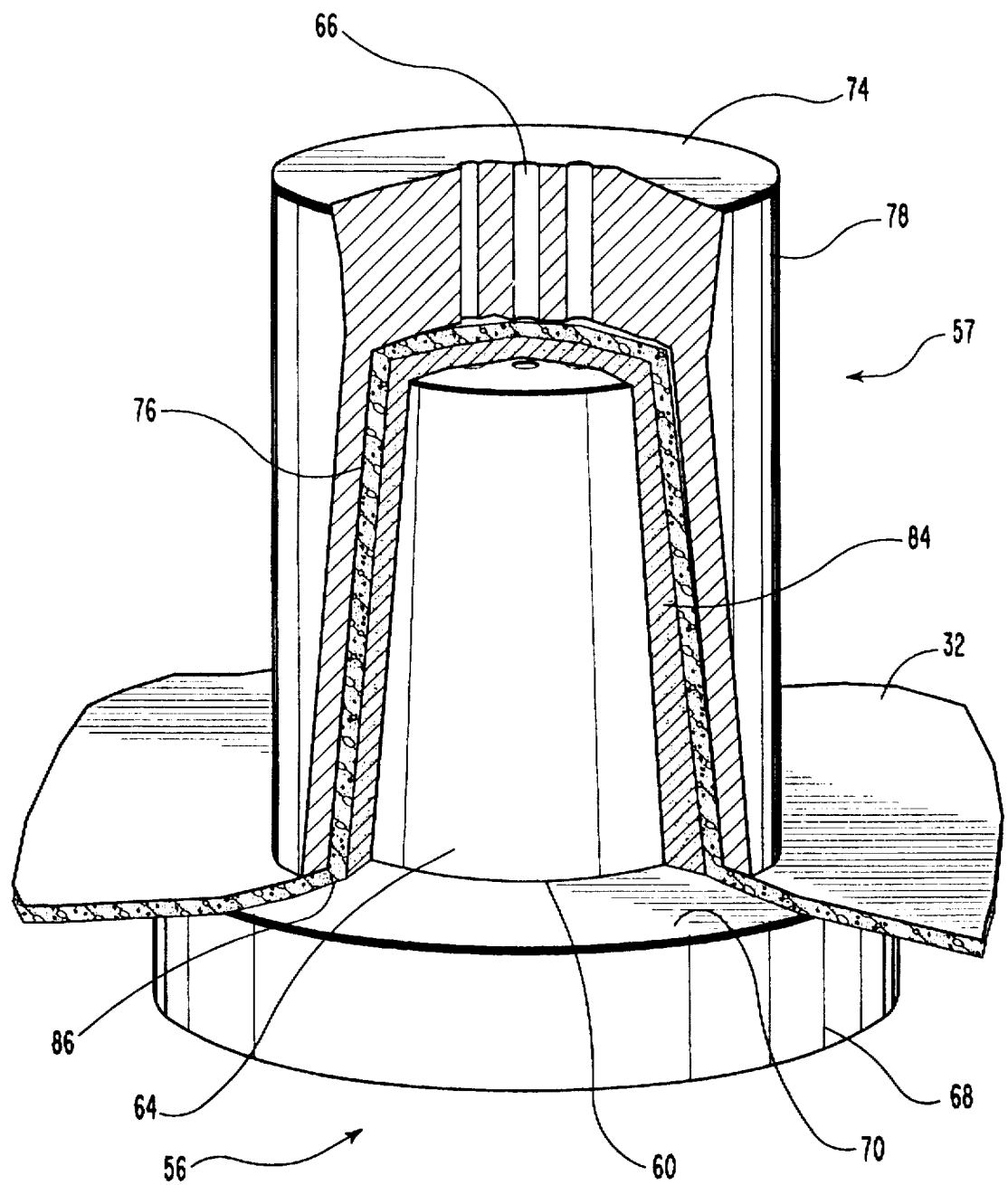
FIG. 11 is a schematic view of the step of pressing the hydraulically settable sheet between the male die and female die to form the hydraulically settable container.

The dies shown in FIGS. 9–11 have a frustoconic shape for manufacturing a cementitious container in the shape of a cup. However, as previously discussed, the dies can be in any one of a variety shapes needed for manufacturing the food and packaging containers of the present invention. Male die 56 is depicted in FIG. 6 as having a top 58, a base 60 with a circumference 62, and a side surface 64 extending from top 58 to base 60. Extending through top 58 are vent holes 66. Attached to base 60 is a template 68 having a resting surface 70 on which female die 57 presses when male die 56 and female die 57 are mated.

Female die 57 comprises a first end 72, a second end 74, an interior surface 76, and an exterior surface 78. Vent holes 66 extend from interior surface 76 to exterior surface 78 through second end 74. First end 72 defines a mouth 80 leading to interior surface 76. Interior surface 82 has a substantially complimentary configuration of male die 56. Interior surface 76, however, is slightly larger than male die 56 such that a molding area 84 is formed between male die 56 and female die 57 when the dies are mated.

FIG. 10 shows cementitious sheet 32 between male die 56 and female die 57 prior to mating of the dies. By pressing male die 56 and female die 57 together, as shown in FIG. 11, a portion of cementitious sheet 32 is pressed into molding area 84 between the dies to form a portion of cementitious sheet 32 into the desired shape for the container. During the molding process, first end 72 of female die 56 presses sheet 33 against resting surface 70 of template 68 so as to form the container having a lip 86 contacting resting surface 70.

As male die 56 and female die 57 are pressed together, air between the dies is permitted to escape through vent holes 66. Preferred structures and orientations of vent holes 66 are as previously discussed in the method section.

In accordance with the present invention there is also provided means for heating the cementitious container to impart form stability to the cementitious container of the desired shape. By way of example and not limitation, there is shown in FIG. 3 a press 87 having male die 56 and female die 57 attached thereto. Extending through press 87 are heating tubes 88 through which heated liquids such as oil and water can be passed for transferring heat to the dies and thus the containers.

In the system disclosed, a 64 cavity press is envisioned which operates at about 25 cycles/minute. The female die is the rigid tool, while the male die is a movable tool which presses the material into place. The female tool is chosen to be rigid to provide the best surface finish on the exterior of the part. Either the male die or the female could be the upper or lower tool.

Figure 12:
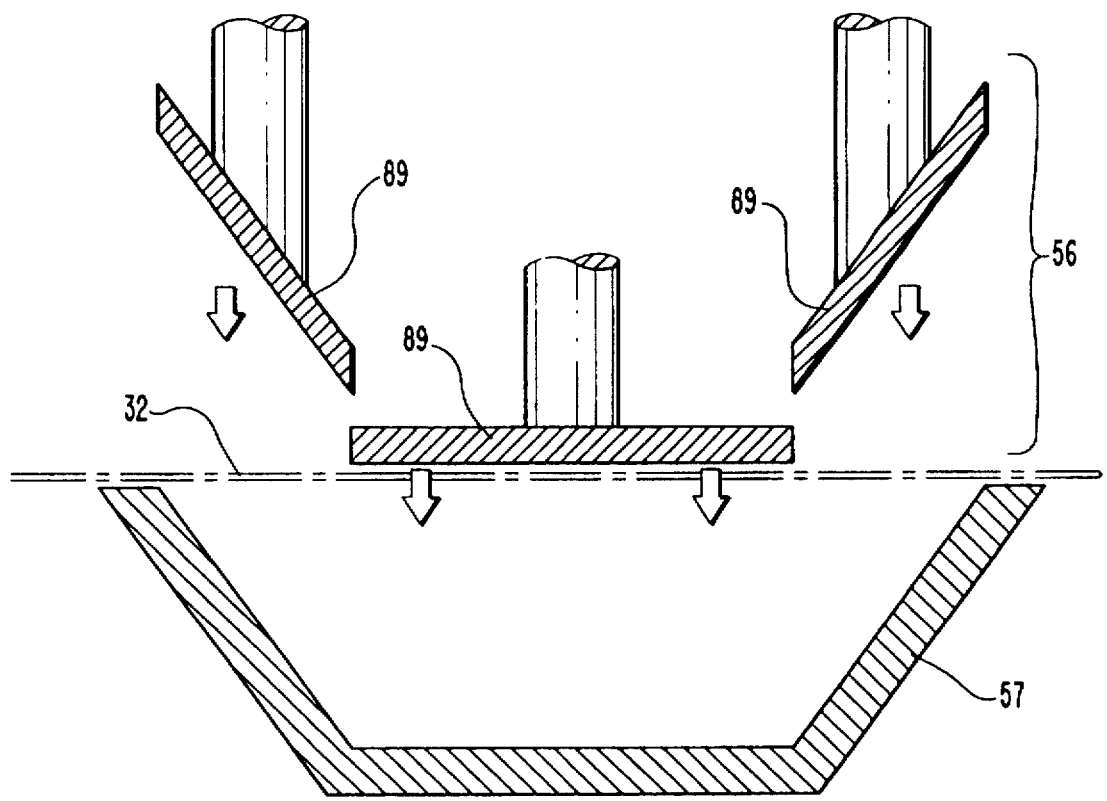
FIG. 12 is a cross sectional view of a progressive die.
Figure 13:
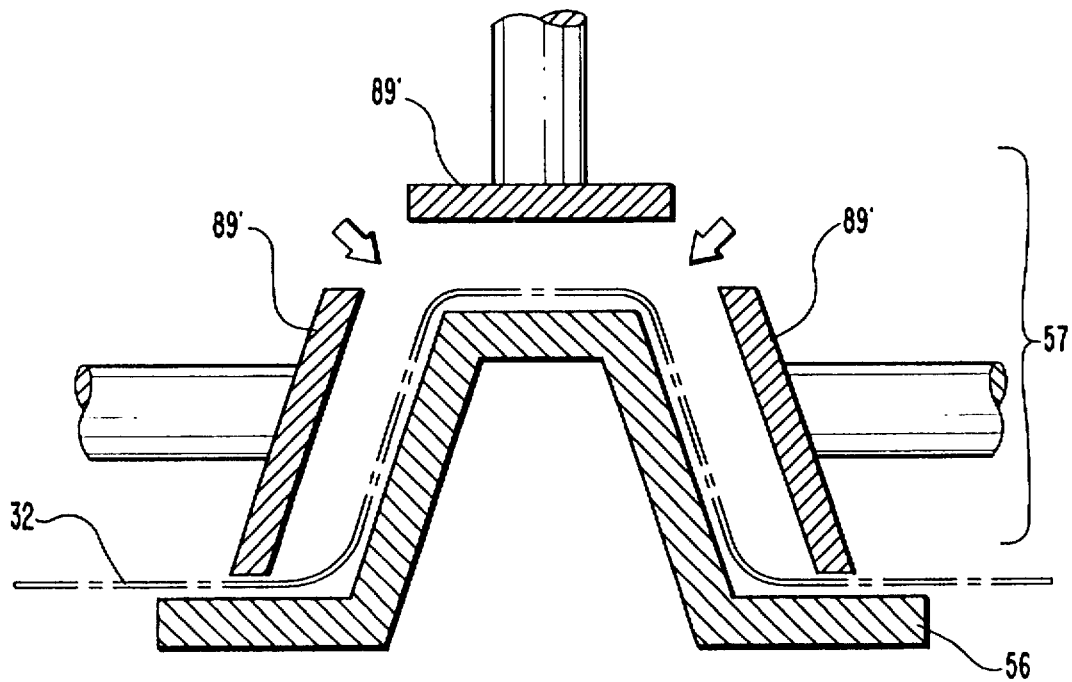
FIG. 13 is a cross sectional view of a split die.

As shown in FIG. 12, the dies can also be fashioned as progressive dies 89 which press together in a selective sequential fashion to minimize stretching the sheet. Likewise, as shown in FIG. 13, the dies can be split dies 89' which simultaneously press together at different angles to easily fashion complex shapes.

Alternative means for fashioning the cementitious container from cementitious sheet 32 comprise the apparatus used with the various vacuum forming techniques. As discussed in the section on the methods of manufacturing, vacuum forming uses atmospheric pressure (14.7 psi) to force cementitious sheet 32 to conform to a mold. Both male and female molds of any desired shape can be used for vacuum forming. The type of molds elected dictates which forming technique should be used. The apparatus associated with each of the common vacuum forming techniques is discussed below.

Figure 14A:
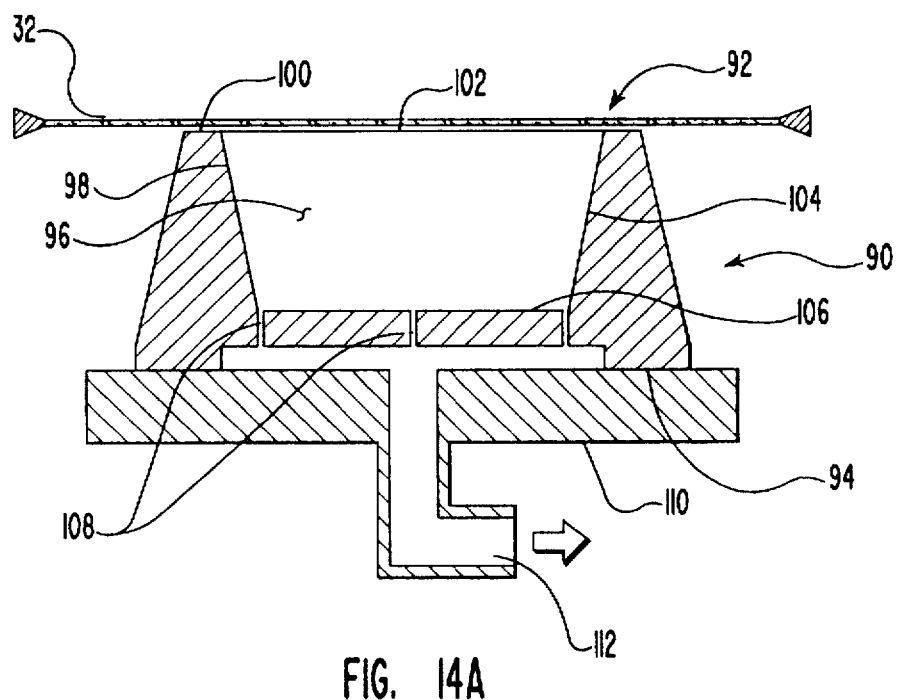
FIG. 14 is a schematic view of straight vacuum forming.
Figure 14B:
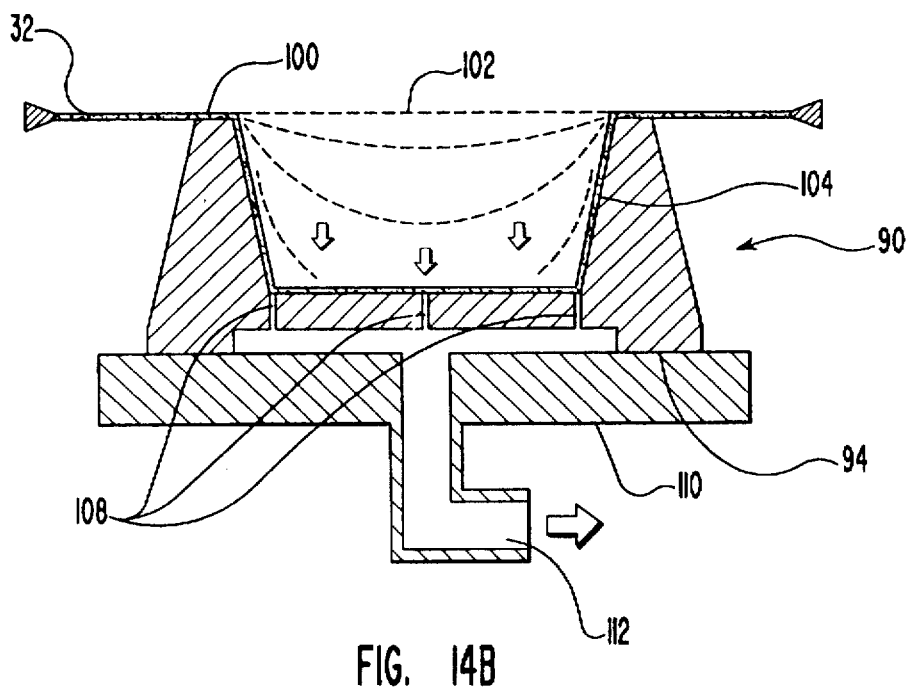

Straight vacuum forming, shown in FIGS. 14A–B, uses a female mold 90 having a first end 92, a second end 94, a cavity 96, and an interior surface 98 which defines cavity 96. First end 92 includes a lip 100 which defines an entrance 102 to cavity 96. Interior surface 98 includes side walls 104 and a bottom 106 having holes 108 penetrating through second end 94. Attached on second end 94 of female mold 90 is a platen 110 having a vacuum port 112 that communicates with cavity 96 through holes 108. Female mold 90 functions by sealing cementitious sheet against lip 100 so as to cover cavity 96. Vacuum port 111 is then used to evacuate the air within cavity 96, thereby causing the atmospheric pressure to push cementitious sheet 32 into cavity 96 so as to form cementitious sheet 32 into the shape of interior surface 98.

Drape vacuum forming, shown in FIG. 15, is similar to straight vacuum forming except that cementitious sheet 32 is pressed on to female mold 90 such that the portion of cementitious sheet 32 that is not covering cavity 96 is substantially aligned with bottom 106 of female mold 90. Once cementitious sheet 32 is properly positioned, a vacuum is applied as previously discussed.

Figure 16A:
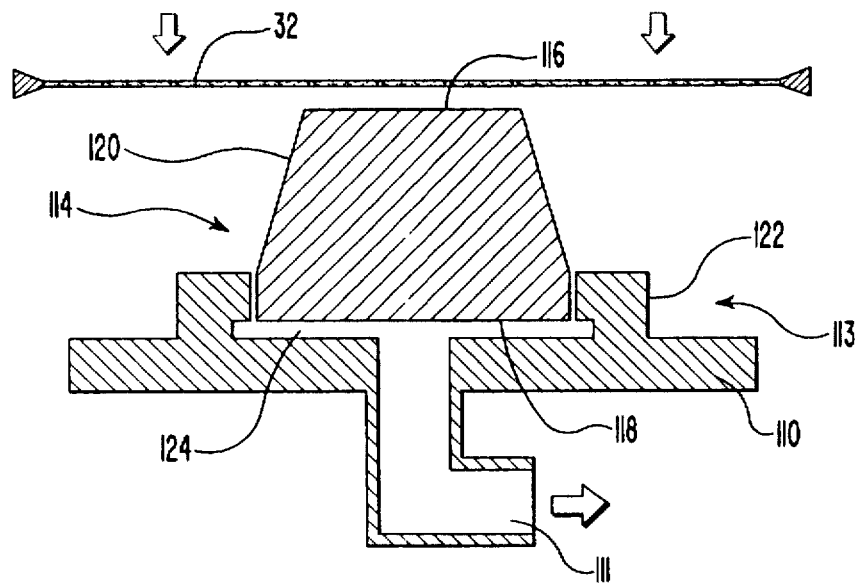
FIG. 16 is a schematic view of drape forming.
Figure 16B:
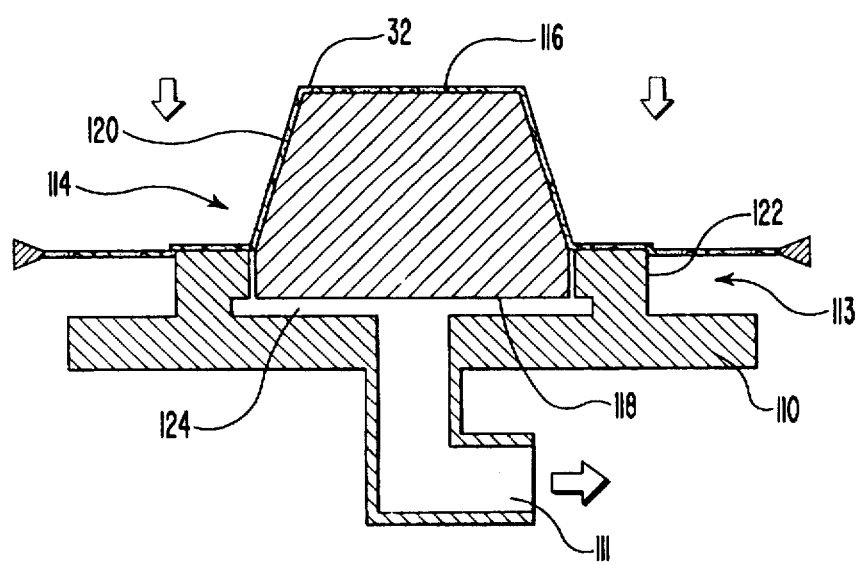

Drape forming, as opposed to drape vacuum forming, uses a male mold 113 as shown in FIGS. 16A–B. Male mold 113 comprises a projecting die 114 having a top 116, a bottom 118 and side wall 120 extending from top 116 to bottom 118. Extending from side wall 120 at bottom 118 of die 114 is a sealing lip 122. Sealing lip 122 rests on a platen 110. Male mold 113 further comprises a passage 124 extending between sealing lip 122 and projecting die 114 and communicating with vacuum port 111 of platen 110.

In operation, cementitious sheet 32 is pressed on to male mold 113 such that cementitious sheet 32 is sealed against sealing lip 112. The air between cementitious sheet 32 and the male mold 113 is then evacuated through vacuum port 111, thereby causing cementitious sheet 32 to form into the desired shape of the projecting die 114.

Snap-back, billow/air slip, and billow drape are multistep vacuum forming techniques designed to improve the wall thickness uniformity of products produced on male mold 113 by prestretching the sheet prior to its contacting the mold. Stretching the sheet freely in air without touching anything allows the material to thin out uniformly. As a result, the sheet's surface area is also increased so that it more closely matches that of the mold.

Snap-back vacuum forming, as shown in FIGS. 17A–B, utilizes male mold 113 in conjunction with a vacuum box 126 to form the cementitious container. Vacuum box 126 comprises a base 128 with side walls 130, an opening 132 extending through base 128. Vacuum box 126 is positioned upon platen 110 such that opening 132 communicates with vacuum port 111 of platen 110. To produce the container, cementitious sheet 32 is positioned between the complementary alignment of vacuum box 126 and male mold 113 such that cementitious sheet 32 covers vacuum box 126 and is sealed against the side walls 130 thereof. As shown in FIG. 17B, a partial vacuum, sufficient to achieve the desired amount of stretching of cementitious sheet 32, is then applied to vacuum box 126 through vacuum port 111. Male mold 112 is pushed into the newly formed concave cementitious sheet. The vacuum box 126 is then vented to the atmosphere and a vacuum is drawn on male mold 113 causing the atmosphere to force cementitious sheet 32 against male mold 113.

Billow/air-slip vacuum forming, illustrated in FIGS. 18A–B is performed by inserting male mold 113 into vacuum box 126 such that passage 124 of male mold 113 and opening 132 of vacuum box 126 are in communication. Cementitious sheet 32 is sealed against vacuum box 126 as previous described. Vacuum box 126 is then pressured with compressed air to cause cementitious sheet 32 to bubble. Male mold 113 is pushed up into the convex bubble. Vacuum box 126 and the male mold 113 are then evacuated and cementitious sheet 32 is forced against male mold 113.

Figure 19A:
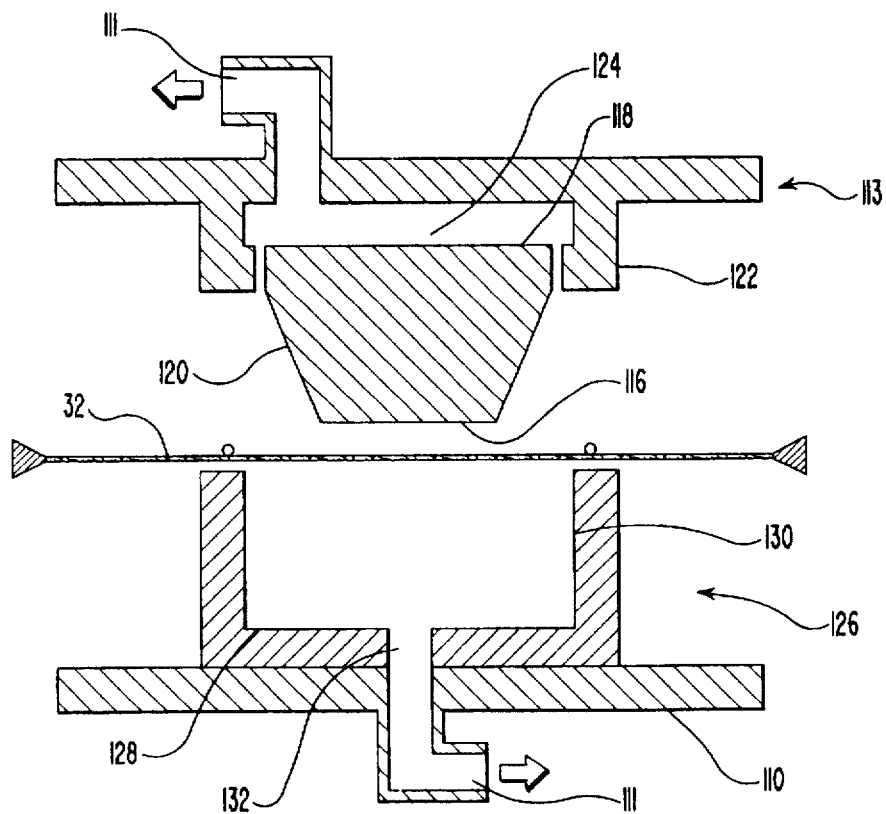
FIG. 19 is a schematic view of billow drape vacuum forming.
Figure 19B:
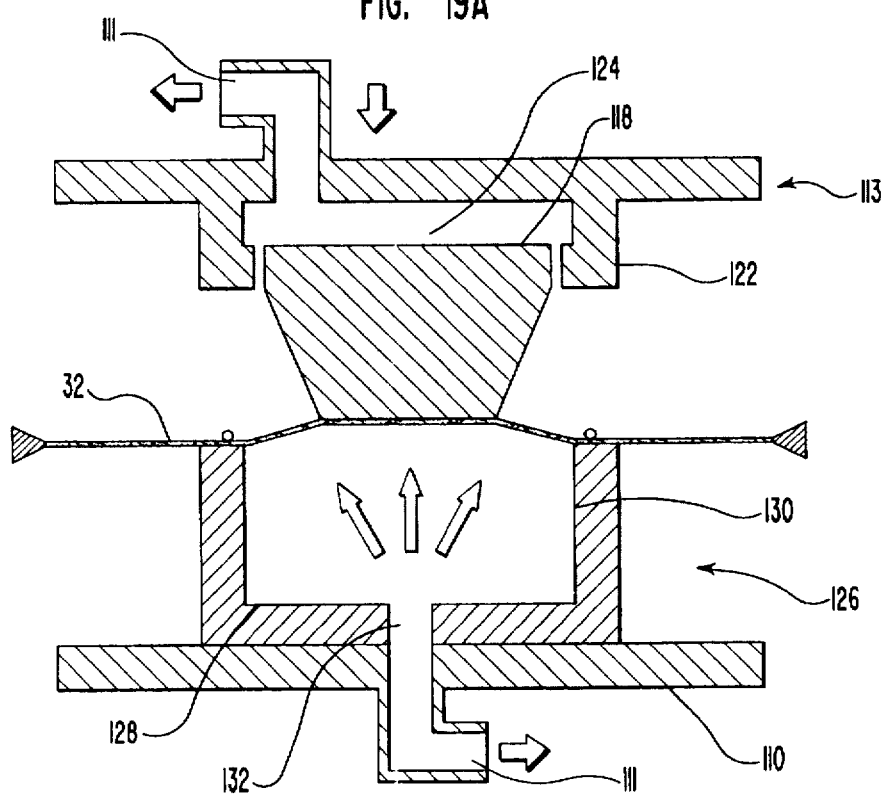

Billow drape vacuum forming is a reverse draw technique that utilizes the same apparatus as in the snapback vacuum forming process as previously discussed. Under this technique, vacuum box 126 is used to blow a bubble in cementitious sheet 32, as shown in FIGS. 19A–B. Male mold 113, mounted opposite vacuum box 126, is pushed into the convex bubble. The air in the bubble is vented to the atmosphere in a controlled manner though opening 132 of vacuum box 126. By matching the amount of air being vented to that being displaced by male mold 113, cementitious sheet 32 wiped or draped against male mold 113. When male mold 113 completely penetrates cementitious sheet 32, a vacuum is applied to male mold 113 and vacuum box 126 is vented to the atmosphere to complete the forming operation.

Plug-assist and billow/plug-assist/snap back are multistep vacuum forming techniques designed to improve the wall thickness uniformity of parts produced with female molds. They utilize mechanical assists (plugs) to force more material into high dry areas of the part.

Figure 20A:
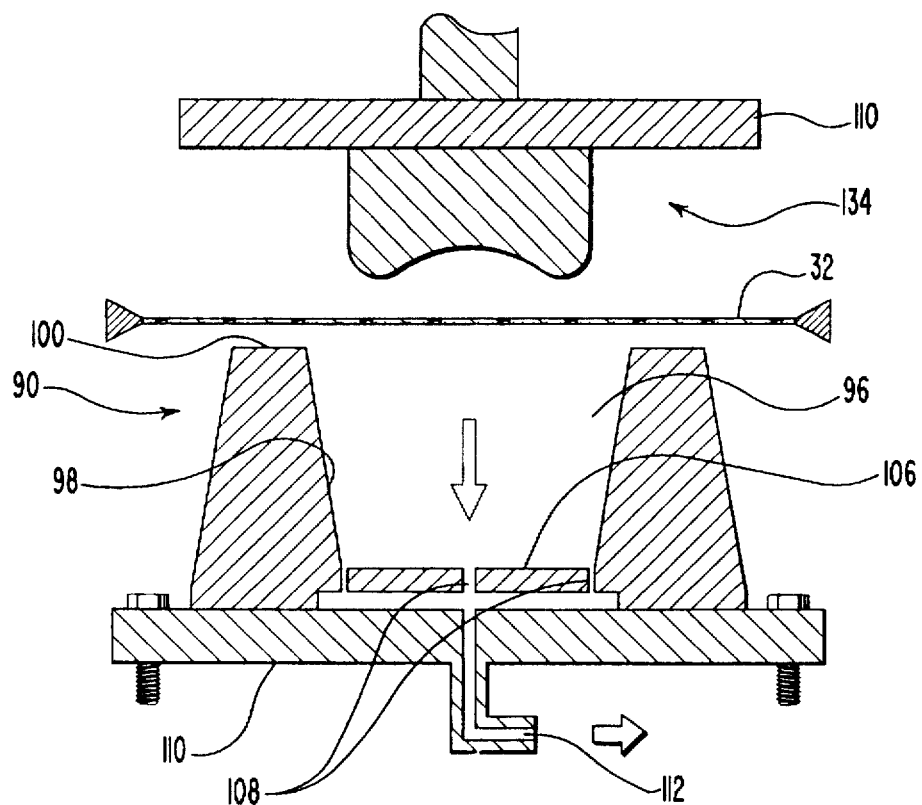
FIG. 20 is a schematic view of plug-assist vacuum forming.
Figure 20B:
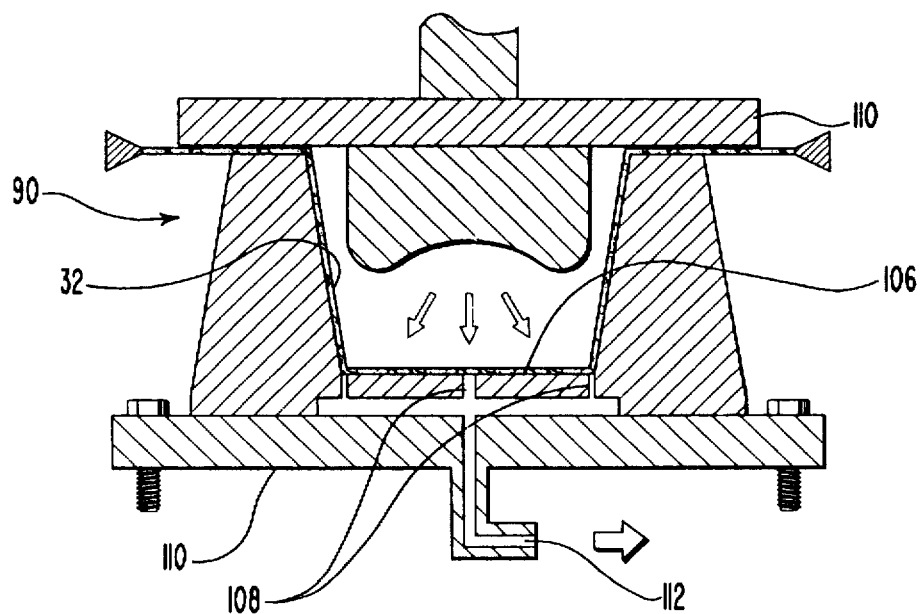

Plug assist vacuum forming, which is shown in FIGS. 20A–B, is used in conjunction with straight vacuum or drape forming techniques. A plug 134 is mounted on platen 110 opposite female mold 90. Cementitious sheet 32 is sealed against lip 100 of female mold 90, and plug 134 pushes the cementitious material into cavity 96 of female mold 90 prior to drawing a vacuum. Cavity 96 is then evacuated, forcing the cementitious material off plug 134 and up against interior surface 98 of female die 90.

Figure 21A:
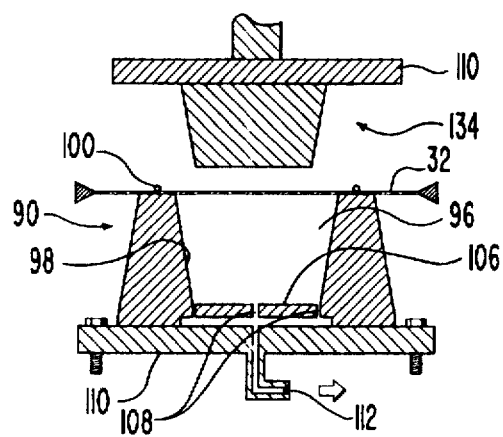
FIG. 21 is a schematic view of billow/plug-assist/snap back forming.
Figure 21B:
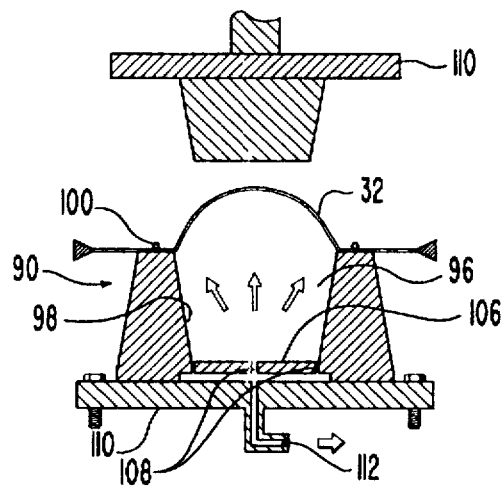
Figure 21C:
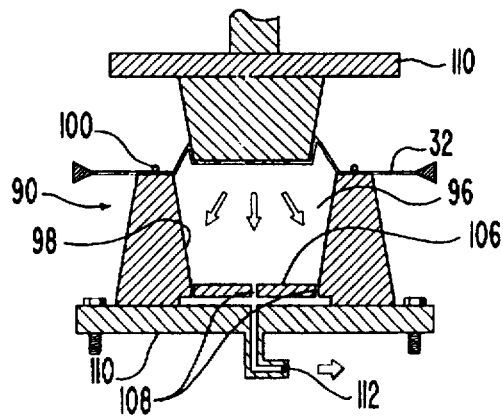

Billow/plug-assist/snap back forming uses both female mold 90 and plug 134, as shown in FIGS. 21A–C. Cementitious sheet 32 is sealed against lip 100 of female mold 90; and, the mold is pressurized to stretch cementitious sheet 32. Plug 134, mounted opposite female mold 90, is forced into the convex bubble, and controlled venting of the displaced air in the bubble causes the cementitious material to be draped over plug 134. When plug 134 is fully extended, cavity 96 of female mold 90 is evacuated and the cementitious material is pushed off plug 134 and on to interior surface 98 of female mold 90.

Pressure forming uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum-forming techniques previously described. For example, the snap back vacuum forming apparatus as previously discussed and shown in FIGS. 17A–B can be used for pressure forming. Under pressure forming, air is compressed to push cementitious sheet 32 onto male die 113, as opposed to requiring the vacuum pressure to perform all the forming.

Figure 22A:
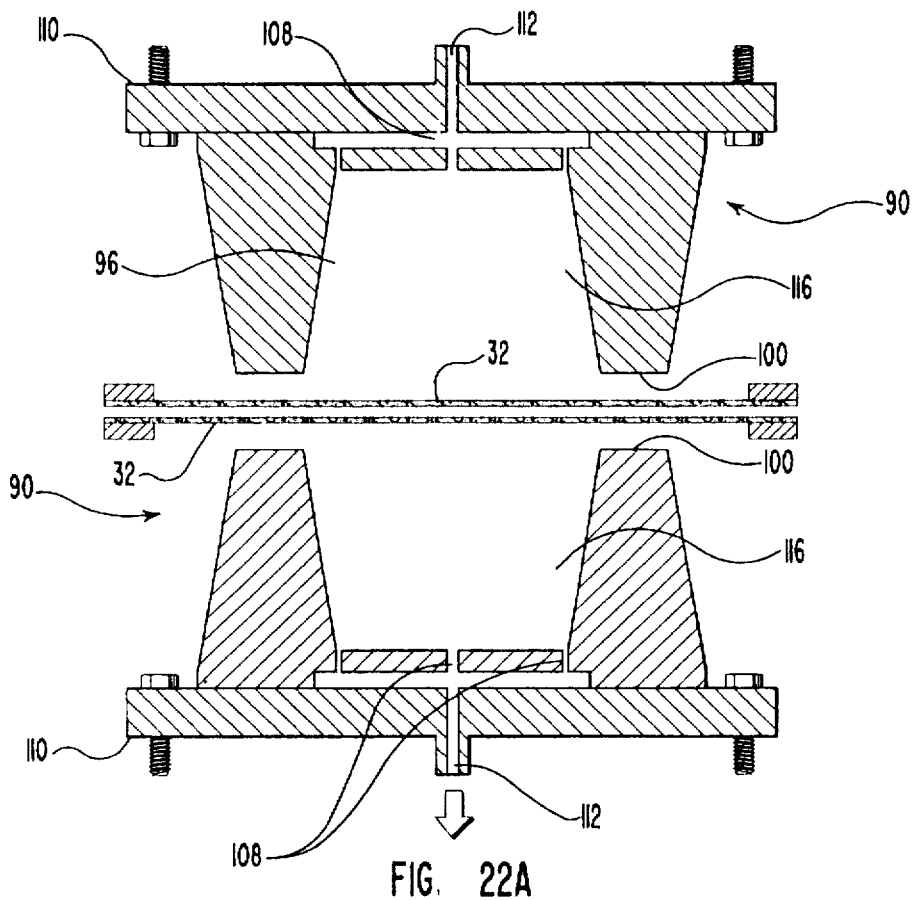
FIG. 22 is a schematic view of twin sheet forming.
Figure 22B:
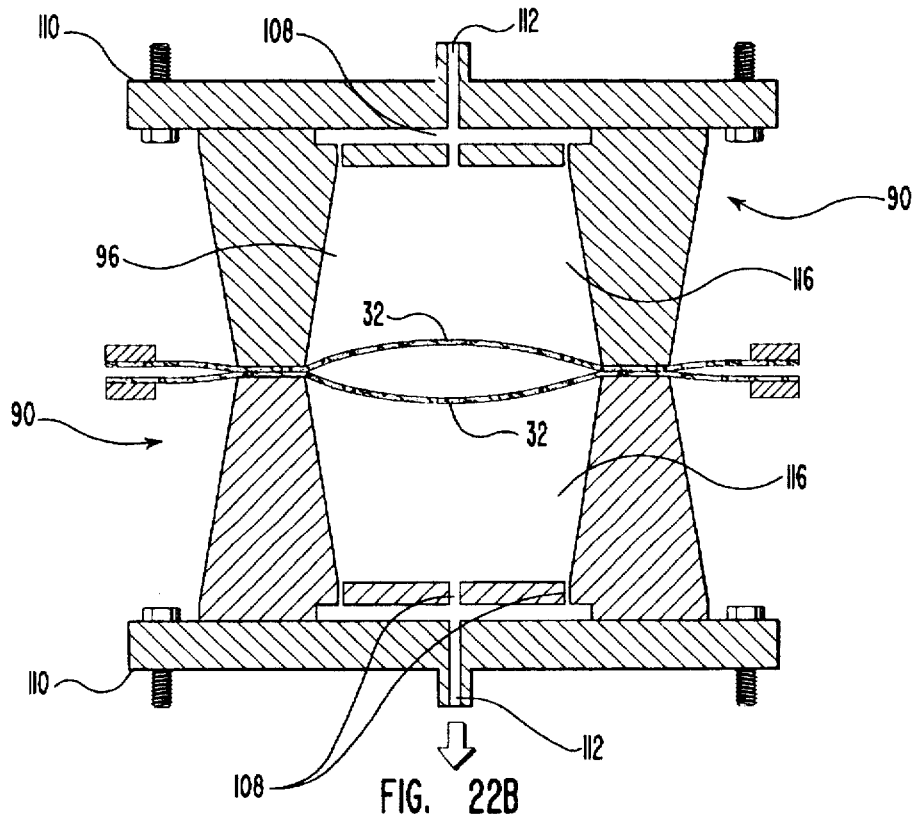
Figure 22C:
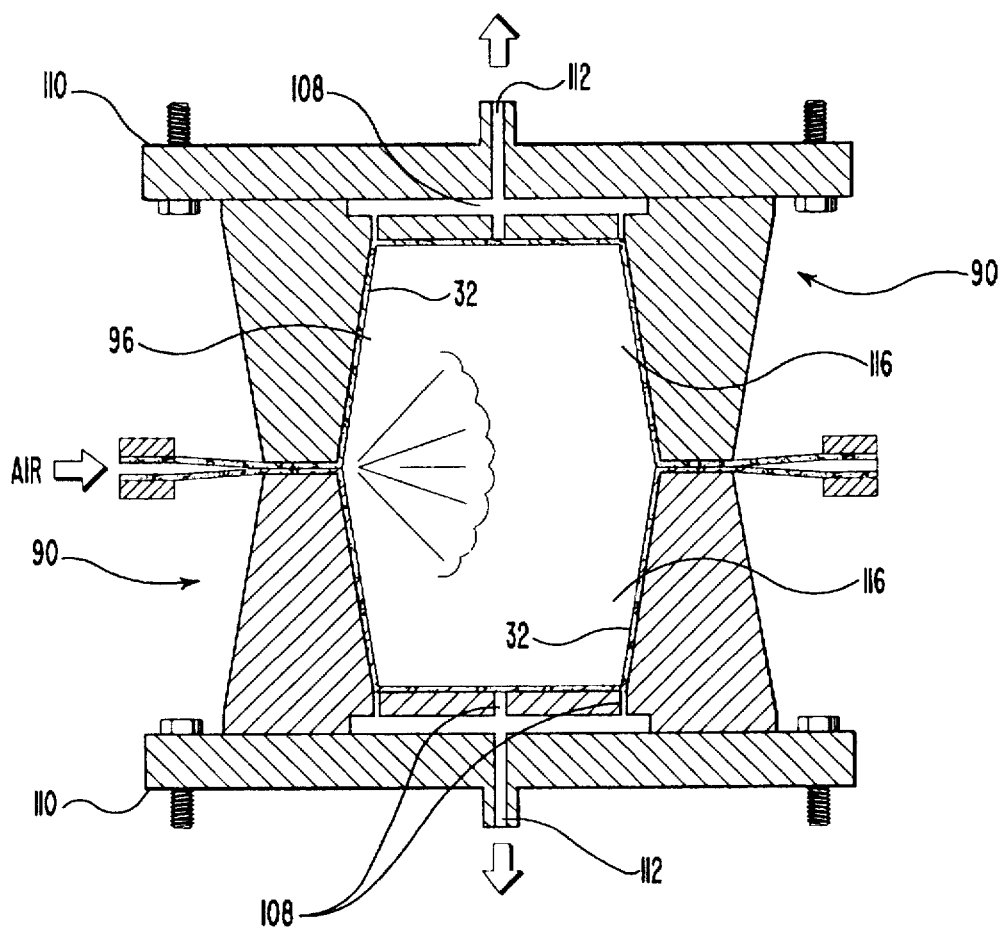

Twin sheet forming process, shown in FIGS. 22A–C, produces hollow parts. Two heated sheets are positioned between two female molds 90 with matching lips 100. Cavities 96 may or may not be identical. Female molds 90 come together and bind the two sheets together where the lips 100 meet. The two sheets may be either pressure formed simultaneously or vacuum formed subsequently utilizing conventional forming techniques.

8. Drying

While still attached to cementitious sheet 32, the cementitious containers are passed through a conventional tunnel oven 136 to cure and drive-off water from the containers, thereby accelerating the cure and increasing the strength of the cementitious containers. Conventional tunnel ovens can be purchased from OAL & Associates of Rancho Bernardo, Conn. The containers are now in a condition to be physically handled.

9. Die Cut

Once the containers are hardened they are die cut in a punch press 138 so as to remove the container from the remainder of cementitious sheet 32. The remainder of cementitious sheet 32 can then be either disposed of, as in a landfill, or can be crushed and used as aggregated in the cementitious mixture. Typical punch presses can be purchased from Manufacturers Supplies Co. of St. Louis, Mo.

10. Stacker/Bagging/Pelletizing.

A custom automatic stacker 140 is installed at the end of the line to minimize handling of the individual containers. Prior to shipping the containers, they must be properly packaged. Accordingly, the finished stacks of containers are manually loaded into poly bags and then loaded into cartons. This last manual step provides the final QC check on the cups. The finished cartons are then collected, sealed, marked, stacked and wrapped in standard carton handling/pelletizing equipment for subsequent shipment.

E. Summary

From the foregoing, it will be appreciated that the present invention provides novel methods and systems for manufacturing hydraulically settable articles and containers for the storage, dispensing, packing, and portioning.

The present invention also provides novel methods and systems for manufacturing hydraulically settable articles which are more environmentally neutral than presently made containers. Specifically, the present invention does not require the use of, or emit, chemicals which have been implicated as causing depletion of the ozone layer, nor does it create unsightly garbage which does not degrade, or which only very slowly degrades over time in landfills.

In addition, the present invention also provides novel methods and systems for manufacturing hydraulically settable articles which can be produced at relatively low cost.

Further, the present invention provides novel methods and systems for manufacturing hydraulically settable articles which are flexible and disposable, but which are much more environmentally sound in their disposal than other disposable articles, such as paper, plastic and styrofoam.

The present invention provides novel methods and systems for manufacturing hydraulically settable articles which are essentially comprised of the same compounds as the earth, and are similar to dirt and rock, and therefore pose little or no risk to the environment when discarded.

The present invention further provides novel methods and systems for manufacturing for which the raw materials may be obtained from the earth, eliminating the need to cut down large numbers of trees in order to create the starting raw materials, as is required for the manufacture of paper containers.

The present invention further provides novel methods and systems for improving the safety of storage and dispensing containers, in that cementitious containers do not release harmful chemicals like dioxin into the foodstuffs therein, nor are dioxins produced during the manufacture of such containers.

The present invention further provides novel methods and systems for improving the recyclability of disposable containers, particularly since the cementitious materials can be reintroduced as suitable aggregate in many cement applications.

The present invention further provides novel methods and systems for achieving lightweight containers which still give sufficient structural support for the food or beverage product.

The present invention further provides novel hydraulically settable articles which will maintain their shape without external support during the green state and rapidly achieve sufficient strength so that the molded articles can be handled using ordinary methods.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A method for manufacturing an article having a hydraulically settable matrix, the method comprising the steps of:
    (a) mixing together a hydraulically settable binder, a rheology-modifying agent, an inert inorganic aggregate filler and water in order to form a hydraulically settable mixture that is characterized in that the mixture can be passed between a pair of counter-rotating reduction rollers while in a green state to form a sheet having a thickness less than about 3 mm the inert inorganic aggregate filler having a concentration greater than about 50% by weight of the hydraulically settable binder;
    (b) passing the hydraulically settable mixture between a pair of counter-rotating reduction rollers while in the green state to form a cohesive and coherent sheet having a thickness less than about 3 mm, the sheet having sufficient cohesive strength while still in the green state and prior to pressing and hardening such that the sheet does not rupture as the sheet exits the reduction rollers thereby forming a coherent sheet;
    (c) pressing at least a portion of the sheet while in the green state into a desired shape of the article, the article gaining form stability in less than about one minute after first being pressed into the desired shape; and
    (d) allowing the pressed portion of the sheet to harden into the desired shape of the article.

2. A method for manufacturing an article as defined in claim 1, wherein the hydraulically settable mixture has a yield stress in a range from about 5 kPa to about 5,000 kPa.

3. A method for manufacturing an article as defined in claim 1, wherein the hydraulically settable mixture has a yield stress in a range from about 100 kPa to about 1,000 kPa.

4. A method for manufacturing an article as defined in claim 1, wherein the hydraulically settable mixture has a yield stress in a range from about 200 kPa to about 700 kPa.

5. A method for manufacturing an article as defined in claim 1, wherein step (a) is carried out using a high shear mixer.

6. A method for manufacturing an article as defined in claim 1, wherein step (a) is carried out using a pug mill.

7. A method for manufacturing an article as defined in claim 1, wherein step (a) is carried out using a twin auger extruder.

8. A method of manufacturing an article as defined in claim 1, wherein the hydraulically settable binder comprises hydraulic cement.

9. A method of manufacturing an article as defined in claim 8, wherein the hydraulic cement comprises portland cement.

10. A method of manufacturing an article as defined in claim 9, wherein the portland cement comprises portland grey cement.

11. A method for manufacturing an article as defined in claim 1, wherein the article has a thermal conductivity and wherein the inert inorganic aggregate filler decreases the thermal conductivity of the article.

12. A method for manufacturing an article as defined in claim 1, wherein the inert inorganic aggregate filler is combined in an amount of up to about 80% by weight of the hydraulically settable mixture.

13. A method for manufacturing an article as defined in claim 1, wherein the inert inorganic aggregate filler is combined in an amount in a range from about 3% to about 50% by weight of the hydraulically settable mixture.

14. A method for manufacturing an article as defined in claim 1, wherein the inert inorganic aggregate filler is combined in an amount in a range from about 20% to about 35% by weight of the hydraulically settable mixture.

15. A method for manufacturing an article as defined in claim 1, wherein step (a) includes blending fibers into the hydraulically settable mixture.

16. A method for manufacturing an article as defined in claim 15, wherein the fibers are selected from the group consisting of abaca, bagasse, wood fibers, ceramic fibers, cotton, and mixtures of the foregoing.

17. A method of manufacturing an article as defined in claim 15, wherein the fibers are blended in an amount in a range from about 0.2% to about 50% by volume of the hydraulically settable mixture.

18. A method of manufacturing an article as defined in claim 17, wherein the fibers are blended in an amount in a range from about 5% to about 15% by volume of the hydraulically settable mixture.

19. A method of manufacturing an article as defined in claim 15, wherein the fibers are blended in an amount in a range from about 1% to about 30% by volume of the hydraulically settable mixture.

20. A method for manufacturing an article as defined in claim 15, wherein the fibers comprise glass fibers.

21. A method for manufacturing an article as defined in claim 1, wherein the rheology-modifying agent increases the form stability of the molded article.

22. A method for manufacturing an article as defined in claim 1, wherein the rheology-modifying agent is added in an amount in a range from about 0.1% to about 20% by weight of the hydraulically settable mixture.

23. A method for manufacturing an article as defined in claim 1, wherein the rheology-modifying agent is added in an amount in a range from about 0.5% to about 3% by weight of the hydraulically settable mixture.

24. A method for manufacturing an article as defined in claim 1, wherein the rheology-modifying agent is added in an amount in a range from about 0.1% to about 2% by weight of the hydraulically settable mixture.

25. A method for manufacturing an article as defined in claim 1, wherein the rheology-modifying agent comprises a cellulose-based material.

26. A method for manufacturing an article as defined in claim 25, wherein the cellulose-based material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, derivatives of the foregoing and mixtures of the foregoing.

27. A method for manufacturing an article as defined in claim 1, wherein the rheology-modifying agent comprises a starch-based material.

28. A method for manufacturing an article as defined in claim 27, wherein the starch-based material is selected from the group consisting of amylopectin, amylose, seagel, starch acetates, starch hydroxyethyl ethers, ionic starches, long-chained alkyl starches, dextrins, amine starches, phosphate starches, dialdehyde starches, derivatives of the foregoing, and mixtures of the foregoing.

29. A method for manufacturing an article as defined in claim 1, wherein the rheology-modifying agent comprises a protein-based material.

30. A method for manufacturing an article as defined in claim 29, wherein the protein-based material is selected from the group consisting of a prolamine, collagen, gelatin, glue, casein, derivatives of the foregoing and mixtures of the foregoing.

31. A method for manufacturing an article as defined in claim 1, wherein the rheology-modifying agent comprises a synthetic organic material.

32. A method for manufacturing an article as defined in claim 31, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, synthetic clay, latex, derivatives of the foregoing and mixtures of the foregoing.

33. A method for manufacturing an article as defined in claim 1, wherein the rheology-modifying agent comprises polylactic acid.

34. A method for manufacturing an article as defined in claim 1, wherein the rheology-modifying agent is selected from the group consisting of alginic acid, phycocolloids, agar, gum arabic, guar gum, locust bean gum, gum karaya, gum tragacanth, derivatives of the foregoing, and mixtures of the foregoing.

35. A method for manufacturing an article as defined in claim 1, wherein step (a) includes incorporating a dispersant into the hydraulically settable mixture.

36. A method for manufacturing an articles as defined in claim 35, wherein the dispersant is selected from the group consisting of sulfonated naphthalene-formaldehyde condensate, sulfonated melamine-formaldehyde condensate, lignosulfonate, acrylic acid, derivatives of the foregoing and mixtures of the foregoing.

37. A method for manufacturing an article as defined in claim 35, wherein the dispersant is incorporated in an amount in a range from about 0.25% to about 5% by weight of the hydraulically settable mixture.

38. A method for manufacturing an article as defined in claim 35, wherein the dispersant is incorporated in an amount in a range from about 0.5% to about 2% by weight of the hydraulically settable mixture.

39. A method for manufacturing an article as defined in claim 1, wherein step (a) includes exposing the hydraulically settable mixture to a carbon dioxide source.

40. A method for manufacturing an article as defined in claim 1, wherein step (a) includes assimilating a non-hydrating liquid into the hydraulically settable mixture.

41. A method for manufacturing an article as defined in claim 1, wherein step (a) includes mingling an air entraining agent into the hydraulically settable mixture.

42. A method for manufacturing an article as defined in claim 1, wherein step (a) includes adding a set accelerator to the hydraulically settable mixture.

43. A method for manufacturing an article as defined in claim 1, wherein step (a) includes:
  (i) mixing together at least a portion of the hydraulically settable binder and water to form a hydraulically settable paste;
  (ii) blending a cellulose fiber into the hydraulically settable paste under high shear energy mixing for a period of time sufficient to disperse the cellulose fiber uniformly throughout the hydraulically settable paste;

(ii) adding the rheology-modifying agent to the hydraulically settable paste under high shear energy mixing to uniformly disperse the rheology-modifying agent throughout the paste; and (iii) combining a light weight aggregate with the hydraulically settable paste under low shear energy mixing to form the hydraulically settable mixture.

44. A method for manufacturing an article as defined in claim 1, wherein step (a) includes combining the water and the hydraulically settable binder in concentrations to yield a hydraulically settable mixture having a water-to-hydraulically settable binder ratio in a range from about 0.1 to about 10.

45. A method for manufacturing an article as defined in claim 1, wherein step (a) includes combining the water and the hydraulically settable binder in concentrations to yield a hydraulically settable mixture having a water-to-hydraulically settable binder ratio in a range from about 0.3 to about 3.5.

46. A method for manufacturing an article as defined in claim 1, further comprising the step of applying a vacuum to the hydraulically settable mixture before step (b), thereby removing air from the mixture and minimizing voids in the hydraulically settable matrix of the article.

47. A method for manufacturing an article as defined in claim 1, wherein the counter-rotating reduction rollers have a gap distance therebetween through which the mixture passes which substantially corresponds to the thickness of the sheet as it exits the reduction rollers.

48. A method for manufacturing an article as defined in claim 1, wherein step (b) further includes the step of extruding the hydraulically settable mixture through a die orifice to form an extruded intermediate sheet having a thickness, width and length, the intermediate sheet thereafter being passed between the pair of counter-rotating reduction rollers.

49. A method for manufacturing an article as defined in claim 48, wherein the extruding step is carried out using an auger extruder.

50. A method for manufacturing an article as defined in claim 49, wherein the auger extruder has means for removing unwanted air voids from the hydraulically settable mixture.

51. A method for manufacturing an article as defined in claim 48, wherein the extruding step is carried out using a piston extruder.

52. A method for manufacturing an article as defined in claim 48, wherein the extruding step includes first extruding the hydraulically settable mixture into a tube-shaped object and then cutting the tube-shaped object in order to form the extruded intermediate sheet.

53. A method for manufacturing an article as defined in claim 48, wherein the die orifice has a length and height corresponding to the width and thickness of the extruded intermediate sheet, respectively.

54. A method for manufacturing an article as defined in claim 53, wherein the height of the die orifice varies along the length of the die orifice such that the thickness of the extruded intermediate sheet varies along the width of the intermediate sheet.

55. A method for manufacturing an article as defined in claim 48, wherein the die orifice is curved so that the hydraulically settable mixture is extruded into a curved intermediate sheet that can unfold to lay flat.

56. A method for manufacturing an article as defined in claim 48, further comprising the step of altering the height of the die orifice as the hydraulically settable mixture is extruded through the die orifice in order to vary the thickness of the extruded intermediate sheet along the length of the intermediate sheet.

57. A method for manufacturing an article as defined in claim 48, wherein the hydraulically settable mixture is extruded under a pressure in a range between about 20 psi to about 10,000 psi.

58. A method for manufacturing an article as defined in claim 48, wherein the hydraulically settable mixture is extruded under a pressure in a range between about 50 psi to about 5,000 psi.

59. A method for manufacturing an article as defined in claim 48, wherein the hydraulically settable mixture is extruded under a pressure in a range between about 75 psi to about 3,500 psi.

60. A method for manufacturing an article as defined in claim 48, wherein step (b) included passing the extruded intermediate sheet between the pair of counter-rotating reduction rollers having a gap distance therebetween, thereby modifying the thickness of the intermediate sheet to correspond to the gap distance between the reduction rollers.

61. A method for manufacturing an article as defined in claim 60, wherein the pair of counter-rotating reduction rollers includes a roller having a diameter and a length, the diameter of the roller varying along the length of the roller, thereby varying the thickness of the extruded intermediate sheet along the width of the sheet as the sheet passes between the reduction rollers.

62. A method for manufacturing an article as defined in claim 60, wherein step (b) further includes changing the gap distance between the pair of counter-rotating reduction rollers, thereby varying the thickness of the sheet along the length of the sheet.

63. A method for manufacturing an article as defined in claim 48, wherein step (b) includes passing the extruded intermediate sheet between the pair of counter-rotating reduction rollers in which at least one of the rollers has a conical shape.

64. A method for manufacturing an article as defined in claim 49, wherein step (b) includes passing the extruded intermediate sheet between a plurality of pairs of the counter-rotating reduction rollers, wherein each successive pair of reduction rollers has an incrementally decreasing gap distance therebetween, thereby incrementally decreasing the thickness of the sheet as the sheet passes between the plurality of pairs of reduction rollers.

65. A method for manufacturing an article as defined in claim 1, wherein the sheet is capable of being elongated such that the sheet may be pressed into the desired shape of the article without rupturing of the sheet.

66. A method for manufacturing an article as defined in claim 65, wherein the sheet can be elongated in excess of 0.5% by length of the sheet.

67. A method for manufacturing an article as defined in claim 1, further comprising the step of heating the pair of counter-rotating reduction rollers to a temperature.

68. A method for manufacturing an article as defined in claim 67, wherein the temperature is sufficient to minimize adhesion of the hydraulically settable mixture to the pair of reduction rollers.

69. A method for manufacturing an article as defined in claim 67, wherein the temperature is in a range from about 50° C. to about 300° C.

70. A method for manufacturing an article as defined in claim 67, wherein the temperature is in a range from about 50° C. to about 150° C.

71. A method for manufacturing an article as defined in claim 67, wherein the temperature is in a range from about 50° C. to about 100° C.

72. A method for manufacturing an article as defined in claim 1, further comprising the step of heating the hydraulically settable mixture to a first temperature and cooling the reduction rollers to a second temperature that is significantly below the first temperature in order to reduce adhesion between the hydraulically settable mixture and the reduction rollers.

73. A method for manufacturing an article as defined in claim 72, wherein the second temperature is in a range from about −20° C. to about 40° C.

74. A method for manufacturing an article as defined in claim 72, wherein the second temperature is in a range from about 0° C. to about 35° C.

75. A method for manufacturing an article as defined in claim 72, wherein the temperature is in a range from about 5° C. to about 30° C.

76. A method for manufacturing an article as defined in claim 72, wherein the first temperature is in a range between about 20° C. to about 80° C.

77. A method for manufacturing an article as deigned in claim 1, the method further comprising the step of passing the sheet formed in step (b) over at least one drying roller to sufficiently dry the sheet to apply a coating or printing to at least one side of the sheet.

78. A method for manufacturing an article as defined in claim 77, further comprising the step of rewetting at least one side of the sheet to make the sheet sufficiently moldable to form the article without rupturing the sheet.

79. A method for manufacturing an article as defined in claim 1, wherein the sheet has a thickness in a range from about 0.05 mm to about 3 mm.

80. A method for manufacturing an article as defined in claim 1, wherein the sheet has a thickness in a range from about 0.25 mm to about 2 mm.

81. A method for manufacturing an article as defined in claim 1, wherein the sheet has a thickness in a range from about 0.5 mm to about 1 mm.

82. A method for manufacturing an article as defined in claim 1, further comprising the step of combining a plurality of the sheets in a layered fashion to form a layered sheet.

83. A method for manufacturing an article as defined in claim 1, further including the steps of:

(i) combining an adsorbing material with the hydraulically settable mixture;

(ii) exposing a blowing agent to the hydraulically settable mixture under pressure so that the blowing agent is adsorbed into the adsorbing material; and (iii) releasing the pressure on the hydraulically settable mixture so that the blowing agent expands in order to form bubbles in the mixture.

84. A method for manufacturing an article as defined in claim 1, wherein step (c) further includes:

(i) positioning the portion of the sheet between a male die of a desired shape and a female die having a configuration substantially complementary to the shape of the male die;

(ii) pressing the portion of the sheet between the male die and the female die to mold the portion of the sheet into the desired shape of the article; and (iii) removing the male die and the female die from the article when the molded article has achieved form stability so as to be self-supporting independent of the male die and the female die.

85. A method for manufacturing an article as defined in claim 84, wherein the male die and the female die each have vent holes for permitting air between the male die and the female die to escape during the pressing step.

86. A method for manufacturing an article as defined in claim 84, wherein the male die and the female die are each heated to respective temperatures sufficient to minimize adhesion of the article to the male die and the female die.

87. A method for manufacturing an article as defined in claim 86, wherein the respective temperatures of the male die and the female die are in a range from about 50° C. to about 300° C.

88. A method for manufacturing an article as defined in claim 86, wherein the respective temperatures of the male die and the female die are in a range from about 75° C. to about 200° C.

89. A method for manufacturing an article as defined in claim 86, wherein the respective temperatures of the male die and the female die are in a range from about 120° C. to about 140° C.

90. A method for manufacturing an article as defined in claim 86, wherein there is a temperature variance between the respective temperatures of the female die and the male die.

91. A method for manufacturing an article as defined in claim 90, wherein the temperature variance between the male die and the female die is in a range from about 10° C. to about 30° C.

92. A method for manufacturing an article as defined in claim 84, wherein the sheet is heated to a first temperature and the male die and the female die are then each cooled to a respective temperature below the temperature of the sheet, the respective temperature of the male and female dies being sufficient to minimize adhesion of the article to the male die and the female die.

93. A method for manufacturing an article as defined in claim 92, wherein the respective temperature of the male die and the female die is in a range from about −20° C. to about 40° C.

94. A method for manufacturing an article as defined in claim 92, wherein the respective temperature of the male die and the female die is in a range from about 0° C. to about 35° C.

95. A method for manufacturing an article as defined in claim 92, wherein the respective temperature of the male die and the female die is in a range from about 5° C. to about 30° C.

96. A method for manufacturing an article as defined in claim 84, wherein the desired shape of the male die is configured to form the portion of the sheet into a "clam shell-shaped" article when the male die and the female die are pressed together.

97. A method for manufacturing an article as defined in claim 84, wherein the desired shape of the male die is configured to form the portion of the sheet into a cup-shaped article when the male die and the female die are pressed together.

98. A method for manufacturing an article as defined in claim 84, wherein the desired shape of the male die is configured to form the portion of the sheet into a plate-shaped article when the male die and the female die are pressed together.

99. A method for manufacturing an article as defined in claim 84, wherein the male die and the female die apply a pressure to the sheet in a range from about 25 psi to about 10,000 psi.

100. A method for manufacturing an article as defined in claim 84, wherein the male die and the female die apply a pressure to the sheet in a range from about 100 psi to about 7,000 psi.

101. A method for manufacturing an article as defined in claim 84, wherein the male die and the female die apply a pressure to the sheet in a range from about 150 psi to about 1,000 psi.

102. A method for manufacturing an article as defined in claim 84, wherein the male die and the female die are simultaneously removed from the article.

103. A method for manufacturing an article as defined in claim 84, wherein the male die and the female die are removed separately from the article.

104. A method for manufacturing an article as defined in claim 84, wherein the male die and the female die are removed from the article in a time period less than about 30 seconds after the hydraulically settable mixture is first pressed into the desired shape of the article, the article having achieved form stability within the time period.

105. A method for manufacturing an article as defined in claim 84, wherein the male die and the female die are removed from the article in a time period less than about 10 seconds after the hydraulically settable mixture is first pressed into the desired shape of the article, the article having achieved form stability within the time period.

106. A method for manufacturing an article as defined in claim 84, wherein the male die and the female die are removed from the article in a time period less than about 2 seconds after the hydraulically settable mixture is first pressed into the desired shape of the article, the article having achieved form stability within the time period.

107. A method for manufacturing an article as defined in claim 84, further comprising the step of blowing heated air onto the article to dry the article into a form stable condition before removing both the male die and the female die.

108. A method for manufacturing an article as defined in claim 84, further comprising the step of directing microwaves onto the article to dry the article into a form stable condition before removing both the male die and the female die.

109. A method for manufacturing an article as defined in claim 1, wherein step (c) includes the use of at least one split die.

110. A method for manufacturing an article as defined in claim 1, wherein step (c) includes the use of at least one progressive die.

111. A method for manufacturing an article as defined in claim 1, wherein step (c) includes the use of at least one collapsible die.

112. A method for manufacturing an article as defined in claim 1, wherein step (d) comprises passing the pressed article through a drying oven.

113. A method for manufacturing an article as defined in claim 112, wherein the oven has a temperature in a range from about 100° C. to about 300° C.

114. A method for manufacturing an article as defined in claim 112, wherein the oven has a temperature in a range from about 140° C. to about 250° C.

115. A method for manufacturing an article as defined in claim 112, wherein the oven has a temperature in a range from about 150° C. to about 200° C.

116. A method for manufacturing an article as defined in claim 1, wherein step (d) further comprises blowing heated air over the article.

117. A method for manufacturing an article as defined in claim 1, further comprising the step of fixing print to the sheet before the sheet is fashioned into the article.

118. A method for manufacturing an article as defined in claim 1, further comprising the step of fixing print to the hardened article.

119. A method for manufacturing an article as defined in claim 1, further comprising the step of applying a coating to the sheet before step (c), the coating functioning to seal the article from liquids.

120. A method for manufacturing an article as defined in claim 1, further comprising the step of applying a coating to the hardened article, the coating functioning to seal the article from liquids.

121. A method for manufacturing an article as defined in claim 1, further comprising the step of cutting the hardened article from the sheet.

122. A method for manufacturing an article as defined in claim 1, wherein the hardened article has a density in a range from about 0.1 g/cm$^3$ to about 3 g/cm$^3$.

123. A method for manufacturing an article as defined in claim 1, wherein the hardened article has a density in a range from about 0.5 g/cm$^3$ to about 2 g/cm$^3$.

124. A method for manufacturing an article as defined in claim 1, wherein the hardened article has a tensile strength in a range from about 0.05 MPa to about 75 MPa.

125. A method for manufacturing an article as defined in claim 1, wherein the hardened article has a tensile strength in a range from about 1 MPa to about 30 MPa.

126. A method for manufacturing an article as defined in claim 1, wherein the hardened article has a tensile strength in a range from about 3 MPa to about 15 MPa.

127. A method for manufacturing an article as defined in claim 1, wherein the hardened article has a wall thickness in a range from about 0.05 mm to about 3 mm.

128. A method for manufacturing an article having a hydraulically settable matrix, the method comprising the steps of:
(a) mixing together a hydraulically settable binder, rheology-modifying agent, inert inorganic aggregate filler, and water in order to form a hydraulically settable mixture that is characterized in that the mixture can be passed between a pair of counter-rotating reduction rollers while in a green state to form a sheet having a thickness less than about 3 mm, the inert inorganic aggregate filler having a concentration greater than about 50% by weight of the hydraulically settable binder;
(b) passing the hydraulically settable mixture between a pair of counter-rotating reduction rollers while in the green state to form a cohesive and coherent sheet having a thickness less than about 3 mm and sufficient cohesive strength to be elongated by at least about 0.5% while still in the green state and prior to pressing and hardening such that the sheet does not rupture as the sheet exits the reduction rollers;
(c) pressing at least a portion of the sheet while in the green state into a desired shape of the article; and
(d) allowing the pressed portion of the sheet to harden in the desired shape of the article.

129. A method for manufacturing an article as defined in claim 128, wherein step (a) includes adding a fibrous material to the hydraulically settable mixture.

130. A method for manufacturing an article as defined in claim 128, further comprising the step of applying a vacuum to the hydraulically settable mixture before step (b), thereby removing air from the mixture and minimizing voids in the hydraulically settable matrix of the article.

131. A method for manufacturing an article as defined in claim 128, wherein step (a) includes combining the water and the hydraulically settable binder in concentrations to yield a hydraulically settable mixture having a water-to-hydraulically settable binder ratio in a range from about 0.1 to about 10.

132. A method for manufacturing an article as defined in claim 128, wherein step (b) further includes extruding the hydraulically settable mixture through a die orifice having a length and height corresponding to a width and thickness of an extruded sheet, respectively.

133. A method for manufacturing an article as defined in claim 128, wherein the article formed in step (c) achieves form stability in less than about 60 seconds after first being pressed into the desired shape.

134. A method for manufacturing an article as defined in claim 128, wherein step (c) further includes the following steps:
 (i) positioning the portion of the sheet between a male die of a desired shape and a female die having a configuration substantially complementary to the shape of the male die;
 (ii) pressing the portion of the sheet between the male die and the female die to mold the portion of the sheet into the desired shape of the article; and
 (iii) removing the male die and the female die from the article when the molded article has achieved form stability so as to be self-supporting independent of the male die and the female die.

135. A method for manufacturing an article as defined in claim 134, wherein the male die and the female die are each heated to respective temperatures in a range from about 50° C. to about 300° C.

136. A method for manufacturing an article as defined in claim 134, wherein the male die and the female die are removed separately from the article.

137. A method for manufacturing an article as defined in claim 134, further comprising the step of blowing heated air onto the article before step (iii).

138. A method for manufacturing an article as defined in claim 128, wherein step (d) includes blowing heated air onto the article.

139. A method for manufacturing a container having a hydraulically settable structural matrix, the method comprising the steps of:
 (a) mixing together a hydraulically settable binder, an inert inorganic aggregate filler, a rheology-modifying agent and water to form a hydraulically settable mixture that is characterized in that the mixture can be passed between a pair of counter-rotating reduction rollers while in a green state to form a sheet having a thickness less than about 3 mm, the inert inorganic aggregate filler having a concentration greater than about 50% by weight of the hydraulically settable binder;
 (b) passing the hydraulically settable mixture between a pair of counter-rotating reduction rollers while in the green state to form a cohesive and coherent sheet having a thickness less than about 3 mm and sufficient cohesive strength while still in the green state and prior to pressing and hardening such that the sheet does not rupture as the sheet exits the reduction rollers;
 (c) pressing at least a portion of the sheet between a heated male die and a heated female die in order to mold the mixture into a desired shape of the container such that the container gains form stability in less than about one minute after first being pressed into the desired shape;
 (d) removing the heated male die and the heated female die from the hydraulically settable mixture in the desired shape of the container after the container has achieved form stability; and
 (e) drying the form stable container to form the hydraulically settable structural matrix.

140. A method for manufacturing a container as defined in claim 139, wherein step (a) includes adding a fibrous material to the hydraulically settable mixture.

141. A method for manufacturing a container as defined in claim 139, wherein step (a) includes adding an aggregate material to the hydraulically settable mixture.

142. A method for manufacturing a container as defined in claim 139, further comprising the step of applying a vacuum to the mixture before step (b), thereby removing air from the hydraulically settable mixture and minimizing voids in the structural matrix of the container.

143. A method for manufacturing a container as defined in claim 139, wherein step (a) includes combining the water and the hydraulically settable binder in concentrations to yield a hydraulically settable mixture having a water-to-hydraulically settable binder ratio in a range from about 0.1 to about 10.

144. A method for manufacturing a container as defined in claim 139, wherein step (b) includes extruding the mixture through a die orifice having a length and height corresponding to a width and thickness of an extruded sheet, respectively.

145. A method for manufacturing a container as defined in claim 139, wherein the male die and the female die apply a pressure to the sheet in a range from about 50 psi to about 10,000 psi.

146. A method for manufacturing a container as defined in claim 139, wherein the heated male die and the heated female die are removed separately from the hydraulically settable mixture in the desired shape of the container.

147. A method for manufacturing a container as defined in claim 139, further comprising blowing hot air on the container so as to dry the container into a form stable condition before both the heated male die and the heated female are removed.

148. A method for manufacturing a container as defined in claim 139, wherein the container obtains form stability in a period of time less than 60 seconds after first being pressed into the desired shape.

149. A method for manufacturing a container as defined in claim 139, wherein step (e) includes exposing the container to heated air after the male die and the female die are separated from the container.

150. A method for manufacturing a container having a cementitious structural matrix, the method comprising the steps of:
 (a) mixing together a cellulose fiber, a lightweight inorganic aggregate, a rheology-modifying agent, a hydraulic cement and water to form a cementitious mixture that is characterized in that the mixture can be passed between a pair of counter-rotating reduction rollers while in a green state to form a sheet having a thickness less than about 3 mm the lightweight inorganic aggregate having a concentration greater than about 50% by weight of the hydraulic cement;
 (b) applying a vacuum to the cementitious mixture to extract air from the mixture;
 (c) extruding the cementitious mixture through a die to form the cementitious mixture into a cohesive and coherent sheet having sufficient cohesive strength to be elongated while the mixture is in the green state without rupturing the sheet;
 (d) feeding the extruded sheet between a plurality of pairs of heated counter-rotating reduction rollers that incrementally elongate and decrease the thickness of the sheet as the sheet passes from one pair of reduction rollers to a next pair of reduction rollers, the heated reduction rollers imparting form stability to the sheet such that the sheet does not rupture as the sheet exits the reduction rollers;

(e) pressing at least a portion of the sheet between a heated male die and a heated female die in order to mold the portion of the sheet into a desire shape of the container, the container achieving form stability in less than about one minute after first being pressed into the desired shape of the container;

(f) removing the heated male die and the heated female die from the container within a period of time less than about one minute after first pressing the portion of the sheet into the desired shape, the molded container having achieved form stability within the time period so as to be self-supporting independent of the male die and the female die; and (g) drying the container to form the cementitious structural matrix.

151. A method for manufacturing a container as defined in claim 150, wherein the plurality of pairs of reduction rollers are each heated to a respective temperature in a range from about 50° C. to about 200° C.

152. A method for manufacturing a container as defined in claim 150, wherein the male die and the female die are each heated to a respective temperature in a range from about 50° C. to about 300° C.

153. A method for manufacturing a container as defined in claim 150, wherein the heated male die and the heated female die are separately removed from the container.

154. A method for manufacturing an article having a hydraulically settable matrix, the method comprising the steps of:

(a) mixing together a hydraulically settable binder, a rheology-modifying agent, an inorganic aggregate and water to form a nonfoamed hydraulically settable mixture the inorganic aggregate having a concentration greater than about 50% by weight of the hydraulically settable binder, (b) passing the nonfoamed hydraulically settable mixture between a pair of counter-rotating reduction rollers while in a green state to form a sheet having a thickness less than about 1 cm, the sheet having sufficient cohesive strength while still in the green state and prior to pressing and hardening such that the sheet does not rupture as the sheet exits the reduction rollers;

(c) pressing at least a portion of the sheet while in the green state into a desired shape of the article, the article gaining form stability in less than about one minute after first being pressed into the desired shape; and (d) allowing the pressed portion of the sheet to harden in the desired shape of the article.

155. A method for manufacturing an article having a hydraulically settable matrix, the method comprising the steps of:

(a) mixing together a hydraulically settable binder, a rheology-modifying agent, an inorganic aggregate, and water in order to form a hydraulically settable mixture that is characterized in that the mixture can be passed between a pair of counter-rotating reduction rollers while in a green state to form a sheet having a thickness less that about 1 cm, the inorganic aggregate having a concentration greater than about 100% by weight of the hydraulically settable binder;

(b) passing the hydraulically settable mixture between the pair of counter-rotating reduction rollers while in the green state to form a sheet having a thickness less than about 1 cm, the sheet having sufficient cohesive strength while still in the green state and prior to pressing and hardening such that the sheet does not rupture as the sheet exits the reduction rollers;

(c) pressing at least a portion of the sheet while in the green state into a desired shape of the article, the article gaining form stability in less than about one minute after first being pressed into the desired shapes, the pressing step having a duration of less than about one minute; and (d) allowing the pressed portion of the sheet to harden in the desired shape of the article.

156. A method for manufacturing an article having a hydraulically settable matrix, the method comprising the steps of:

(a) mixing together a hydraulically settable binder, a rheology-modifying agent, and water in order to form a hydraulically settable mixture that is characterized in that the mixture can be passed between a pair of counter-rotating reduction rollers while in a green state to form a sheet having a thickness less than about 3 mm;

(b) passing the hydraulically settable mixture between a pair of counter-rotating reduction rollers while in the green state to form a sheet having a thickness less than about 3 mm, the sheet having sufficient cohesive strength while still in the green state and prior to pressing and hardening such that the sheet does not rupture as the sheet exits the reduction rollers;

(c) pressing at least a portion of the sheet while in the green state into a desired shape of the article, the article gaining form stability in less than about one minute after first being pressed into the desired shape; and (d) allowing the pressed portion of the sheet to harden into the desired shape of the article.

157. A method for manufacturing an article as defined in claim 156, wherein the hydraulically settable binder comprises hydraulic cement.

158. A method for manufacturing an article as defined in claim 157, wherein the hydraulic cement comprises portland cement.

159. A method for manufacturing an article as defined in claim 156, wherein the inert inorganic aggregate filler is combined in an amount of up to about 80% by weight of the hydraulically settable mixture.

160. A method for manufacturing an article as defined in claim 156, wherein the inert inorganic aggregate filler is combined in an amount in a range from about 3% to about 50% by weight of the hydraulically settable mixture.

161. A method for manufacturing an article as defined in claim 156, wherein the inert inorganic aggregate filler is combined in an amount in a range from about 20% to about 35% by weight of the hydraulically settable mixture.

162. A method for manufacturing an article as defined in claim 156, wherein step (a) includes blending fibers into the hydraulically settable mixture.

163. A method for manufacturing an article as defined in claim 162, wherein the fibers are selected from the group consisting of abaca, bagasse, wood fibers, ceramic fibers, cotton, and mixtures of the foregoing.

164. A method for manufacturing an article as defined in claim 162, wherein the fibers are blended in an amount in a range from about 0.2% to about 50% by volume of the hydraulically settable mixture.

165. A method for manufacturing an article as defined in claim 162, wherein the fibers are blended in an amount in a range from about 1% to about 30% by volume of the hydraulically settable mixture.

166. A method of manufacturing an article as defined in claim 162, wherein the fibers are blended in an amount in a range from about 5% to about 15% by volume of the hydraulically settable mixture.

167. A method for manufacturing an article as defined in claim 156, wherein the rheology-modifying agent is added in an amount in a range from about 0.1% to about 20% by weight of the hydraulically settable mixture.

168. A method for manufacturing an article as defined in claim 156, wherein the rheology-modifying agent is added in an amount in a range from about 0.5% to about 3% by weight of the hydraulically settable mixture.

169. A method for manufacturing an article as defined in claim 156, wherein the rheology-modifying agent comprises a cellulose-based material.

170. A method for manufacturing an article as defined in claim 156, wherein the rheology-modifying agent comprises a starch-based material.

171. A method for manufacturing an article as defined in claim 156, wherein the rheology-modifying agent comprises a protein-based material.

172. A method for manufacturing an article as defined in claim 156, wherein the rheology-modifying agent comprises a synthetic organic material.

173. A method for manufacturing an article as defined in claim 156, wherein the rheology-modifying agent is selected from the group consisting of alginic acid, phycocolloids, agar, gum arabic, guar gum, locust bean gum, gum karaya, gum tragacanth, derivatives of the foregoing, and mixtures of the foregoing.

174. A method for manufacturing an article as defined in claim 156, wherein step (b) further includes the step of extruding the hydraulically settable mixture through a die orifice having a desired shape to form the sheet, the sheet having a thickness, width and length.

175. A method for manufacturing an article as defined in claim 174, wherein the extruded sheet is passed between the pair of counter-rotating reduction rollers having a gap distance therebetween, thereby modifying the thickness of the sheet to correspond to the gap distance between the reduction rollers.

176. A method for manufacturing an article as defined in claim 156, further comprising the step of heating the pair of counter-rotating reduction rollers in order minimize adhesion of the hydraulically settable mixture to the pair of counter-rotating reduction rollers.

177. A method for manufacturing an article as defined in claim 176, wherein the temperature is in a range from about 50° C. to about 300° C.

178. A method for manufacturing an article as defined in claim 156, wherein step (c) further includes:

(i) positioning the portion of the sheet between a male die of a desired shape and a female die having a configuration substantially complementary to the shape of the male die;

(ii) pressing the portion of the sheet between the male die and the female die to mold the portion of the sheet into the desired shape of the article; and (iii) removing the male die and the female die from the article when the molded article has achieved form stability so as to be self-supporting independent of the male die and the female die.

179. A method for manufacturing an article as defined in claim 178, wherein the male and female dies are configured to form the portion of the sheet into a clam shell-shaped article when the male die and the female die are pressed together.

180. A method for manufacturing an article as defined in claim 178, wherein the male and female dies are configured to form the portion of the sheet into a cup-shaped article when the male die and the female die are pressed together.

181. A method for manufacturing an article as defined in claim 178, wherein the male and female dies are configured to form the portion of the sheet into a plate-shaped article when the male die and the female die are pressed together.

182. A method for manufacturing an article as defined in claim 156, further comprising the step of applying a coating to the sheet before step (c), the coating functioning to seal the mixture from liquids.

183. A method for manufacturing an article as defined in claim 156, further comprising the step of applying a coating to the hardened article, the coating functioning to seal the article from liquids.

184. A method for manufacturing an article as defined in claim 156, wherein the hardened article has a wall thickness in a range from about 0.05 mm to about 3 mm.

185. A method for manufacturing an article as defined in claim 156, wherein step (a) includes adding a set accelerator to the hydraulically settable mixture.

* * * * *

UNITED STATES PATENT AND TRADEMARK OFFICE
CERTIFICATE OF CORRECTION

PATENT NO. : 5,766,525                                             Page 1 of 3
DATED      : Jun. 16, 1998
INVENTOR(S): Per Just Andersen; Simon K. Hodson It is certified that error appears in the above-identified patent and that said Letters Patent is hereby corrected as shown below:

Cover Page, Abstract, right column, line 5, after "is" change "feed" to --fed--

In Figures 17A and 17B, change reference number "122" to --132--

Col. 4, line 38, before "is" delete --be-- and after "is" insert --the--

Col. 6, line 28, after "recent" insert --awareness--

Col. 8, line 27, after "cost" change "involving" to --involved in--

Col. 13, line 2, after "rapidly" change "reaches a" to --reach--

Col. 18, line 17, after "packaging" insert a comma

Col. 20, line 65, after "such" insert --as--

Col. 21, line 32, after "Building" change "material" to --Material--

Col. 22, line 48, after "as" change "a-dicalcium" to --α-dicalcium--

Col. 23, line 62, after "portland cement," change "microtine" to --microfine--

Col. 28, line 31, before "mixture" change "hydraulical-settable" to --hydraulically settable--

Col. 30, line 46, delete the second occurance of --calcium oxide--

UNITED STATES PATENT AND TRADEMARK OFFICE
CERTIFICATE OF CORRECTION

PATENT NO. : 5,766,525
DATED : Jun. 16, 1998
INVENTOR(S) : Per Just Andersen; Simon K. Hodson It is certified that error appears in the above-identified patent and that said Letters Patent is hereby corrected as shown below:

Col. 32, line 32, after "as" change "W/m-K" to --W/m·K--

Col. 33, line 52, after "particles" change "is" to --are--

Col. 38, line 18, change "claim-shell" to --clam-shell--

Col. 40, line 4, before "may" change "These" to -- This--

Col. 45, line 45, after "benefit" change "to" to --of--

Col. 46, line 28, after "component" change "press" to --pressed--

Col. 46, line 31, before "without" change "bowel" to --bowl--

Col. 53, line 28, after "forms" insert --of--

Col. 56, line 42, after "known" insert --as--

Col. 57, line 48, before "rotate" change "auger" to --augers--

Col. 58, line 9, after "can" change "very" to --vary--

Col. 60, line 7, before "has" change "82" to --76--

Col. 60, line 19, before "against" change "33" to --32--

Col. 61, line 23, after "lip" change "112" to --122--

UNITED STATES PATENT AND TRADEMARK OFFICE
CERTIFICATE OF CORRECTION

PATENT NO. : 5,766,525
DATED : Jun. 16, 1998
INVENTOR(S) : Per Just Andersen; Simon K. Hodson It is certified that error appears in the above-identified patent and that said Letters Patent is hereby corrected as shown below:

Col. 61, line 49, after "mold" change "112" to --113--

Col. 61, line 59, before "described" change "previous" to --previously--

Col. 62. line 7, after "32" insert --is--

Col. 64, after "3 mm" insert a comma

Col. 67, line 3, before "adding" change "(ii)" to --(iii)--

Col. 67, line 7, before "combining" change "(iii)" to --(iv)--

Col. 74, line 55, after "3 mm" insert a comma

Signed and Sealed this

Sixteenth Day of February, 1999

Attest:

Attesting Officer

Acting Commissioner of Patents and Trademarks